United States Patent [19]

Gettel

[11] Patent Number: 5,369,771
[45] Date of Patent: Nov. 29, 1994

[54] COMPUTER WITH TRANSPARENT POWER-SAVING MANIPULATION OF CPU CLOCK

[75] Inventor: Steven K. Gettel, Austin, Tex.

[73] Assignee: Dell U.S.A., L.P., Austin, Tex.

[21] Appl. No.: 813,380

[22] Filed: Dec. 23, 1991

[51] Int. Cl.⁵ .............................................. G06F 1/32
[52] U.S. Cl. .................................... 395/750; 364/707;
364/273.1; 364/DIG. 1; 364/948.8; 364/DIG. 2
[58] Field of Search ............. 395/750; 364/707, 273.1,
364/DIG. 1, 948.8, DIG. 2; 371/66, 12, 14;
G06F 1/32

[56] References Cited

U.S. PATENT DOCUMENTS

| | | | |
|---|---|---|---|
| 3,941,989 | 3/1976 | McLaughlin et al. | 395/750 |
| 4,365,290 | 12/1982 | Nelms et al. | 395/750 |
| 4,409,665 | 10/1983 | Tubbs | 364/707 |
| 4,615,005 | 9/1986 | Maejima et al. | 364/707 |
| 4,698,748 | 10/1987 | Juzswik et al. | 395/750 |
| 4,758,945 | 7/1988 | Remedi | 395/750 |
| 4,851,987 | 7/1989 | Day | 395/550 |
| 4,893,271 | 1/1990 | Davis et al. | 395/750 |
| 4,980,836 | 12/1990 | Carter et al. | 364/483 |
| 5,025,387 | 6/1991 | Frane | 395/750 |
| 5,167,024 | 11/1992 | Smith et al. | 395/375 |

FOREIGN PATENT DOCUMENTS

| | | | |
|---|---|---|---|
| 0381021 | 8/1990 | European Pat. Off. | G06F 1/32 |
| 0419908 | 4/1991 | European Pat. Off. | G06F 1/32 |
| 0421431 | 4/1991 | European Pat. Off. | G06F 1/32 |
| 0426410 | 5/1991 | European Pat. Off. | G06F 1/32 |
| WO92/09028 | 5/1992 | WIPO | G06F 1/32 |

Primary Examiner—Allen R. MacDonald
Assistant Examiner—Glenn A. Auve
Attorney, Agent, or Firm—Robert Groover; James Hoffman; Kevin Daffer

[57] ABSTRACT

A computer system having power management control features which include states of normal clock speed operation, slow clock speed operation, and stop-clock operation based on input/output activity, system bus activity, and program parameters. The system detects inactivity over a period of time and places the system in one of the states to provide for power conservation and accessibility by a user.

10 Claims, 72 Drawing Sheets

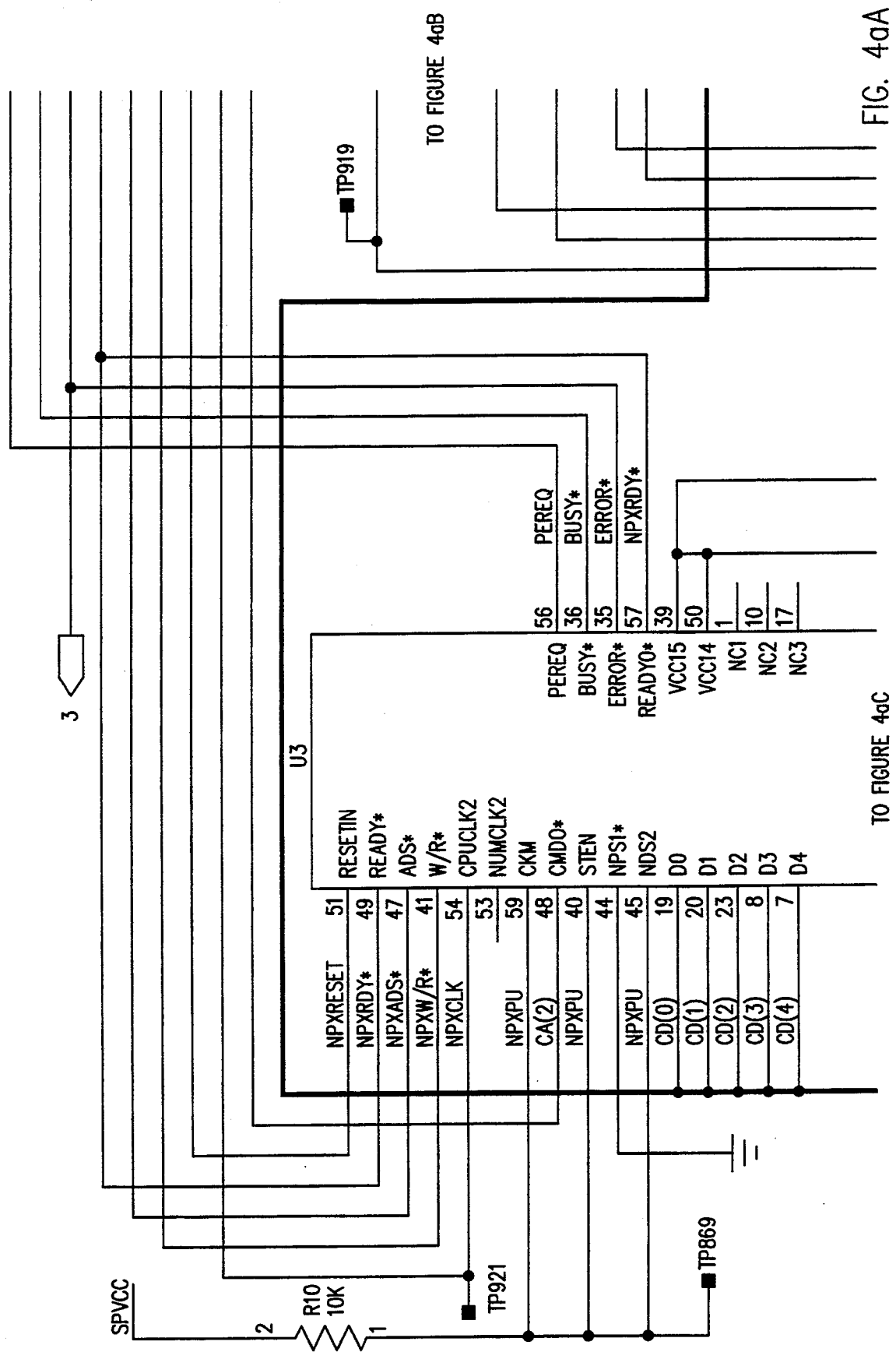

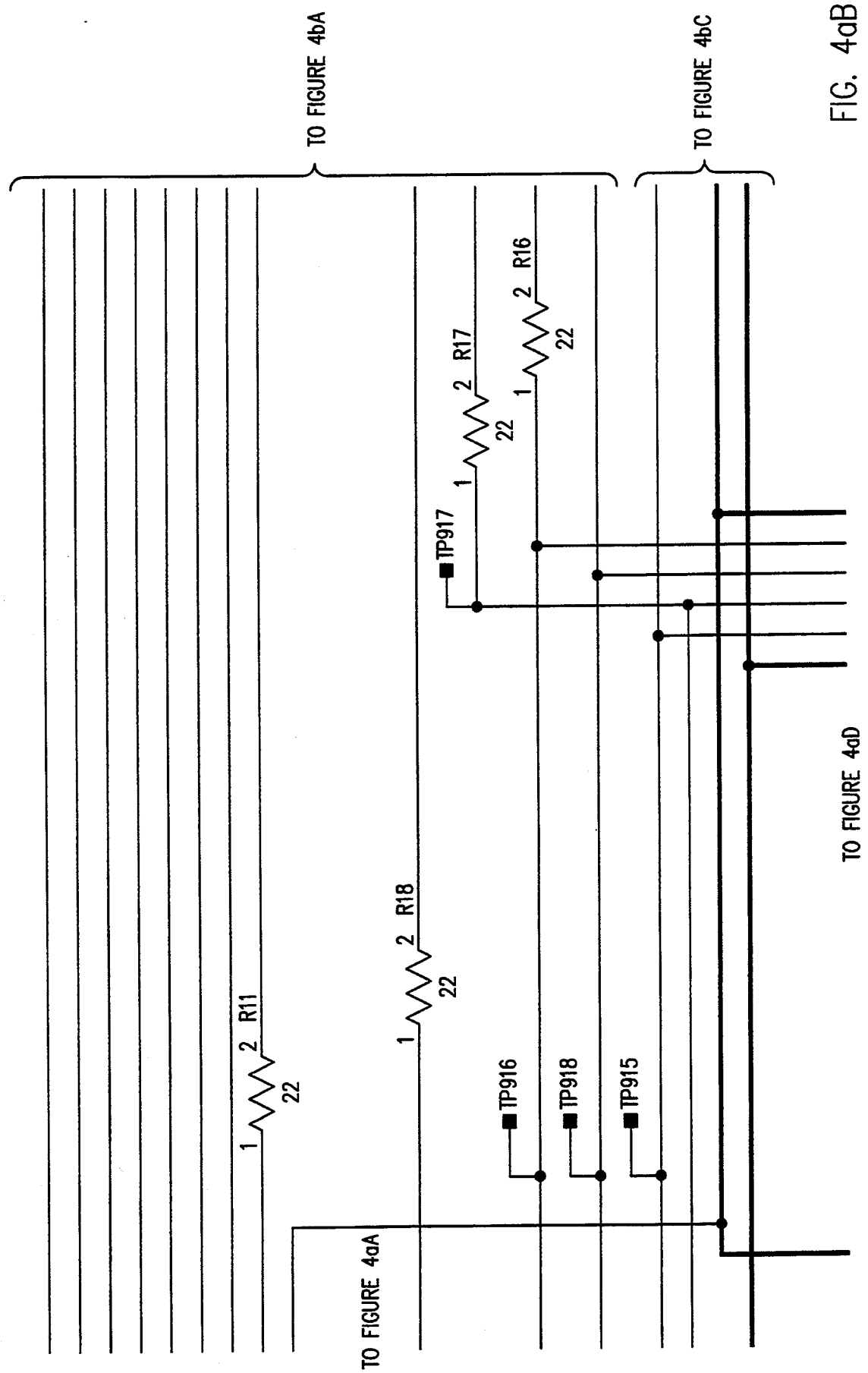

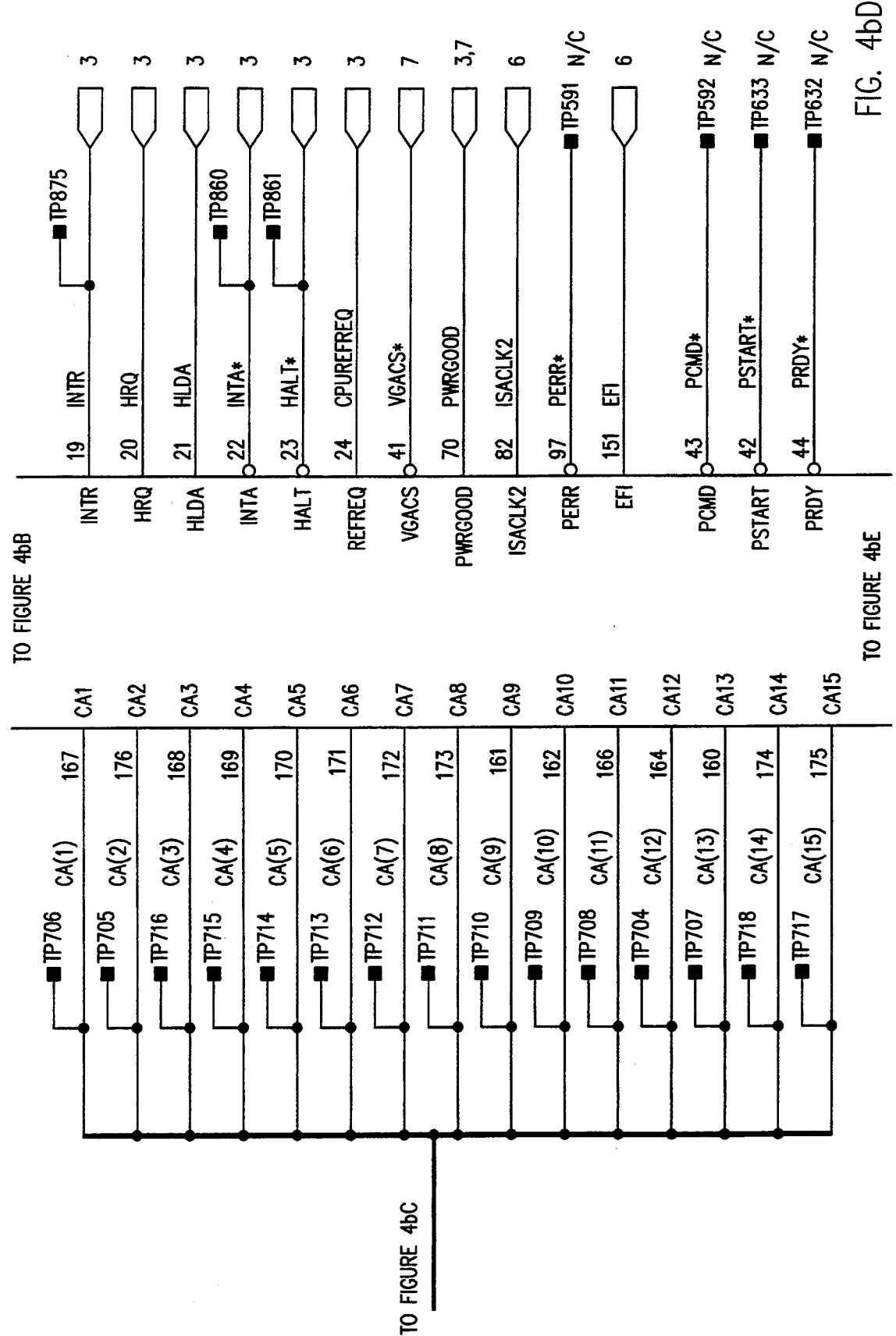

COMPUTER WITH TRANSPARENT POWER-SAVING MANIPULATION OF CPU CLOCK

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTION

The present invention relates to computer systems (and particularly to small computer systems), and to methods for using them.

The innovations disclosed in the present application provide computer systems (especially very small portable personal computers) which have advantageous new capabilities. To better explain the significance and advantages of these innovations, the following paragraphs will review some technological context. This technological context is not necessarily prior art, but is intended to help in pointing out the disclosed inventions.

Laptop and Smaller Computers

Portable personal computers were introduced in the early 1980s, and proved to be very useful and popular. As this market has developed, it has become increasingly clear that users strongly desire systems to have small volume, small weight, physical durability, and long battery-powered lifetime. Thus, small portable computers ("laptop" computers) have proven extremely popular during the late 1980s. Users continue to demand more features, longer time between recharges, and lower weight and volume. This combination of demands is difficult to meet. Moreover, as of 1990, another smaller generation of portable computers has begun to appear, referred to as "notebook" computers. This smaller form factor will only exacerbate the difficulty of the above tradeoffs.

Approaches to Power Conservation

There are three basic approaches to extending the operating lifetime of a portable computer. The simplest way is to specify components at the lowest economical power consumption. Thus, for instance, CMOS integrated circuits and liquid crystal displays (LCDs) will normally be used. An equally simple way is to increase battery capacity. However, both of these routes rapidly encounter limits, which are set simply by the tradeoff of the cost of lower-power components, or of the elimination of functionality, with user expectations.

The third way is to use power-management algorithms so that, at almost every instant, all components are being operated in the lowest-power mode for their current demands. Thus, for example, a processor which is not currently executing a program may be placed into "sleep" mode, to reduce its overall power consumption. For another example, substantial power savings can be achieved simply by stopping the system clock. For another example, it is common practice, in portable computers with an LCD display, to provide backlighting for use of the display under low-light conditions; but, since this backlighting consumes relatively large amounts of power, it will normally be turned off after a short period of inactivity (or even, alternatively, after a short duration regardless of activity), until the user again demands backlighting.

All of these lines of approach have some inherent limits. For example, it is hard to foresee any integrated circuit technology which would be economical in the 1990s and more power-efficient than low-power low-voltage CMOS. Some further improvement in this area is foreseeable, but no revolutionary improvements appear likely. Moreover, in practice, such improvements are largely outside the control of system designers: when lower-power chips are sampled, system design houses will buy them; but system design houses cannot greatly accelerate the pace of introduction of such chips.

It is also true that the smartest power-management programs cannot reduce the time fraction during which the user wishes to look at the display, or enter data through the keyboard. However, in this area there does appear to be room for improvement, and system design improvements can help achieve power efficiency.

Many power management schemes have been proposed, where parts of the system are shut down during periods of inactivity.[1] These approaches tend to extend the usable working time between recharges.

[1] One example of a portable computer system with power-monitoring functions is described in U.S. Pat. No. 4,980,836 to Carter et al., which is hereby incorporated by reference.

Another source of proposed teachings regarding power-management functions is provided by the DS1227 product preview, contained in the 1988 data book of Dallas Semiconductor Corporation, which is hereby incorporated by reference.

In addition, it has been recognized that management of the charging and discharging cycles of Ni—Cd batteries can help to extend their life.

Either of these power-management functions requires some intelligent control. The conventional way to implement this has been using the main microprocessor (CPU). To accomplish this, the necessary program steps are inserted into the BIOS software (basic input/output system software), which is stored in ROM.

More advanced power management schemes are detailed below.

How Application Programs Interact with Hardware

One of the most basic needs in computer architecture is making it easier for a variety of software programs to interact correctly and efficiently with a variety of hardware configurations. Much of the development in computer architecture can be seen as a steady progression of techniques for addressing this need.

Note the emphasis on efficiency in the foregoing statement. Even where existing standards can assure compatibility, the search for greater speed or expanded functionality will frequently draw programmers to circumvent the software standards.[2] Thus, there is a continuing tension between compatibility and efficiency.

[2] A good example of this countercurrent appeared in the early days of graphics development on the IBM PC: the BIOS provided a standard interface to video driver operations, but software developers discovered that they could vastly improve performance by making calls directly to the video driver hardware. Thus adherence to the standard architecture was not enough to assure computer designers that their customers would be able to run popular IBM-compatible software, such as Flight Simulator TM, on their supposedly IBM-compatible machines.

When any particular piece of hardware is examined in isolation, it can usually be best described in terms of electrical relationships.[3] However, a commercial application program will be written in a programming language (e.g. in assembly language or in C) which is somewhat machine-independent. There is a great difference between these two levels of description; but this gap must be bridged in order to economically develop application software which can run on a wide range of machines.

[3] For example, a memory specification may state that, within a certain range of delay after certain voltages appear on certain lines, certain other lines will be driven to a corresponding state (which is dependent on the data previously stored in the memory). The specification for an input device, such as a keyboard, may state that, when certain voltages appear on certain lines, a particular input operation may be considered to have occurred. The specification for an output device, such as a video card, may state that, when certain voltages appear on certain lines within a certain timing relationship and protocol, each pixel within a certain defined display device will be driven to an optical state which corresponds to a certain portion of the protocol.

Several layers of software and firmware structure are used to mediate between application programs and the underlying hardware. To better show the context of the invention, these layers will be described below in greater detail.

Startup Software (POST, Bootstrap, etc.)

A computer system normally includes a number of complex hardware components (chips and subsystems). When power is first applied to a computer (or when the user triggers a reset after the system has locked up), the various hardware elements (chips and subsystems) will each have its own internal procedures (reset procedures) to regain a stable and known state. However, at some point (if the hardware is intact), these reset procedures will have ended, and at this point the CPU performs various important overhead tasks[4] under software control. This phase of operation is generally referred to as "POST" (Power-On-Self-Test).

[4] These include, for example, surveying the system configuration, performing sanity checks on system hardware, issuing diagnostic signals (such as sounding beeps through a speaker or turning on LEDs), and permitting the user to branch into an NVRAM configuration program.

After POST, a "bootstrap" program is run, to permit the CPU to begin execution of other software. For robustness, the POST and bootstrap software is normally stored in a read-only memory. The bootstrap program launches the CPU on execution of the primary operating system software;[5] the primary operating system can then be used by the user to launch an application program, either manually or automatically.

[5] Depending on how the system has been set up, the boot software may direct program execution into DOS, Unix, OS/2, a DOS variant, or another operating system. This is normally automatic and predetermined, but is manually user-selectable in some systems. However, the choice of operating system is not particularly relevant to the inventions described in the present application.

Bootstrap Programs

Any computer system must have some way to begin program execution after a cold start. The hardware architecture of a microprocessor (or other CPU) will normally provide for a "reset" operation, which places all of the hardware circuits in a known electrical state; but it is still necessary to start the CPU on execution of a desired program. For example, in the very early days of computing, some computer systems would be manually configured to read in a "bootstrap loader" program at startup. This bootstrap program was a simple program which loaded in, and started execution of, another sequence of instructions, which were the beginning of the desired program. Bootstrap programs are often referred to simply as "boot" software.

To give a more recent example, the Intel 80×86 microprocessors, after a hardware reset, will always attempt to begin program execution from a specific memory address.[6] Thus, if a branch (or conditional branch) instruction is found at this address, the microprocessor will continue its program execution from whatever address is specified.

[6] That is, the microprocessor will read the contents of that memory location, and will attempt to execute the bits it finds there as a microprocessor instruction. The specific memory location used by the 80×86 family is xxxFFFF0h, i.e. 16 bits below the top of the memory space. Other microprocessors may use a different starting address, but similar principles apply.

Thus, this initial target address is the entry point for every session of use. This address is normally used to enter execution of programs which must be run every time the computer is used.

"Basic Input/Output System" Software (BIOS)

In many types of modern personal computers (and in all "IBM-compatible" personal computers), a key part of the system software is a "basic input/output system" (BIOS) program.[7] The BIOS program contains frequently-used routines for interfacing to key peripherals,[8] for interrupt handling, and

[7] See generally, e.g., P. Norton, THE PETER NORTON PROGRAMMER'S GUIDE TO THE IBM PC (1985), which is hereby incorporated by reference.

[8] The term "peripheral" or "peripheral component" normally refers to those components of a computer system which are not on the motherboard, i.e. which must be addressed through a system bus or over a defined port. However, the usage of this term is somewhat variable; sometimes it is used to refer to any I/O device, or only to refer to components which are optional add-ons. so forth.[9]

[9] Thus, the BIOS software provides some degree of machine-independence. However, in PC-class computers, this independence is not fully exploited by the available commercial software. Many programs bypass the BIOS software, and directly access the underlying hardware addresses or devices. See generally Glass, "The IBM PC BIOS," Byte, April 1989, pp. 303ff.

For system robustness, the BIOS software is normally packaged in a nonvolatile read-only-memory (ROM, PROM, EPROM, etc.). In fact, it is normally packaged together with other key pieces of overhead software, such as POST,[10] boot, and configuration management routines,[11] as well as a pointer to launch the computer into the operating system software.[12] Thus, nowadays the term "BIOS" is often used, somewhat more broadly, to refer to this whole collection of basic system routines.

[10] The POST routines provide an extensive check for hardware integrity.

[11] Packaging the BIOS, POST and boot routines in ROM makes a very robust firmware system. Short of hardware damage, it is very difficult for a user to distort the system to the point where it will not start up and run (if the operating system software is present).

However, this system also provides a considerable degree of flexibility. As the operating system starts up (after the POST and boot routines), the user can remap address pointers to revector BIOS calls away from the standard BIOS routines, if desired. (It is also common for users to map out the entire BIOS contents into fast RAM, for greater speed.)

[12] Depending on how the system has been set up, the BIOS software may direct program execution into DOS, Unix, PS/2, a DOS variant, or another operating system. However, the choice of operating system is not particularly relevant to the inventions described in the present application.

Customized BIOS and BIOS Extensions

The BIOS in IBM-compatible computers is accessed by interrupts, but the vectors for those interrupts can be diverted to other addresses (by overwriting an address pointer in system RAM). This capability significantly expands the flexibility of the BIOS, and programmers use it very frequently.

However, while the capability to divert BIOS vectors is useful, it is not sufficient to address many needs. Changes to the interrupt-handling vectors will not affect other portions of the BIOS. Computer designers have found it highly desirable to prepare (or obtain) customized BIOS routines to fully exploit the advantage of their systems. For example, such customized BIOS routines are commonly necessary in very-low-power portable systems, to implement powersaving features which maximize battery lifetime. BIOS customization has increasingly been recognized as an important element in rapidly developing a reliable advanced system.[13]

[13] See generally Scheier, "Phoenix counters competitors with diversified BIOS offerings," PC Week, vol. 4 no. 38 (Sep. 22, 1987) at 135f; Guterman, "CompuAdd adopts new ROM BIOS for clones," PC Week vol. 5 no. 28 (Jul. 11, 1988) at 6; both of which are hereby incorporated by reference.

One function often provided by BIOS customization is "hot-key" access to a setup menu, or to low-level system hardware features (e.g. monitor brightness adjustment). Such capability is very useful to system designers, but normally it has had to be realized in a machine-dependent way (so that large chunks of BIOS have had to be rewritten every time a change was made).

Another problem with prior hot-key add-ons is that, if the BIOS interrupt vector for key-handling was diverted, the hot-key capability could be lost. Since many applications do divert the keyboard interrupt (INT9), no critical functionality could be made dependent on such a hot-key operation.

Operating System Software

The application software will normally interface to an operating system (such as DOS, DOS+Windows, OS/2, UNIX of various flavors, or UNIX plus X-windows). The operating system is a background software program[14] which provides an application programming interface (API) for use by the application software. Thus, the programmers writing application software can write their software to fit the API, rather than having to find out and fit the peculiarities of each particular machine.[15]

[14] Some operating systems run continuously, or at least start up at regular intervals, even while an application program is running; other operating systems merely provide capabilities which can be called on by the application software.
[15] See, e.g., Quedens, "Windows virtual machine," PC Tech Journal vol.5, no.10 p.90, 92-3, 95, 97, 99-100, 102 (Oct. 1987), which is hereby incorporated by reference.

Application Software

From a system designer's point of view, the application software is (subject only to the minimal constraints of the architectural standards) wholly unpredictable.[16] Common applications include spreadsheets, word processors and publishing programs, databases, games, project managers and a wide variety of others; but inevitably users will also run customized applications, and new types of applications.

[16] Many clever people are constantly looking for new ways to exploit the standard architecture, and many innovations continually result. Thus, hardware architects must expect that the application software will not only be unpredictable, but will be as unpredictable as possible.

Power Management and Innovative Completer System and Method

Power management in an Intel 386 SL Microprocessor SuperSet system includes local standby (for individual I/O devices), global standby, and suspend power states to limit power consumption. These states are in addition to the usual Ready state and the powered-down Off state. The 386 SL system has thirteen programmable power management timers to keep track of device idle time, system idle time, and suspend warning time. If the system has been idle for a programmed standby timer count, the system can automatically go into global standby state, when the system enters global standby state. the global standby power management code is executed; this provides flexibility as to power consumption and performance. Typically, the global standby state powers down high-power peripheral devices, slows the keyboard clock, and slows or stops the CPU clock. The system can be brought out of global standby state by the occurrence of a system event; interrupts and other events such as modem ring, parity error, and I/O check can be programmed to be recognized as system events.

The suspend state powers down essentially everything except the memory refresh and resume state machine and real time clock. The system can be programmed to automatically go from global standby state into suspend state if there has been no system activity for a programmed time out period since entering global standby state. Execution can resume from a suspend state following any of: a pulsing of the suspend/resume button, a detection of a modem ring, or an alarm in the real time clock.

The system management non-maskable interrupt (SMI) permits saving and restoring the processor state to implement power management services that are transparent. Users write an SMI handler that implements the desired power management features, and the SMI can be triggered in a number of user-defined ways. System management RAM (SM-RAM) stores the SMI handler code and the state of the system at the time of the SMI. Programmable clock speeds include dividing the CPU clock by 1, 2, 4, 8, or stopping the clock, dividing the keyboard clock by 2, 4, or stopping the clock, and dividing a math coprocessor clock by 1, 2, 4, 8, or 16. Programming the CPUPWRMODE register plus the high-low status of the TURBO pin determine CPU clock speed. Programmable system management output signals (SMOUTx) can power down devices. SMI returns control to the previous application upon a resume (RSM) command. When an SMI is recognized by the CPU, then the CPU switches in the SM-RAM into system memory space, saves the current CPU contents to the SM-RAM area, and jumps to the fixed entry address for SMI handler code.

The system management control register (SM_RE-Q_CNTRL) allows selective enabling or disabling of system management features by bit setting as follows: the SW_REQ_EN bit enables software request SMI; the HW_SUS_REQ_EN bit enables hardware suspend request; the SMIGSTDBY_REQ_EN bit enables global standby time out; the SMILSTDBY_BY_EN bit enables local standby time out; the SMILTRP_REQ_EN bit enables I/O trap SMI; and the EXT_SMI_EN bit enables external SMI.

Local standby state hardware includes for each peripheral device an I/O access trap and a local standby idle timer and a control pin. The timer is loaded with a timeout value, and counts down from this value. However, upon each I/O access the contents of the timer are reset to the timeout value. If the timer counts down to zero, then the SMI interrupt handler saves the state of the device in SM-RAM and powers down the device through the control pin. When an I/O access is made to a powered down device, the I/O access trap generates an SMI, the SMI interrupt handler repowers the device, restores its state; and reissues the I/O instruction.

Global standby state hardware includes system event traps, a global standby timer, an autopower off timer, and stop break event traps. The global standby hardware is initialized by specifying in the three System Events registers (SYS_EVNT_CFG0-SYS_EVNT_CFG2) those events (such as interrupts) that indicate an active system. The amount of time the system can be sitting in idle is programmed into the global standby timer which has a high byte register GSTDBY_TMRH and and a low byte register GSTDBY_TMRL. When the timer counts down to zero, an SMI is generated and sets the GSTDBY_REQ bit (bit 2) in the SM_REQ_STS register. The power management interrupt handler sets the SYS_IN_STDBY bit (bit 7) of the SM_REQ_STS register and puts the system in global standby. If enabled, Local Standby is invoked and the CPU clock is stopped. The autopower off option can be enabled to put the system in the suspend state after it has been in a standby state for a specified time. And to allow the system to exit from a global standby state, stop break events (such as interrupts) must be enabled and selected by programming the three Stop Break Registers STP_BRK_CFG0-STP_BRK_CFG2. Any of the sixteen interrupts IRQ0-IRQ15 plus RING_SEL (modem ring detect), INTR_SEL (any active interrupt), NMI_SEL (non-maskable interrupt), PERR_SEL (parity error), IOCHCHK_SEL (active I/O channel check), and SUS_EVNT_SEL (hardware suspend events) may be system events and/or stop break events.

Suspend state can be triggered by an external SMI, a software SMI, a low battery, a pulsing of the suspend/resume button, and an auto power off signal. Associated with each trigger is a warning timer which permits critical I/O operations such as DMA to complete before the system is placed in suspend state. As previously noted, the autopower off places a system already in global standby state into suspend state after a specificed period of system idleness. An autopower off SMI request is generated (presuming all necessary enablement bits set) the counting down of the Auto Power Off Timer (APWR_TMRL-APWR_TMRH) from its loaded initial count (each count is 4.096 seconds) followed by a counting down of the Auto Power Off Suspend Warning Timer (SUS_WRN_TMR_APWR) from its initial count (each count is 128 milliseconds). When the suspend warning timer expires, an SMI request generates and sets the HW_SUSREQ bit (bit 1) of the SM_REQ_STST register and the APWR_OFF_SUS_REQ bit (bit 0) of the SPND_STST register. If a system event occurs prior to the suspend warning timer expiring, then the SYS_IN_TDBY bit is cleared and the timers disabled. Once the suspend state is entered, then a resume (RSM) as from a pulse of the Suspend/Resume button, a ring indication signal on the serial port, or an alarm from the real time clock will provide transition to the ready state.

An SMI handler typically has an entry point, a strategy routine to determine what initiated the SMI request, a request handler to process the request, and a data storage area to hold the state of devices that are powered down.

The advanced power management (APM) approach of Intel Corp and Microsoft Corp provides power management inputs from all three of BIOS, operating system, and application program software layers and cooperation among the layers. The system and devices can change from one power state to another either by explicit command or automatically based on APM parameters and system activity. The interface with the layer BIOS is through the INT 15h interrupt with the high byte of the A register (AH) set at 53h and the low byte (AL) determining the call. For example, AL equal to 01 (plus the B register containing 0000h) establishes the connection to the BIOS. Also, with AL, equal 05h (CPU Idle call), the call to BIOS informs the BIOS that the system is currently idle and that processing should be suspended until the next system event; this allows the BIOS to stop the CPU clock and put the system into a Transient Stop Clock state. Similarly, AL equal to 06h informs the BIOS that the CPU is busy (and should not be slowed) and AL equal to 07h along with the B and C registers prescribe the power state for designated devices. Note that with the CPU Idle call in cases where an interrupt causes the system to leave the idle state, the interrupt may or may not have been serviced when the BIOS returns from the CPU Idle call. The caller should not make any assumptions concerning interrupt servicing and should allow pending interrupts to be taken upon return from the CPU Idle call. If interrupts are serviced from within the BIOS CPU Idle function, the interrupt handler must return to the BIOS when the interrupt processing is completed. The caller cannot use its knowledge of being in the idle state to retain control from an interrupt handler. For example, some system implementations may slow the CPU clock rate before waiting on an interrupt and restore the normal clock rate after the interrupt is serviced but before returning from the CPU Idle call.

However, the known system power management approaches with APM have the problem of the use of a timeout on system events (!SYSEVENT) and the CPU Idle call for their power management architecture being constrained to put the system in global standby. If they do not detect system activity (interrupts only), they actually stop the clock, which freezes the screen. I/O activity cannot be detected with a frozen clock. Also, this appears to be a system hang to most users. Furthermore, the operating system, such as MSDOS, may interact with a printer or communication peripheral without the use of interrupts.

In contrast, the preferred embodiment systems use the 386 SL system with APM and conserve power by detecting system inactivity (a lack of enabled interrupts such as keyboard or communications within an SL system global timeout) and switching to Global Standby TO which is a transient state and then switching to either the Low Speed state or to the Stop Clock state depending upon whether a software counter has counted down. In the Low Speed state the CPU clock runs at one eighth the usual frequency. At detection of I/O activity, the system is brought back to Ready state from the Low Speed state.

When in Stop Clock state, the autopower off suspend count begins and a timeout switches the system into Suspended state which requires a break event to escape to Ready state. And a CPU Idle call will put the system into the Transient Stop Clock state as with the prior art.

The slowing of the clock in the Low Speed state is much less objectionable to stopping the clock as in the prior art.

BRIEF DESCRIPTION OF THE DRAWINGS

The present invention will be described with reference to the accompanying drawings, which show preferred embodiments, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Hardware Implementation Details

Following is a sample specific implementation of hardware portions of the disclosed innovations. This example is intended to better illustrate the disclosed generally applicable innovations, and to comply with the best-mode requirements of US patent law; but of course this specific implementation is subject to change (and will certainly be changed as time goes by), and can be altered, as will be apparent to those skilled in the art, in many details.

The presently preferred embodiment has been implemented on several different computer systems. The primary disclosed embodiment relates to the Dell 325NC computer. This is a notebook computer, with an external closed size of about 8.5×11×2 inches.

Figure 1:
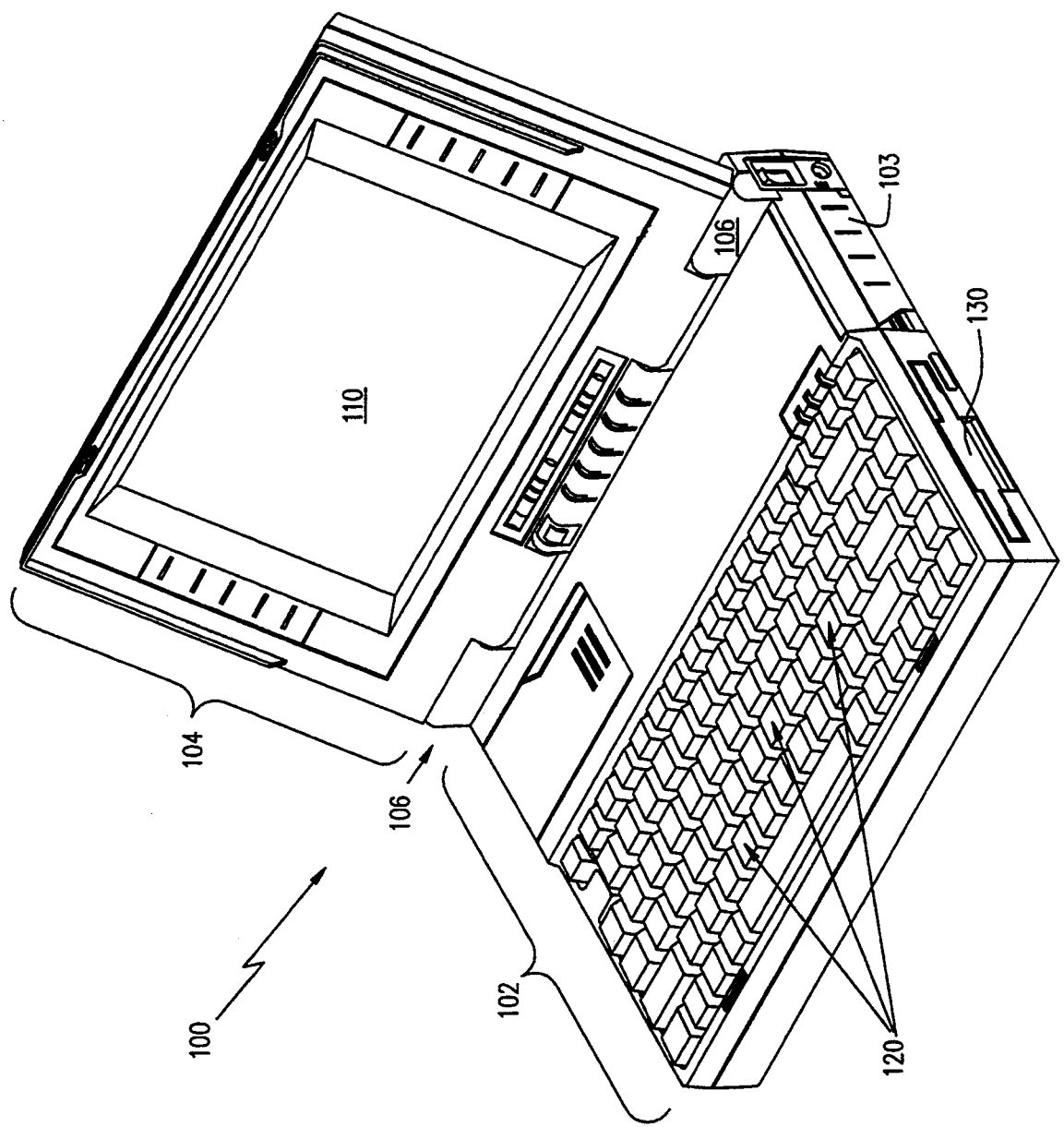
FIG. 1 is a perspective view of a first preferred embodiment computer.

FIG. 1 shows a perspective view of the notebook computer 100 of the presently preferred embodiment in the open position. Visible elements include case 102, cover 104, hinges 106, display screen 110, keyboard 120, floppy disk drive 130, and dust cover 103 (which covers the receptacle for the rechargeable battery pack).

Figure 2:
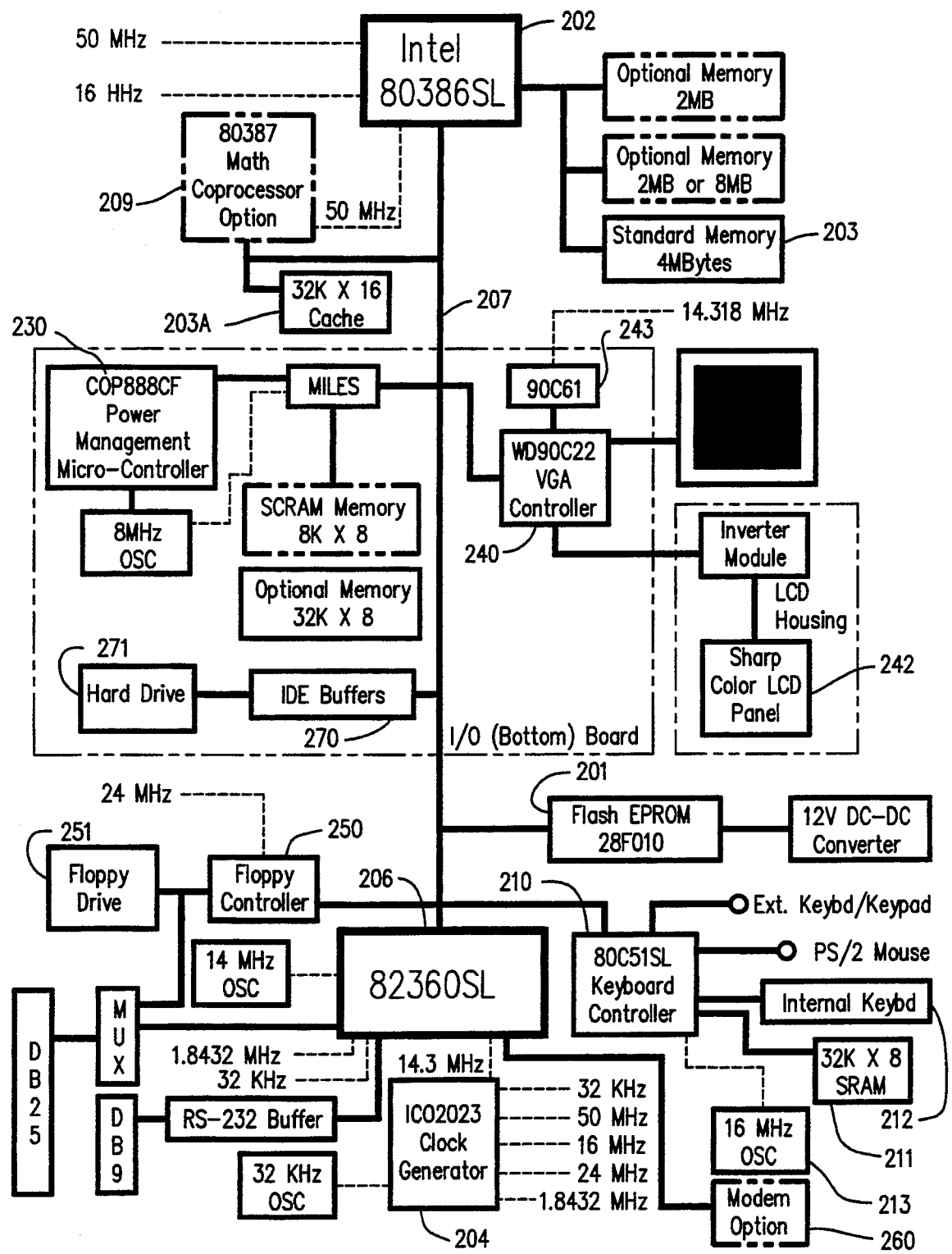
FIGS. 2–10b schematically show the first preferred embodiment in block format.

FIGS. 2–10b schematically illustrate the circuitry of computer 100. As shown in FIG. 2, a processor chipset 202 and 206, similar to the Intel 386SL Superset made of the 80386SL and 82360SL chips, is used. (Of course, a very wide variety of other chipsets can be used instead.) Chip 202 includes a 386SX processor core, and also includes ISA bus control logic (connected to ISA bus 207). Chip 202 also includes memory controller logic (connected to main memory 203 by 22 address lines, 16 data lines, and RAS and GAS strobe signals). Chip 202 also includes cache control tag RAMs (connected to cache RAM 203A). Chip 202 also includes math coprocessor interface logic (connected to optional math coprocessor 209). Chip 202 also includes CPU power management logic. Chip 202 receives a clock input (16 MHz and 50 MHz in this example) from clock/timing generator 204.

Chip 206 is connected to receive clock line SYSCLK from chip 202. Chip 206 also includes timer logic (approximately equivalent to two 8254s), which is connected to receive a 14.31818 MHz clock signal from clock generator 204. Chip 406 also includes interrupt controller logic (approximately equivalent to two 8259As). Chip 206 also includes DMA controller logic (approximately equivalent to two 8237s). Chip 206 also includes bus interface logic which is connected to the ISA bus 207. Chip 206 also includes power management logic, and a real-time clock (approximately equivalent to a 146818), which is connected to receive a 32.768 KHz signal from clock generator 204. Chip 206 also includes serial port control logic (approximately equivalent to two 16450s), which is connected to receive a 1.8432 MHz signal from clock generator 204.

Flash EPROM 201 contains code for BIOS and for the operating system (e.g. DOS). This chip, in the presently preferred embodiment, is a 256K×8 memory.

A microcontroller 210 (an 80C51SL, in the presently preferred embodiment) receives keyboard inputs from keyboard 212. Associated with microcontroller 210 are SRAM 211 (32K×8 in this sample embodiment) and resonant crystal oscillator 213 (16 MHz in this sample embodiment).

Video signals from VGA controller 240 (which is a WD90C22 in the presently preferred embodiment), controls the LCD display 242. VGA controller 240 is also connected to programmable pixel clock 243.

Also connected to bus 207 is a floppy disk drive controller 250 (connecting to floppy disk drive 251) and an IDE interface 270, which is connectible to the internal hard disk drive 271 (or to a semiconductor massmemory drive emulation, if a diskless configuration is chosen).

A power supply controlled by controller 230 is driven by a battery, and also may be powered by external power through an input socket. This power supply, in the presently preferred embodiment, provides output voltages of ±5 V, ±12 V, and +18.6 V. However, of course, lower logic supply voltages may be used in future embodiments.

The 82360SL chip connects to industry-standard connectors for serial ports (DB-9), parallel ports (DB-25), and optional modem unit 260.

Figure 3A:
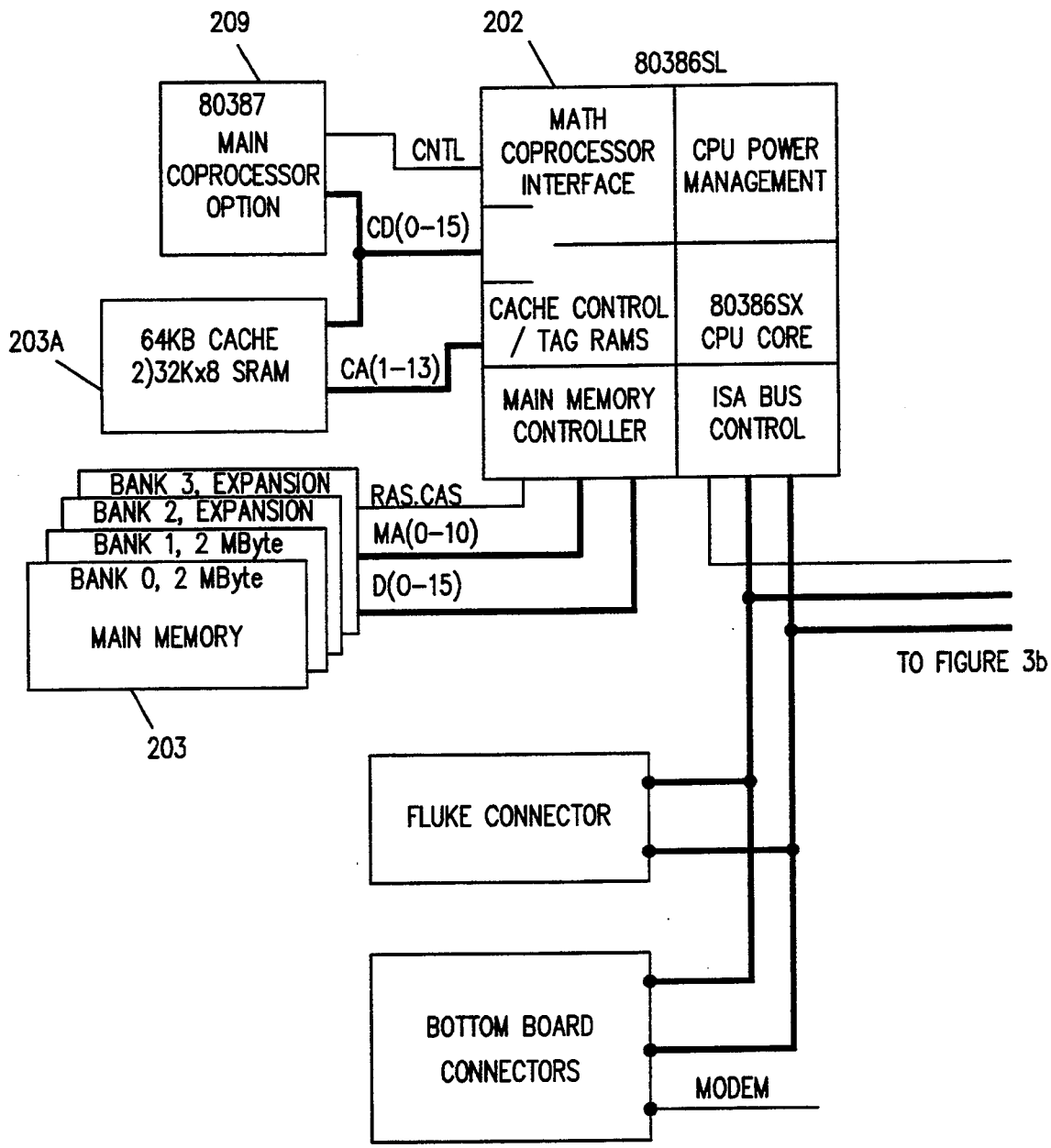
Figure 3B:
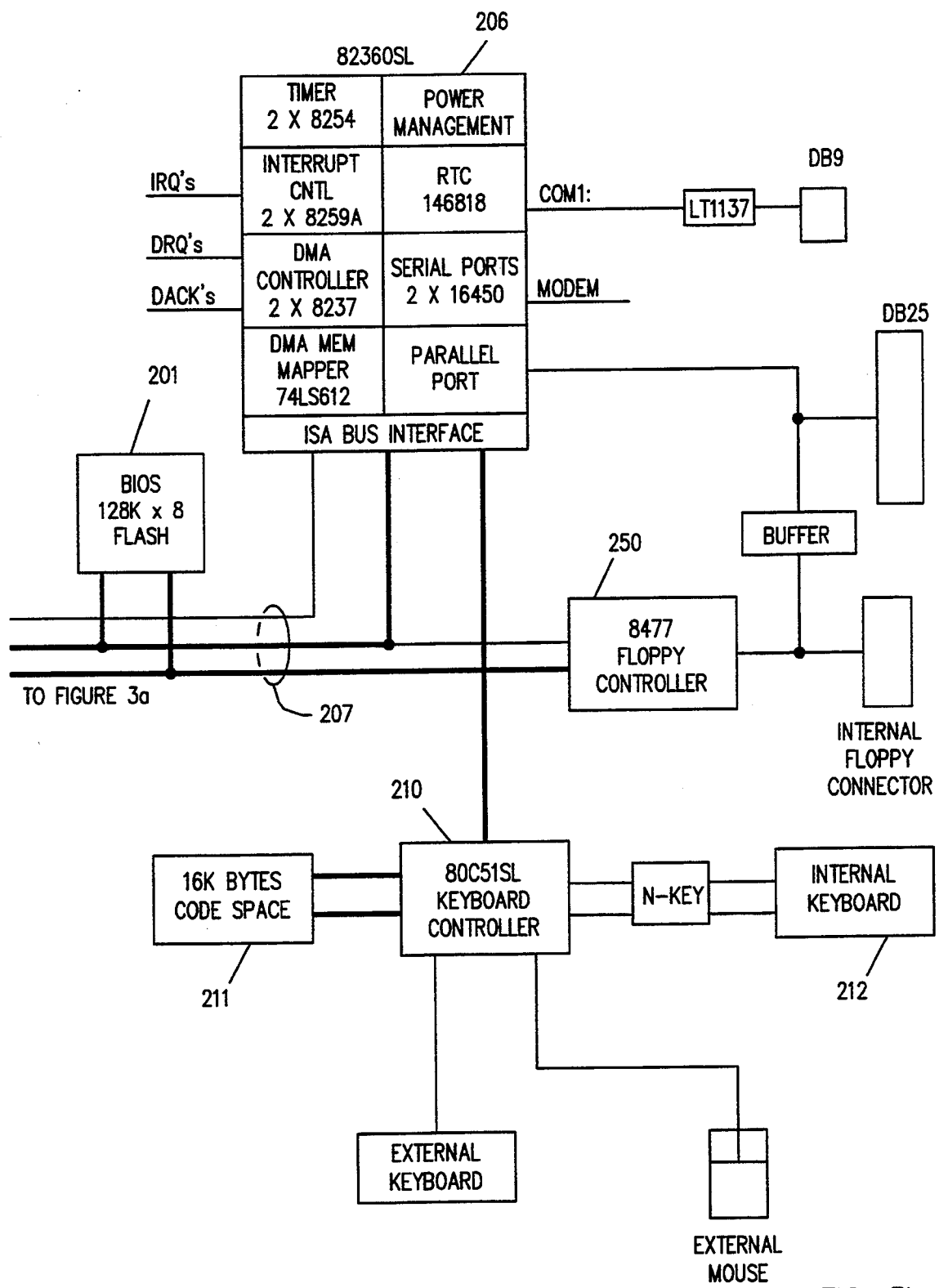
Figure 4A:
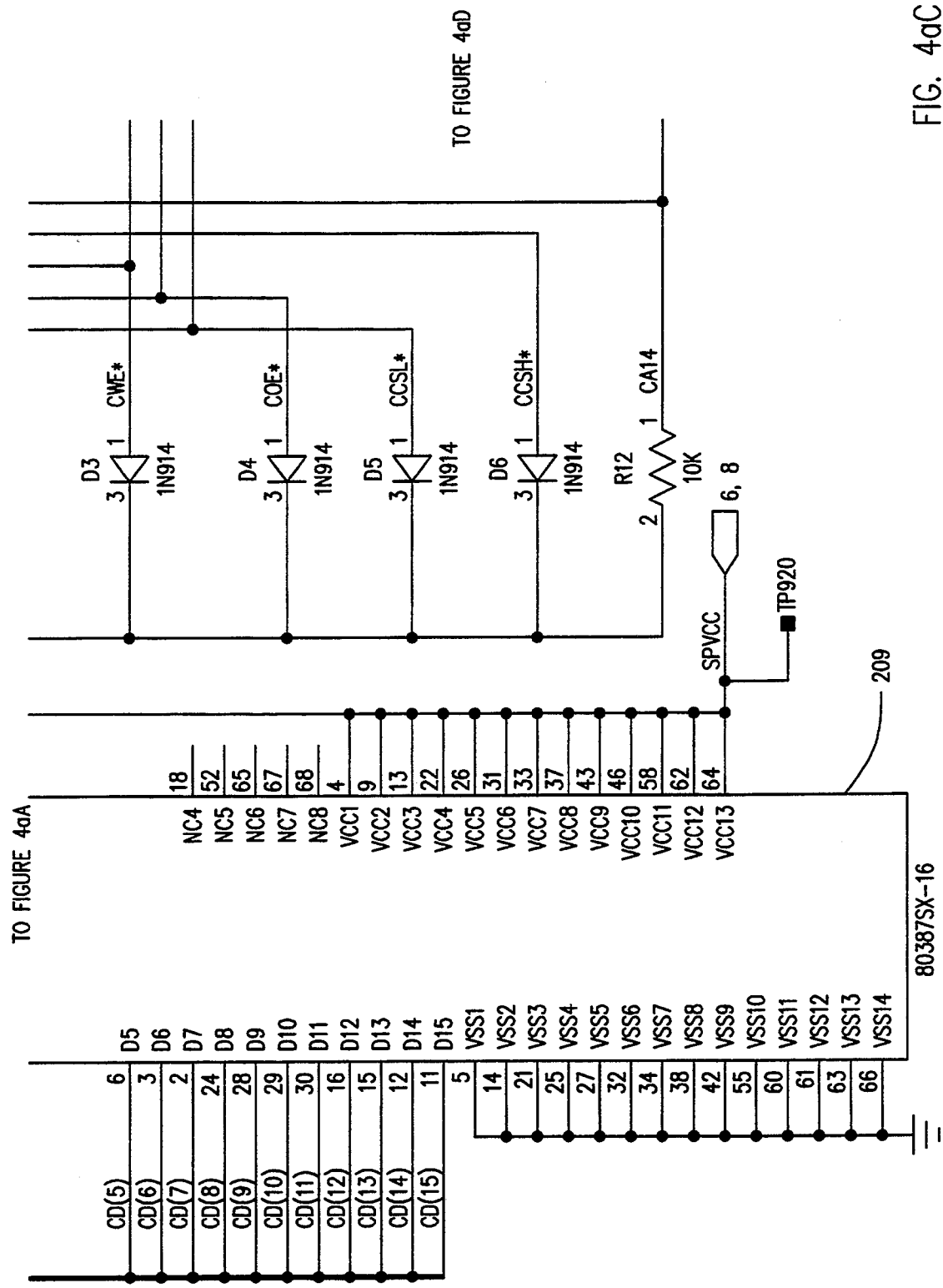
Figure 4A:
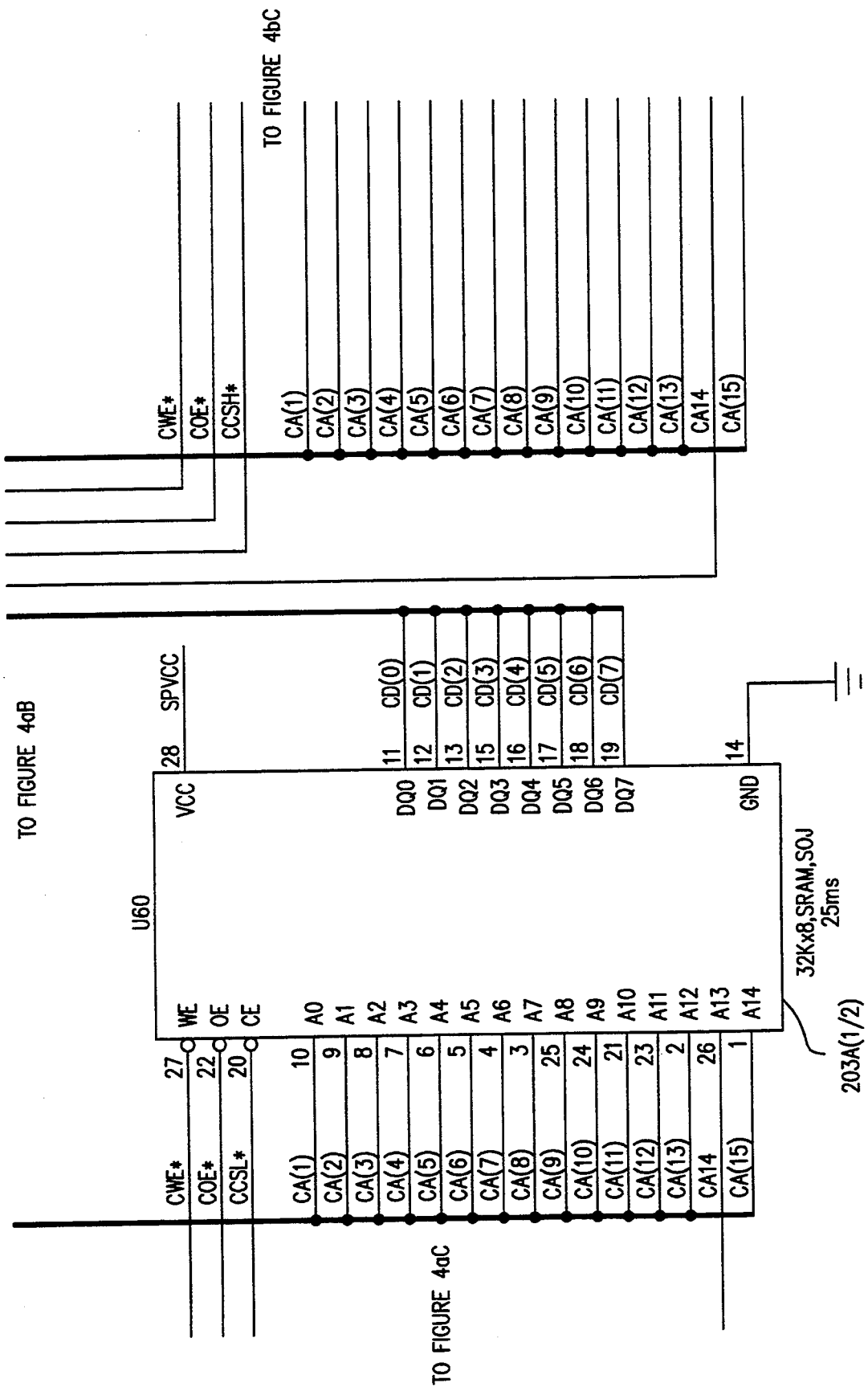
Figure 4A:
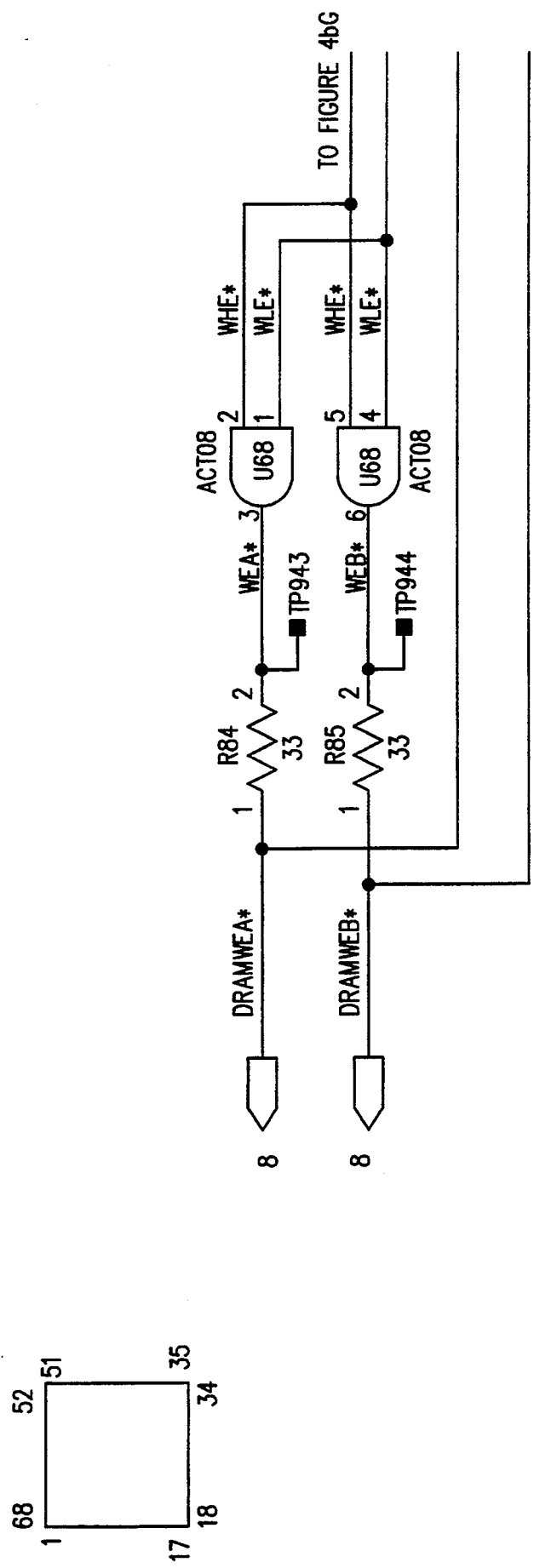
Figure 4A:
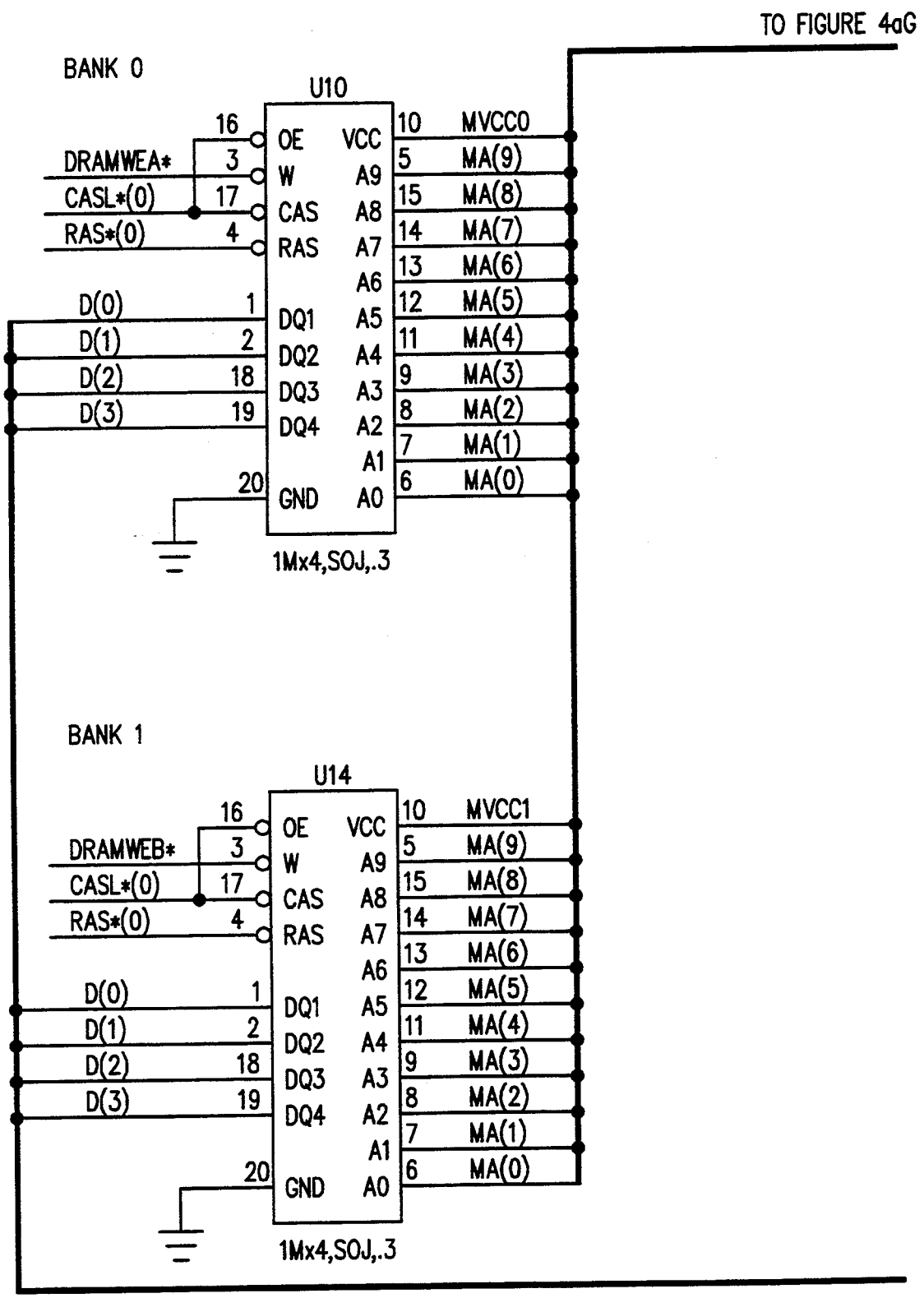
Figure 4A:
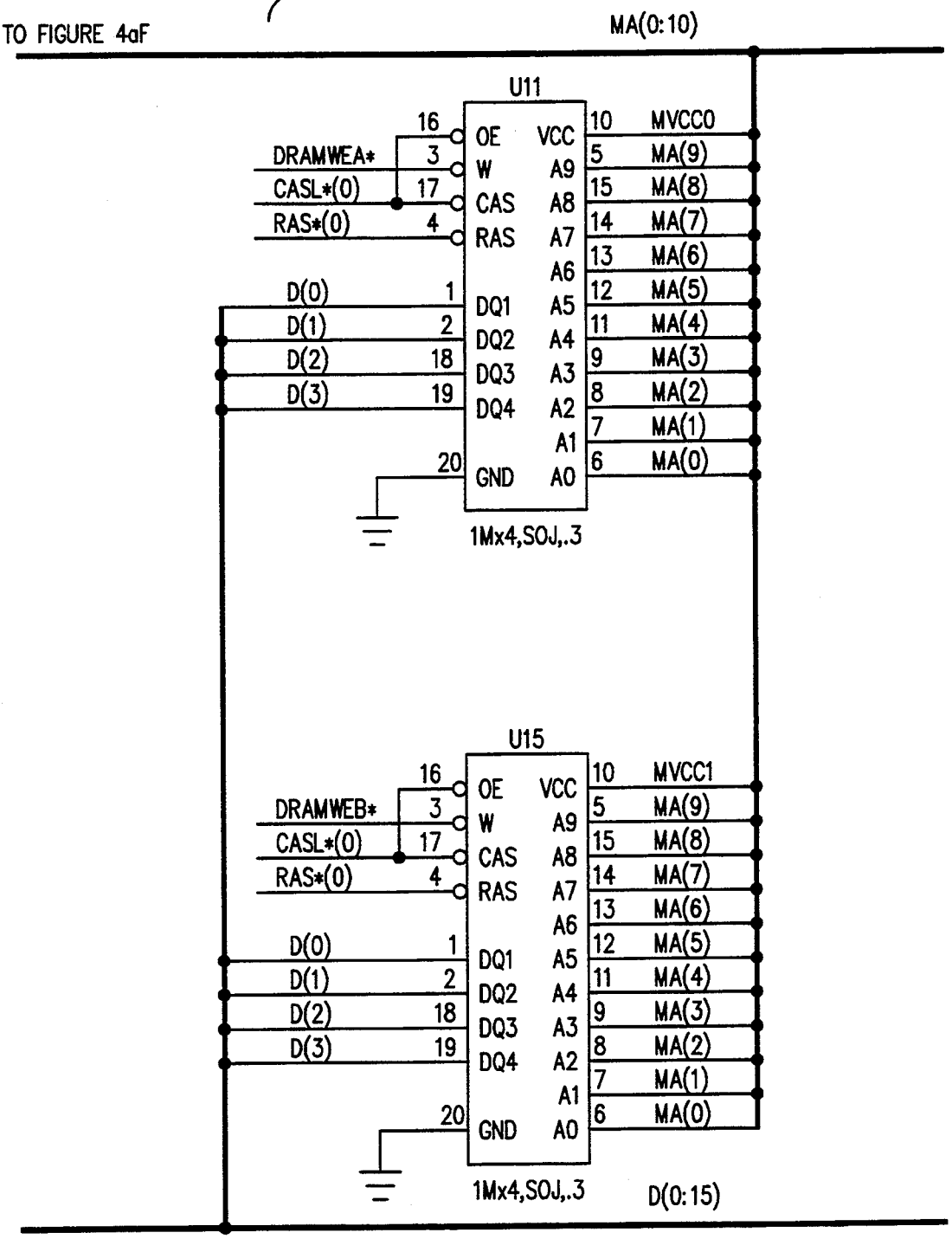
Figure 4A:
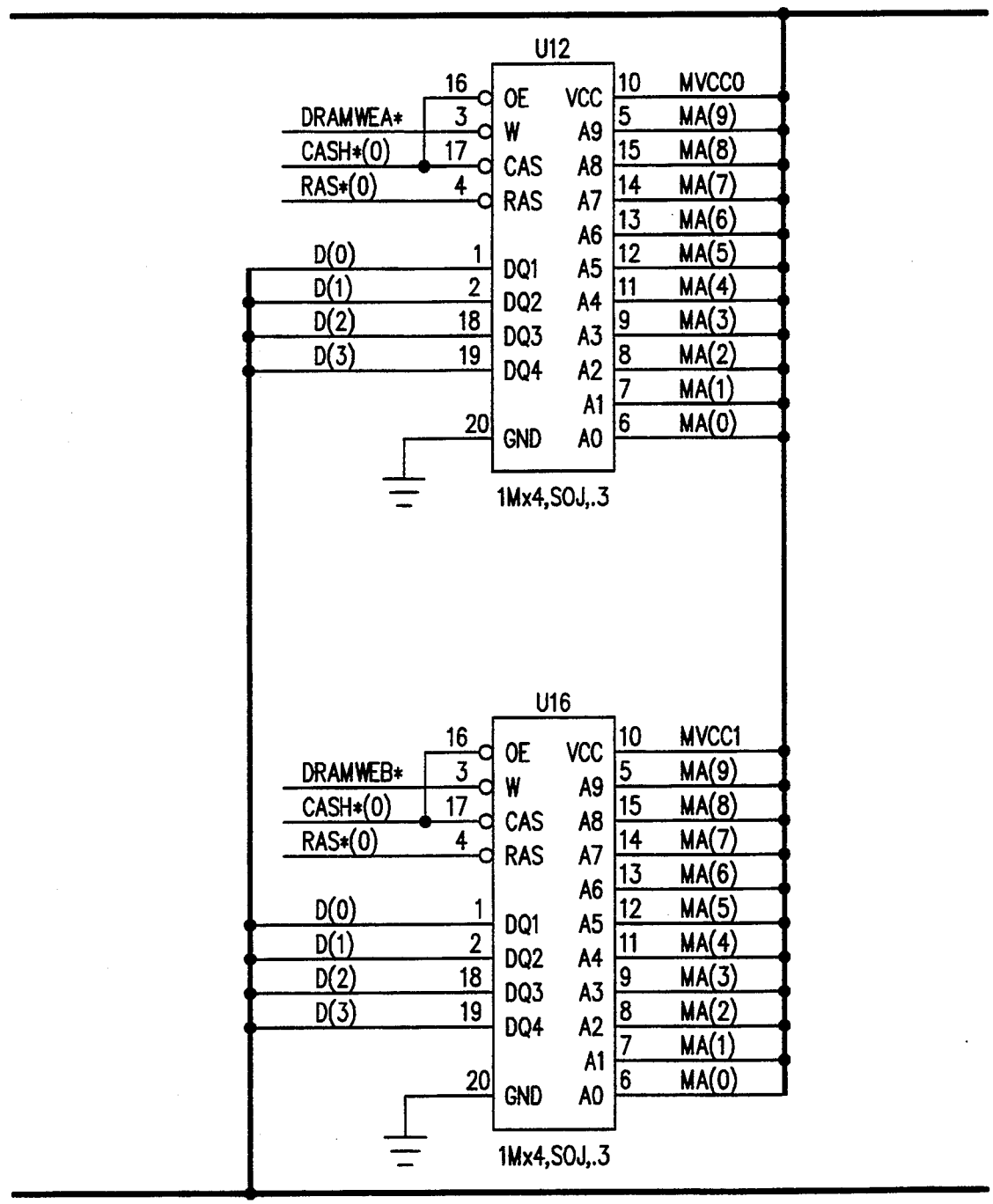
Figure 4A:
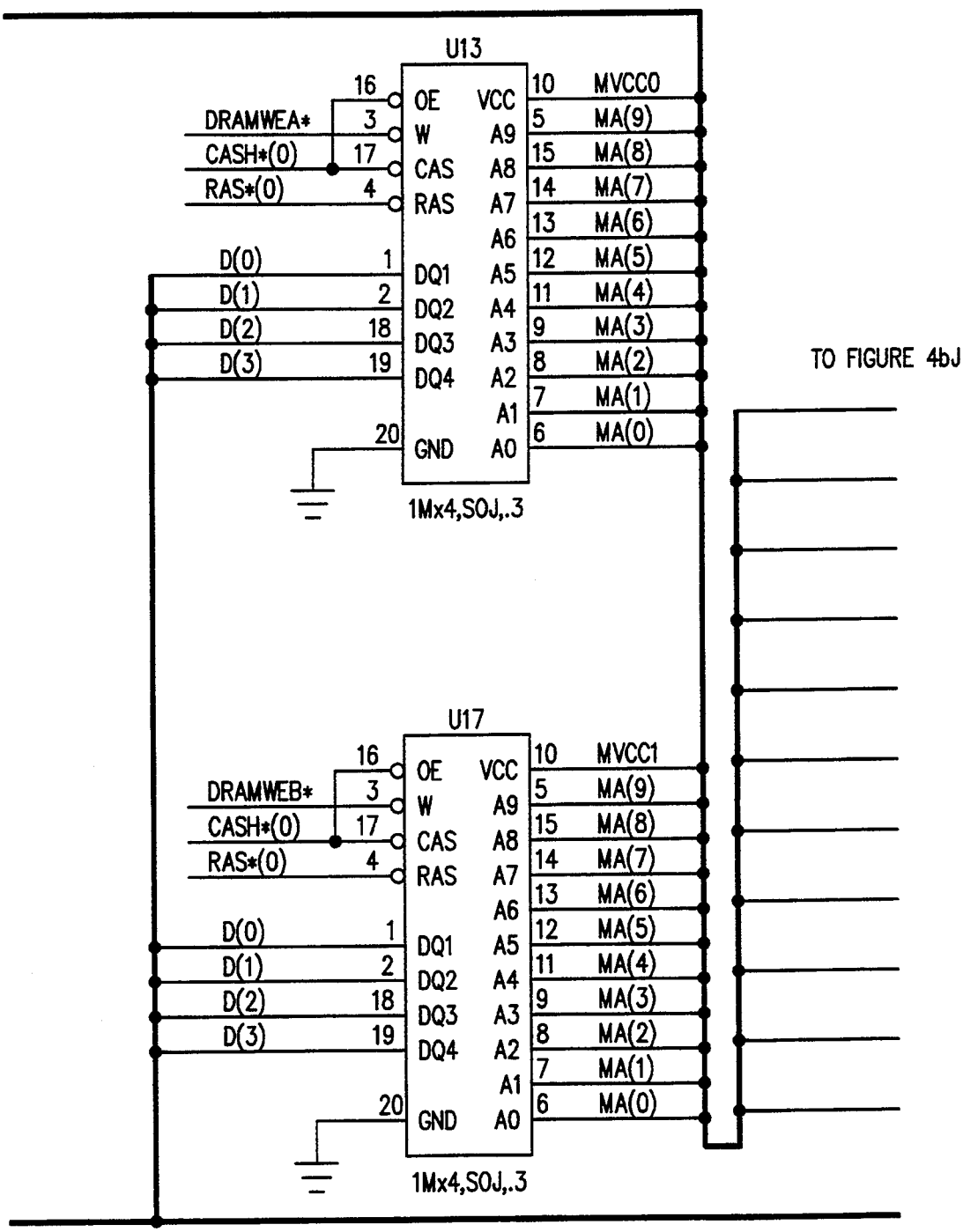
Figure 4B:
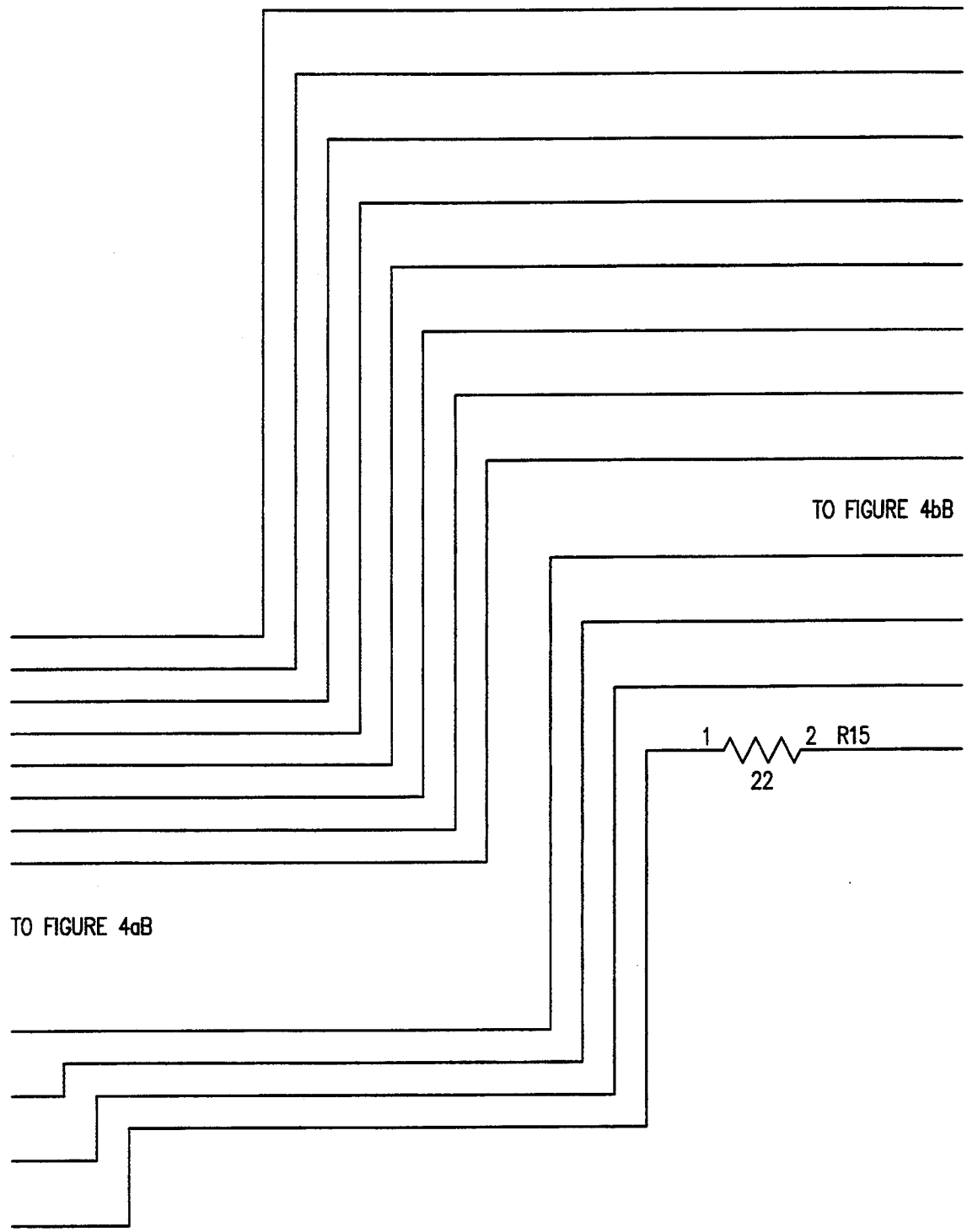
Figure 4B:
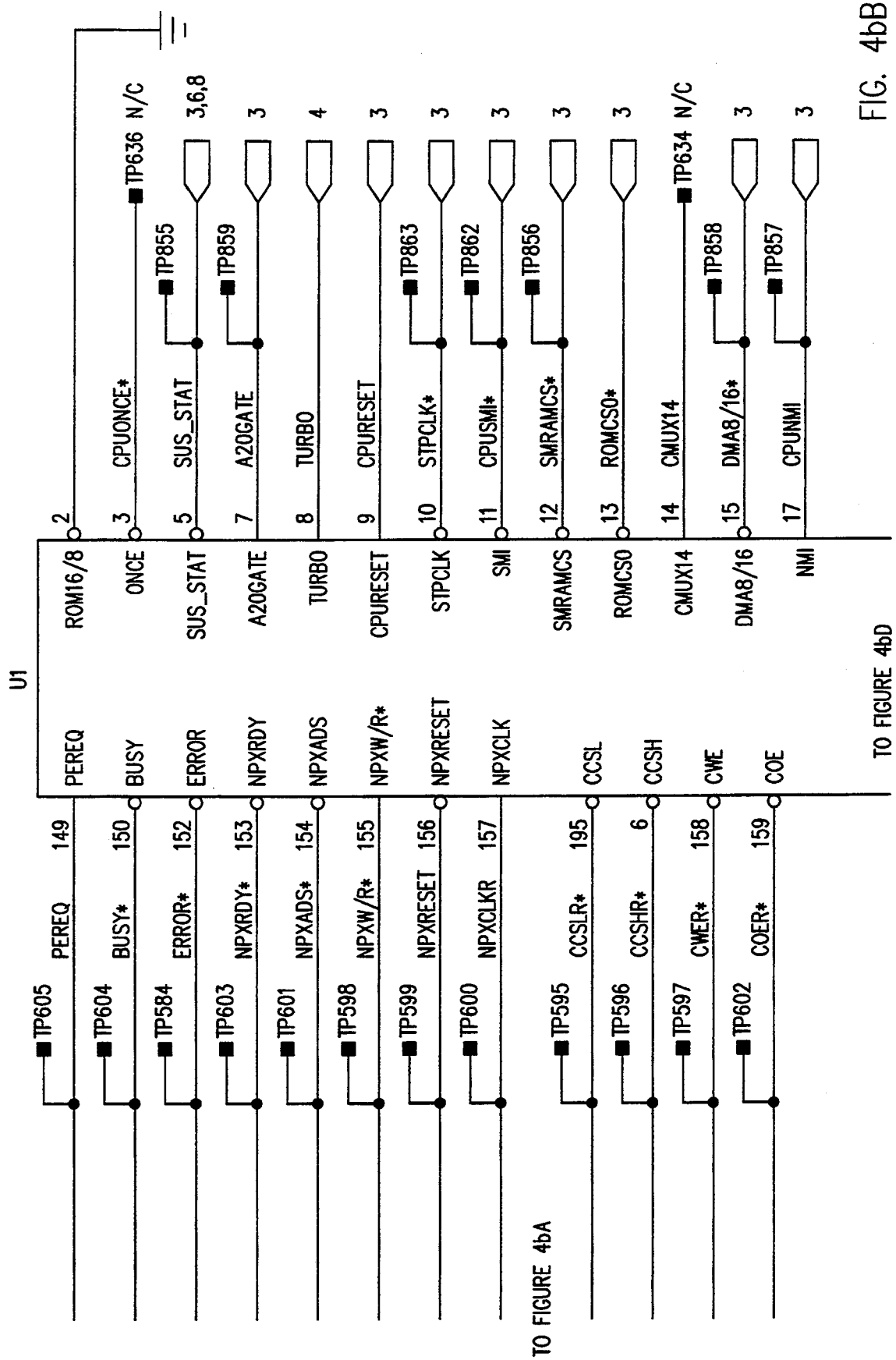
Figure 4B:
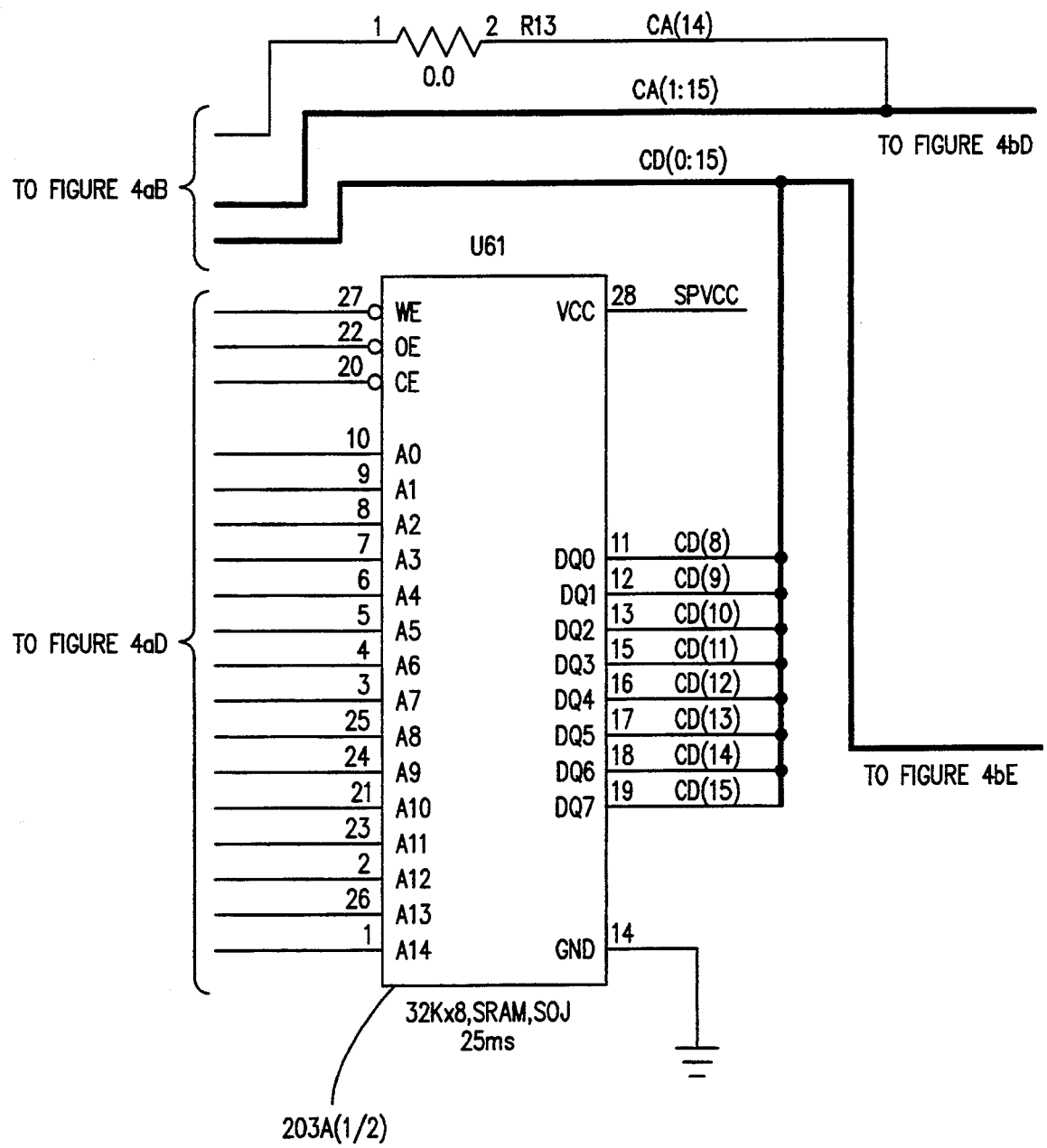
Figure 4B:
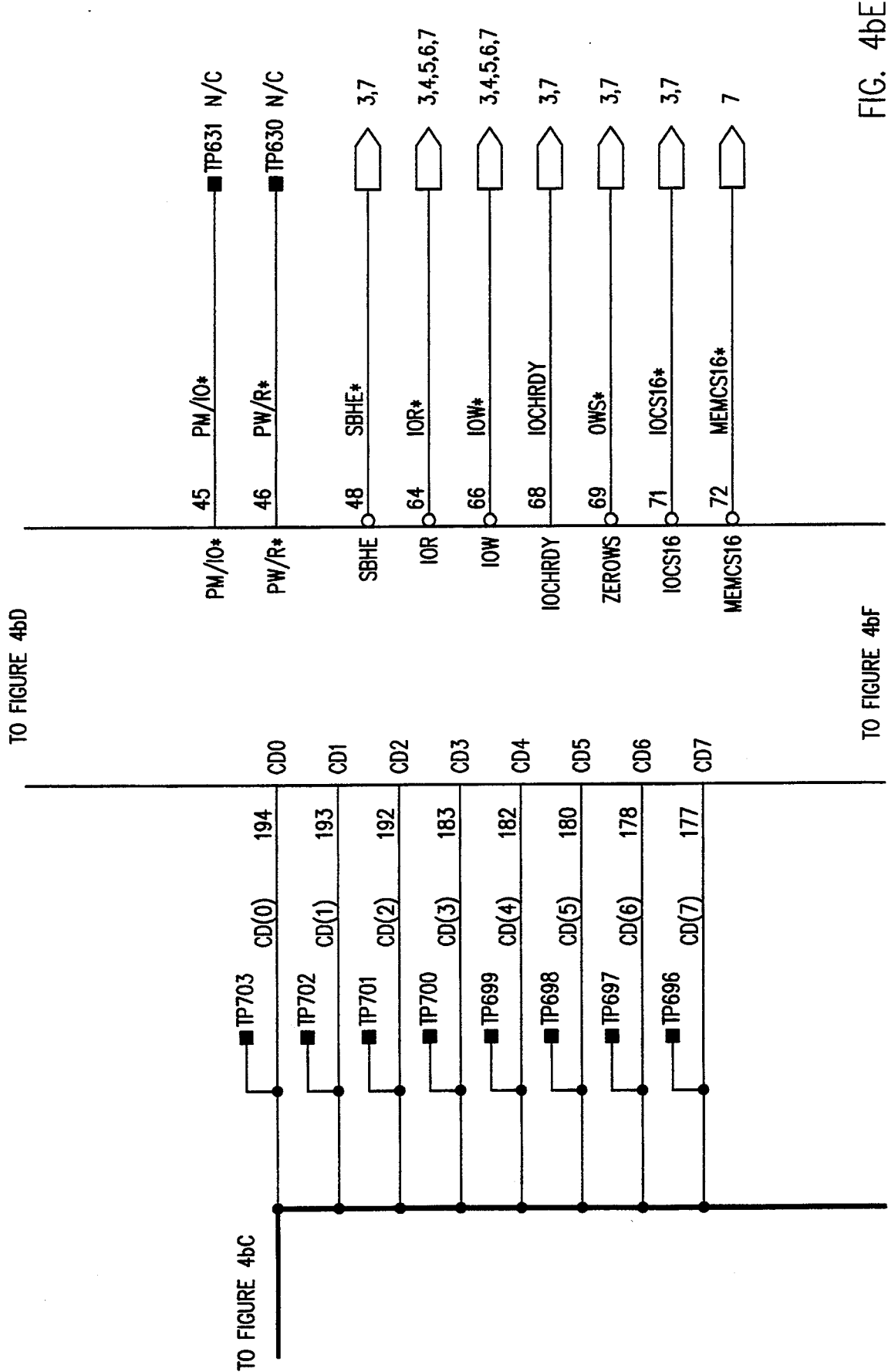
Figure 4B:
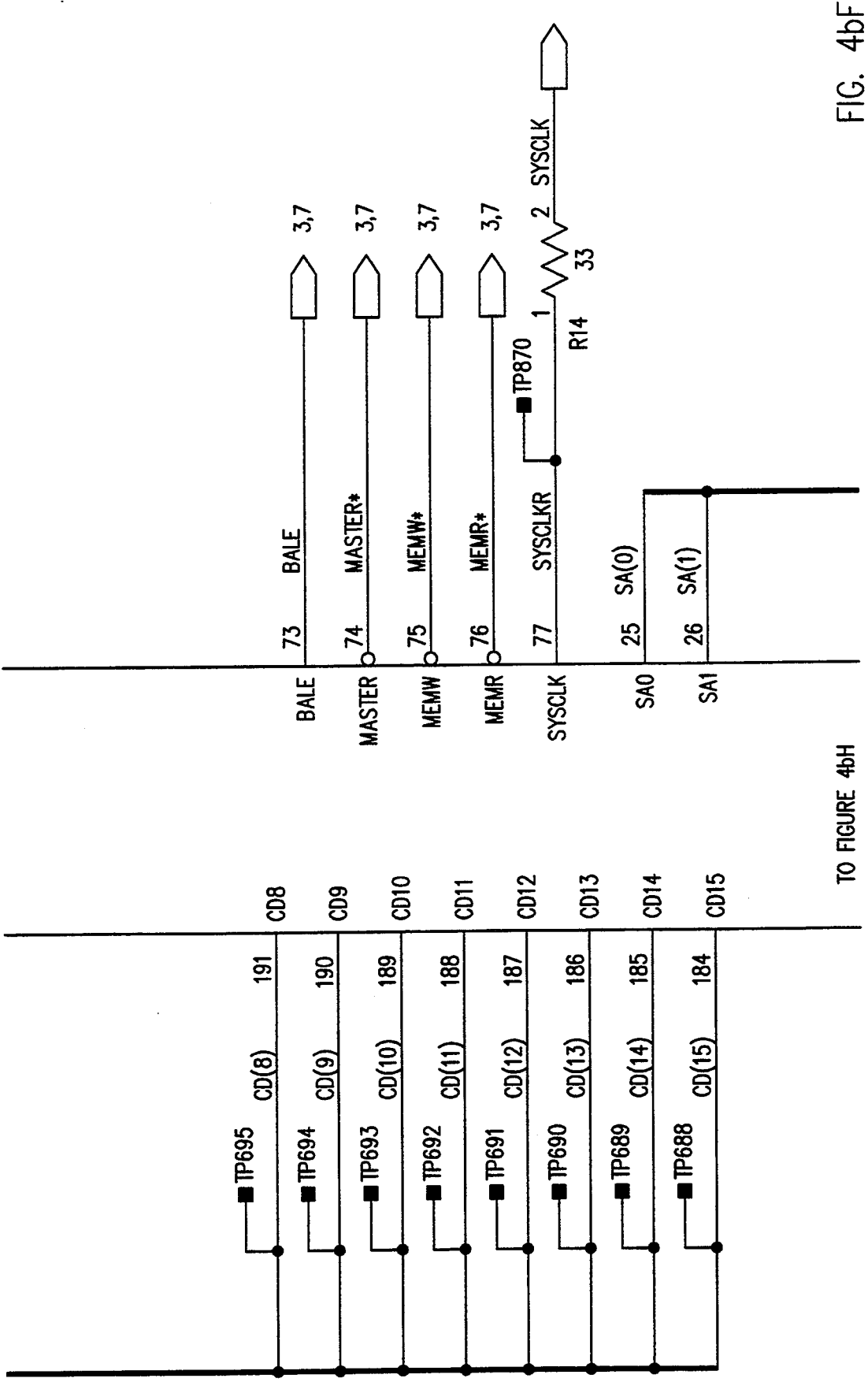
Figure 4B:
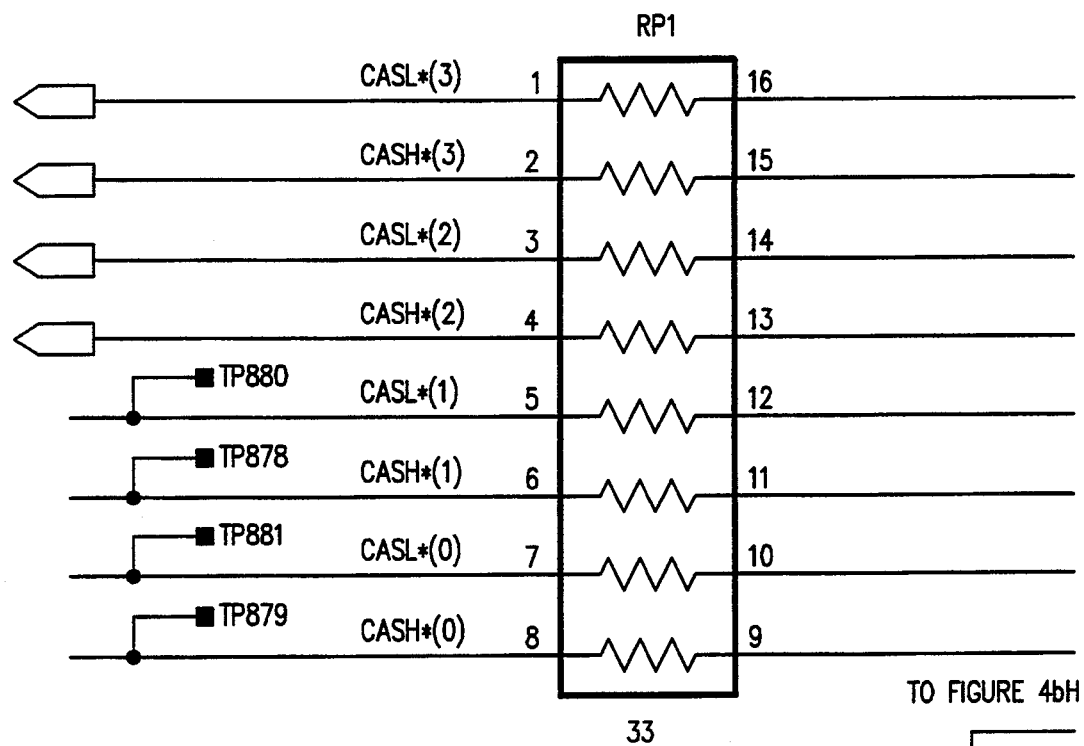
Figure 4B:
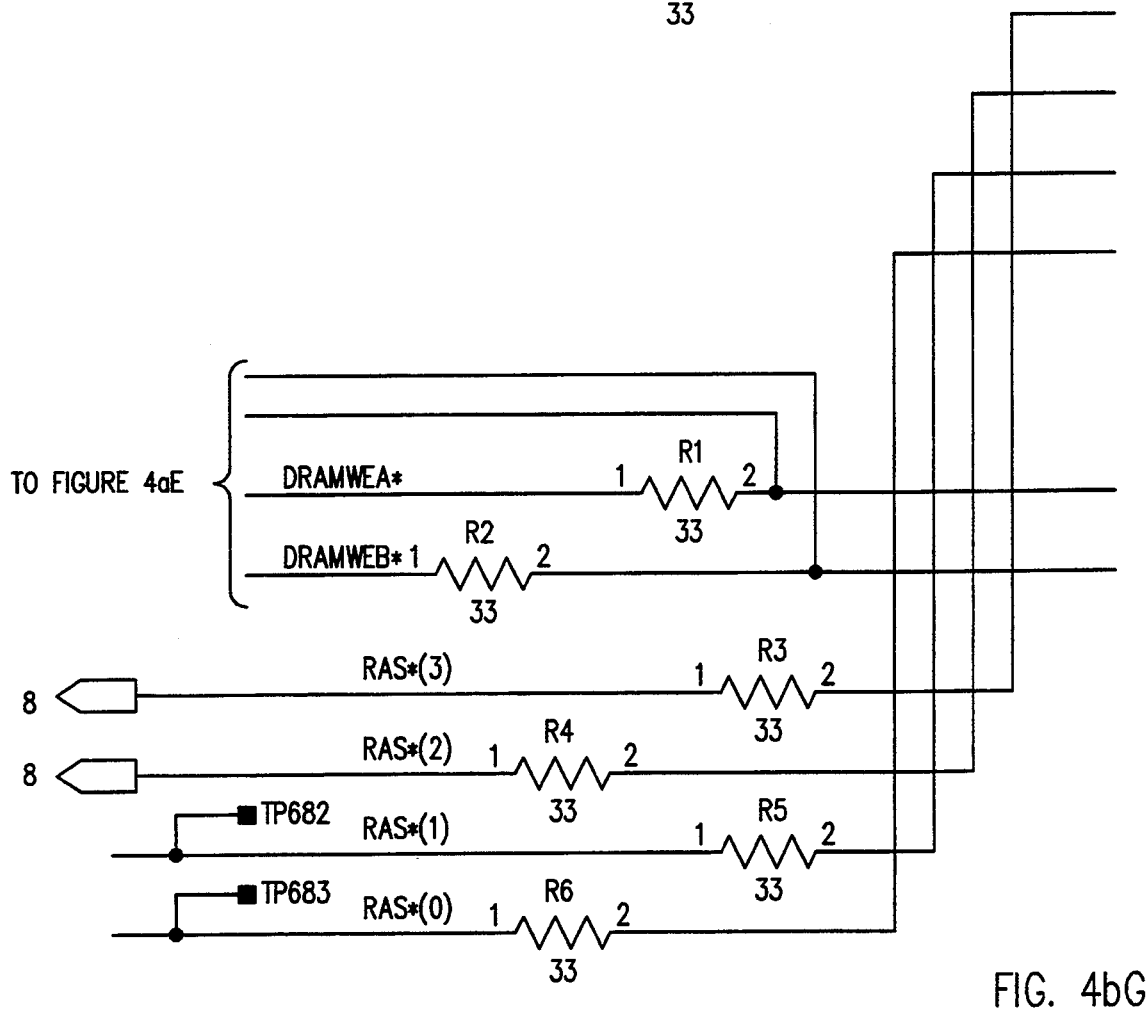
Figure 4B:
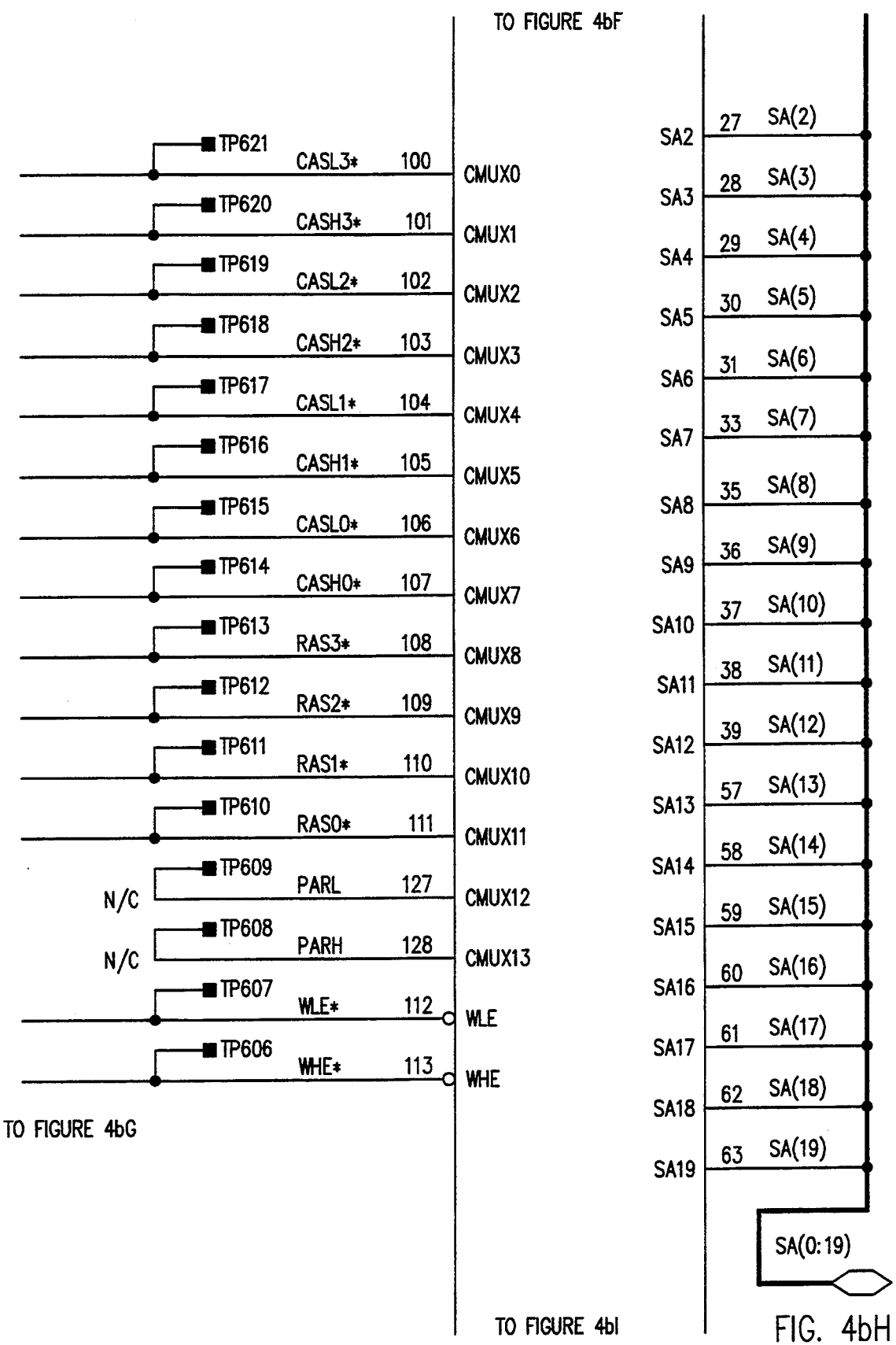
Figure 4B:
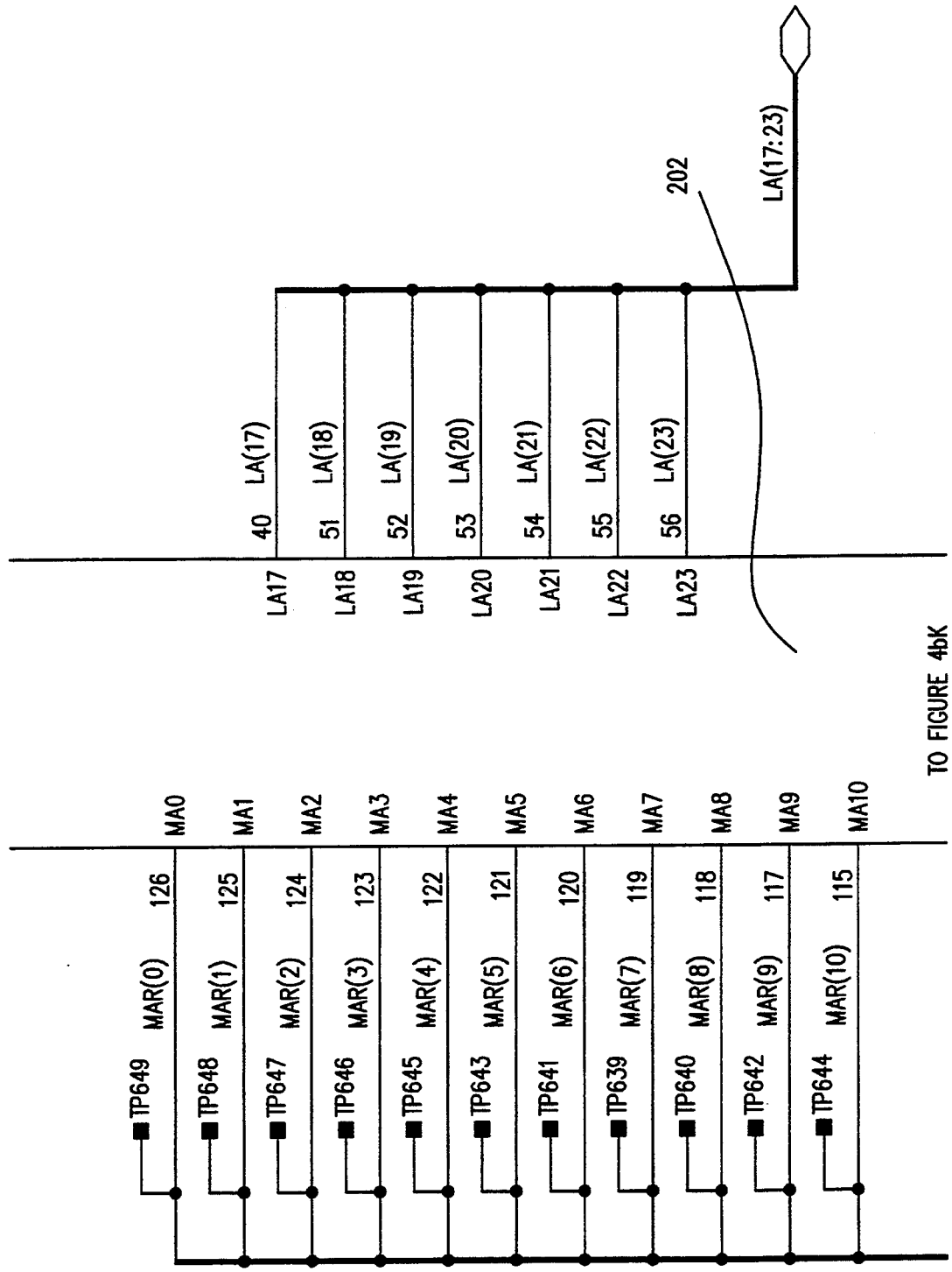
Figure 4B:
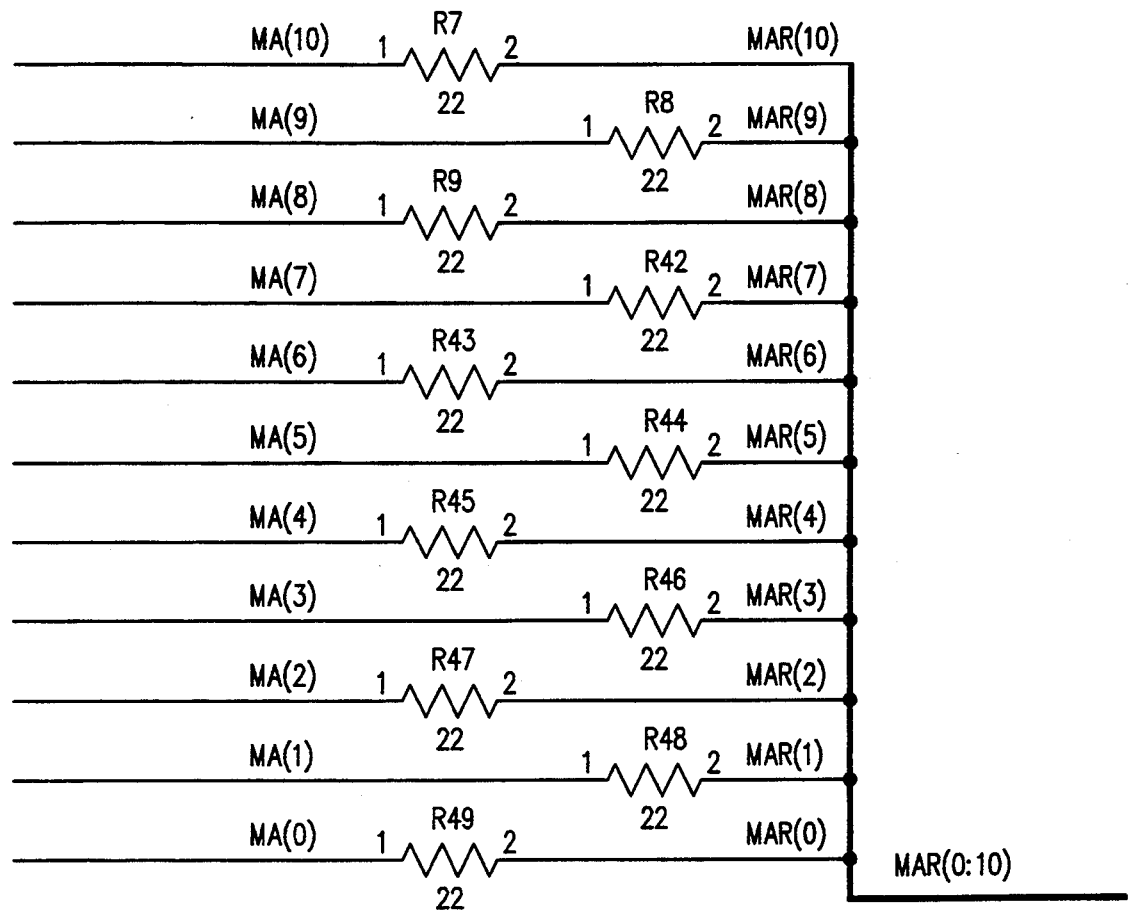
Figure 4B:
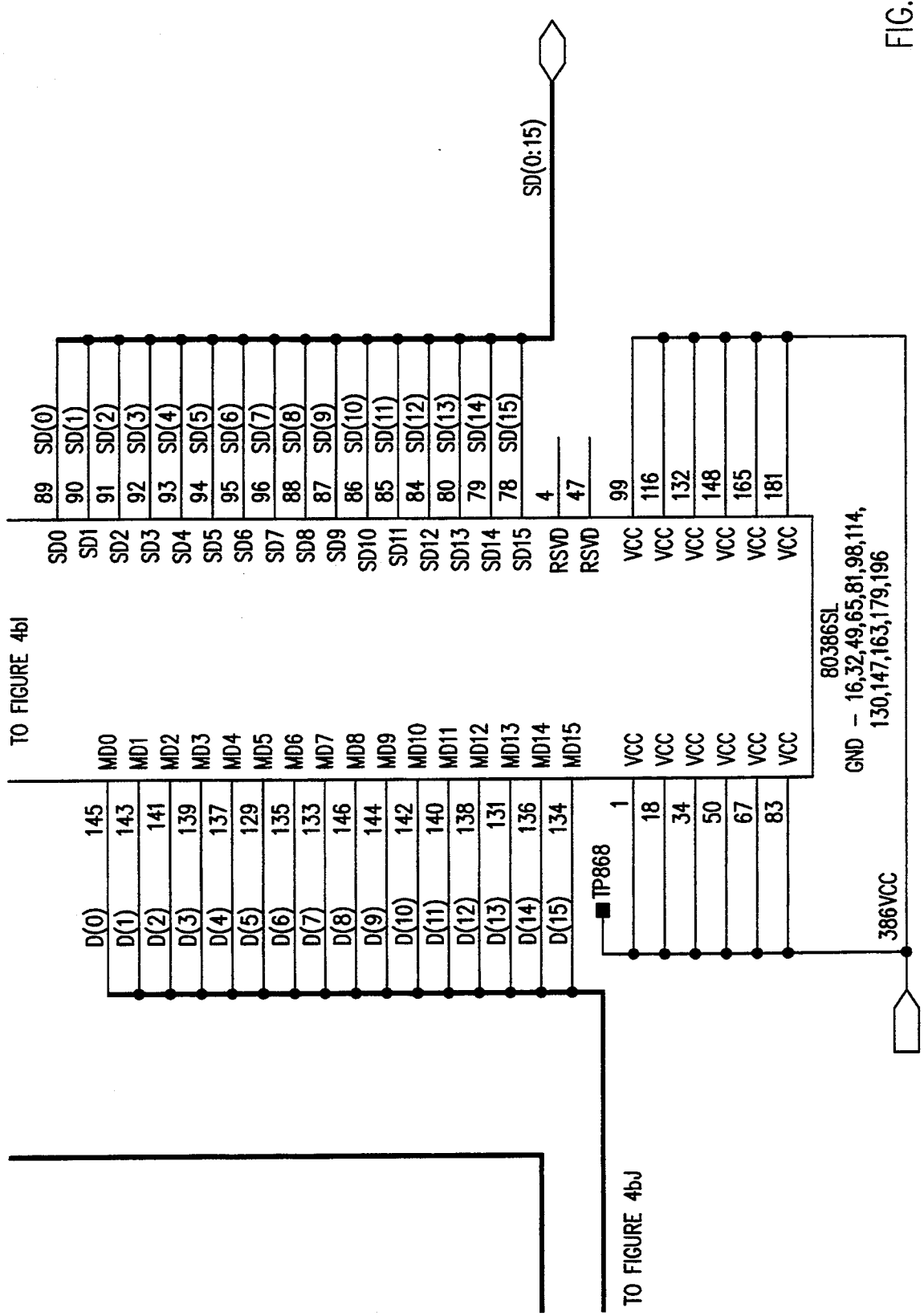
Figure 5A:
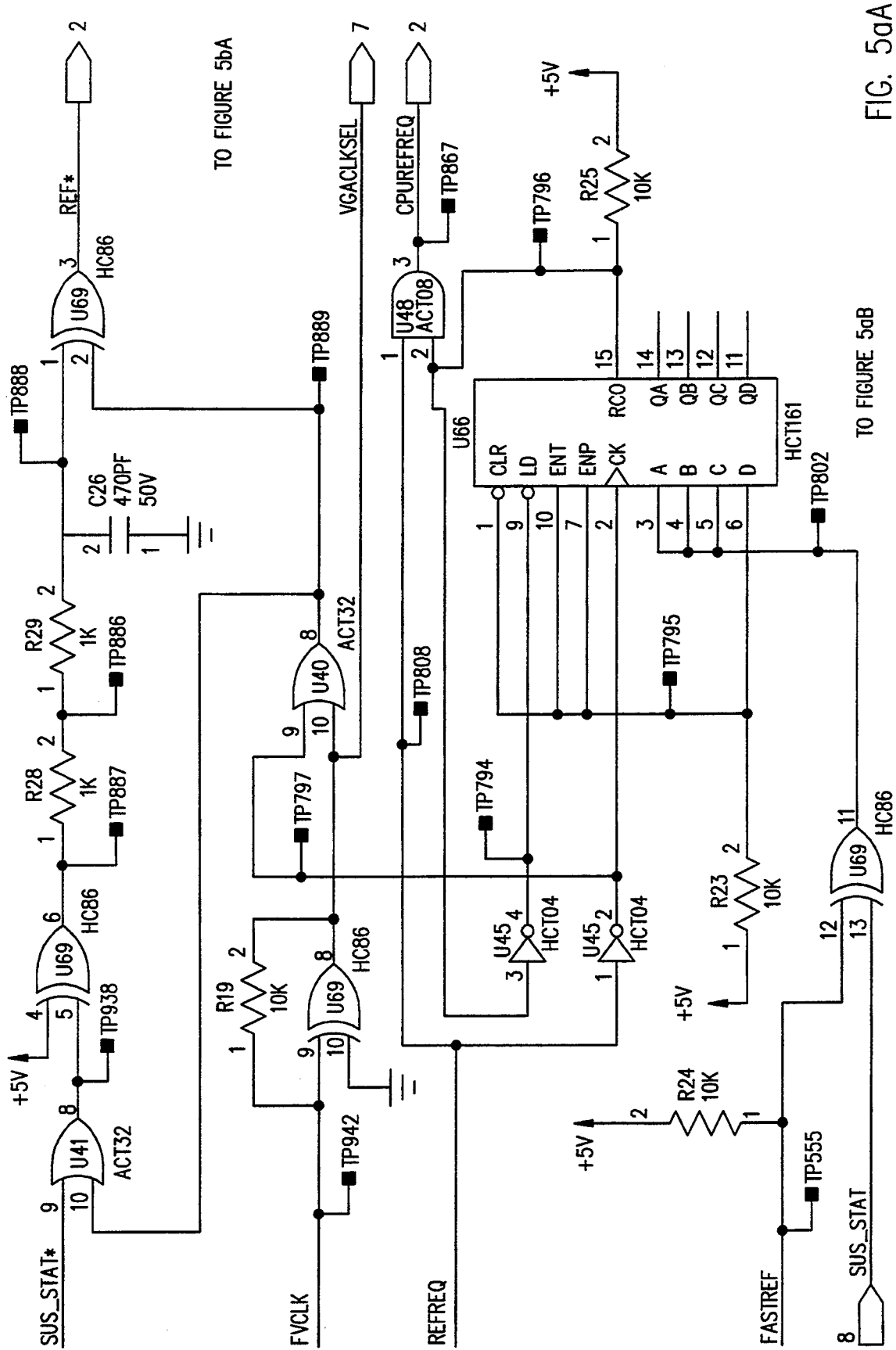
Figure 5A:
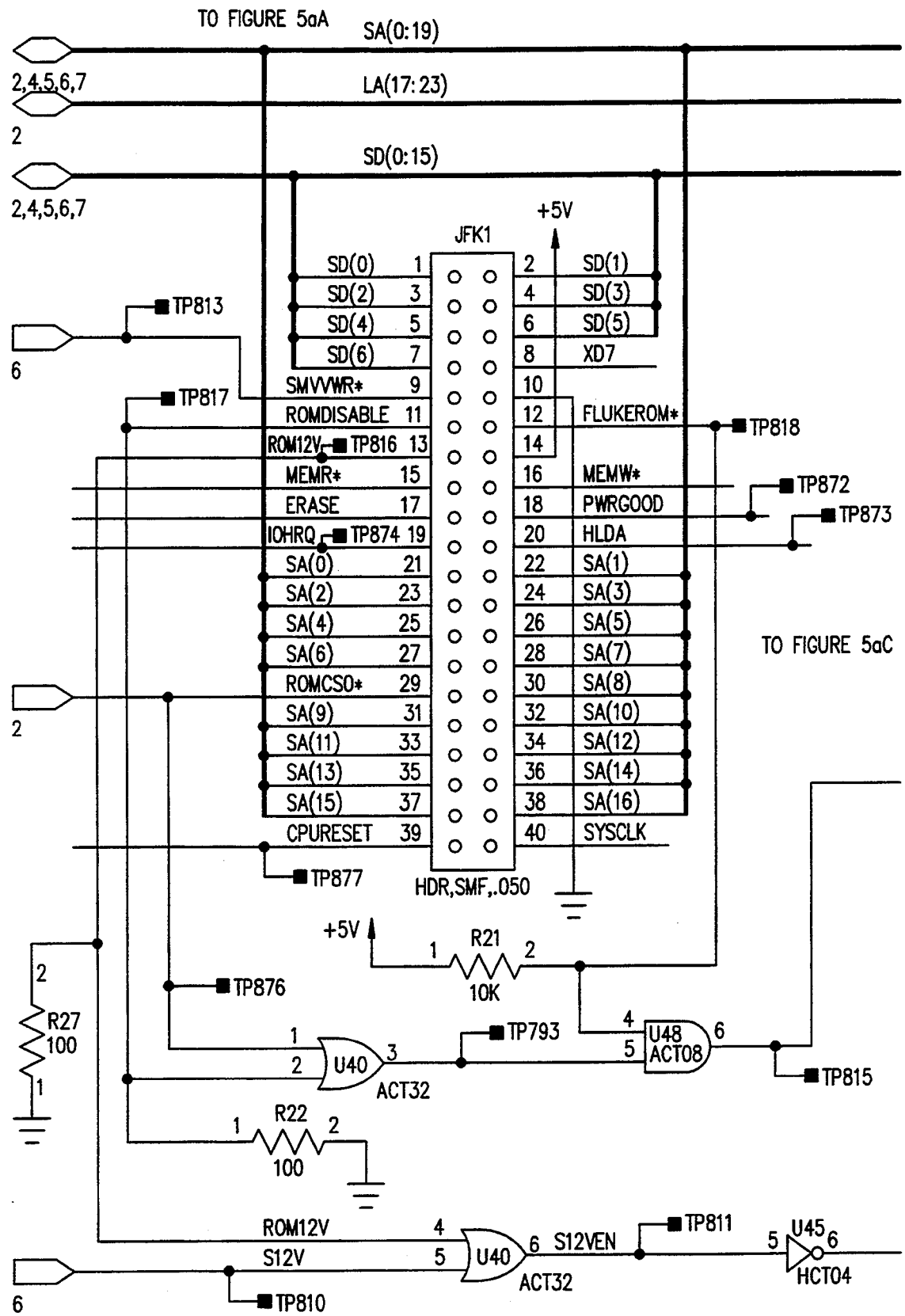
Figure 5A:
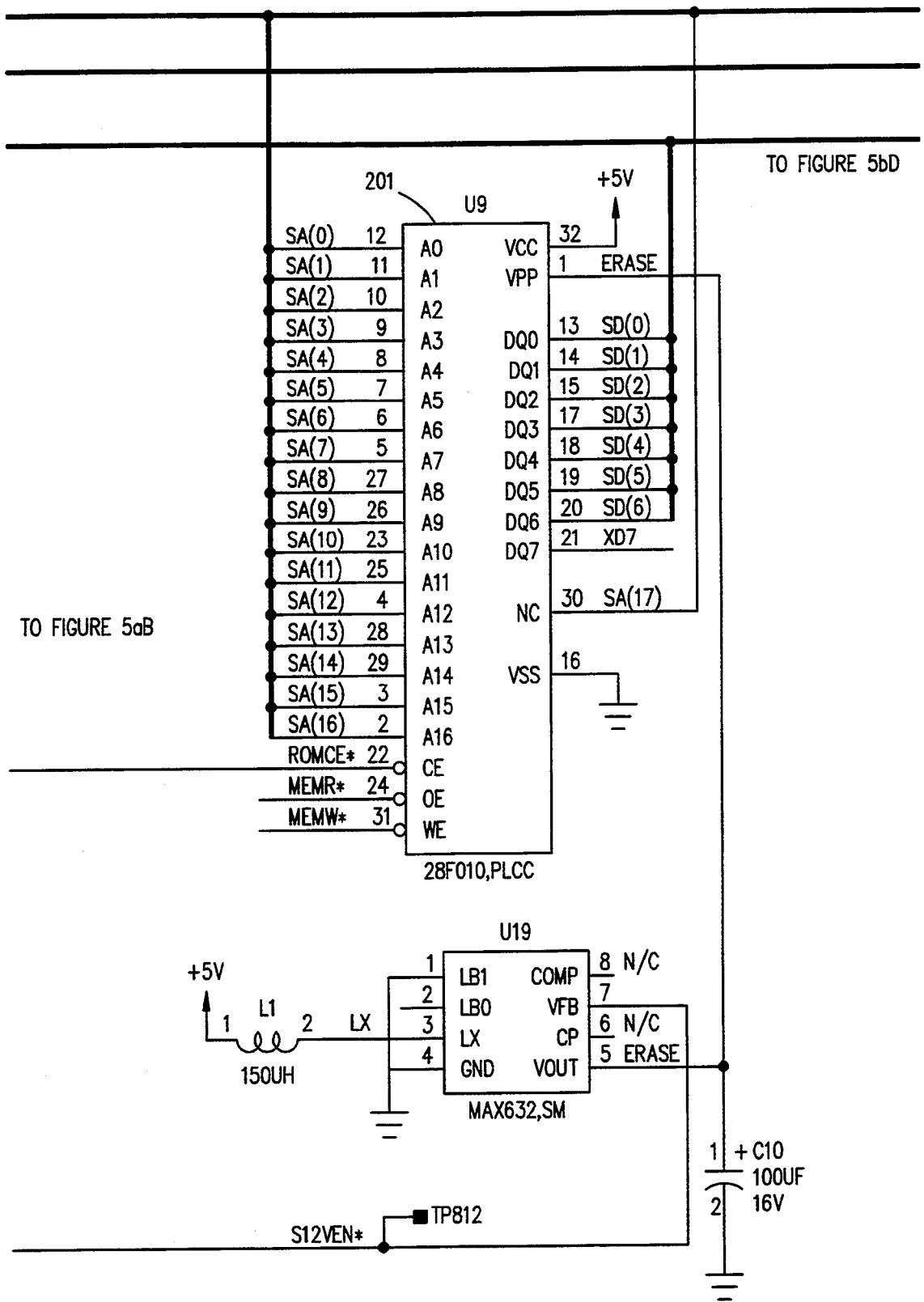
Figure 5B:
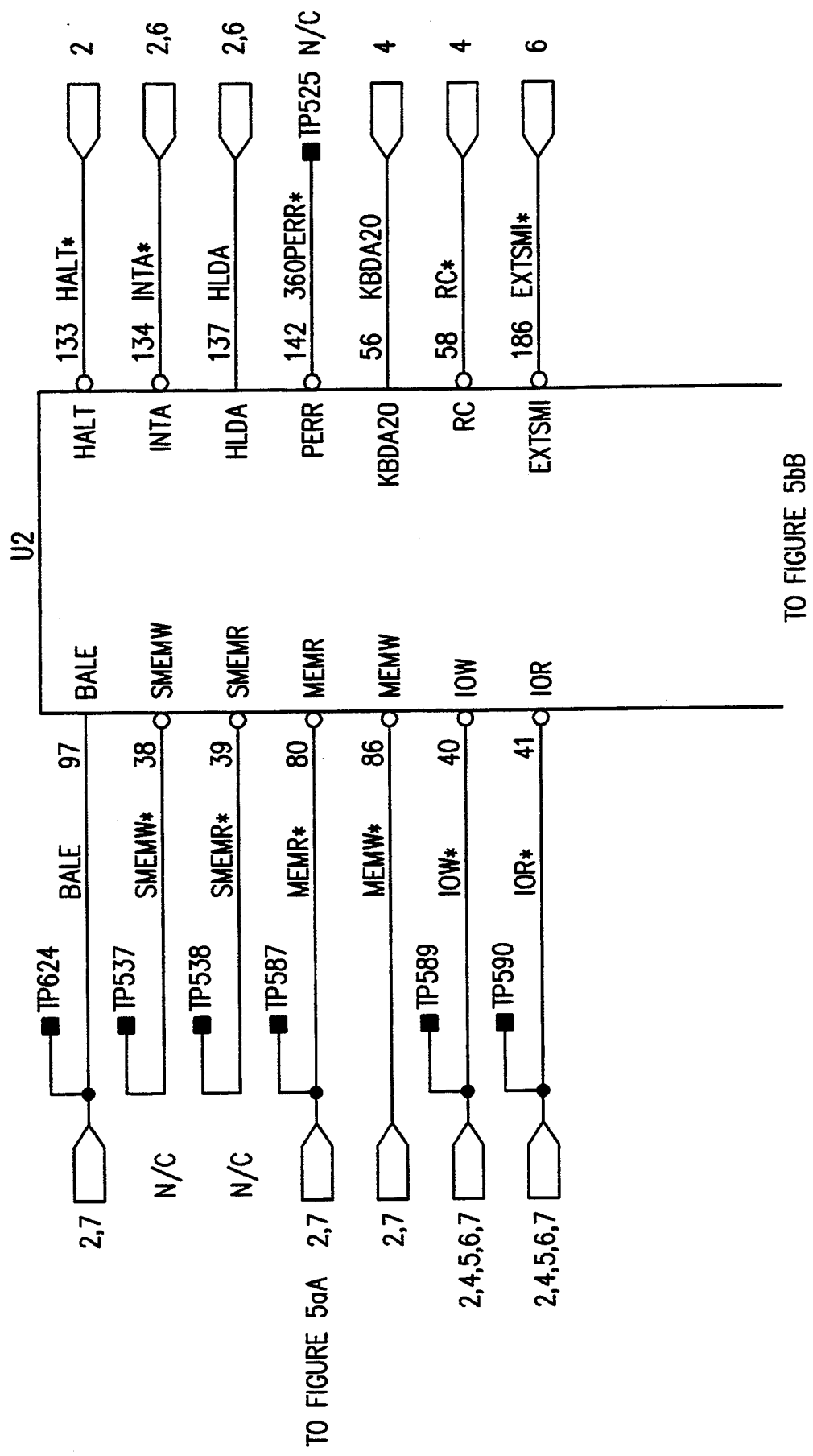
Figure 5B:
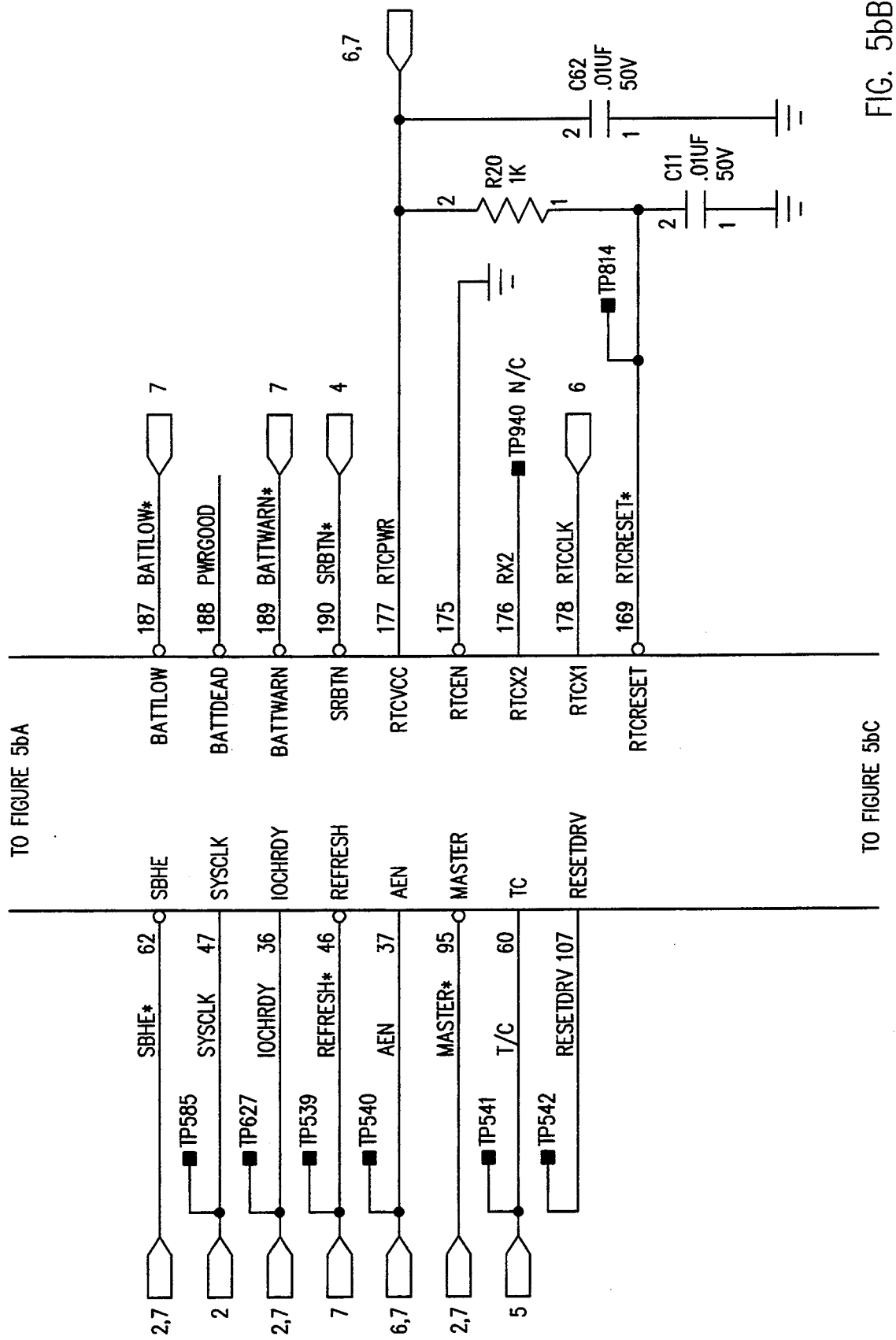
Figure 5B:
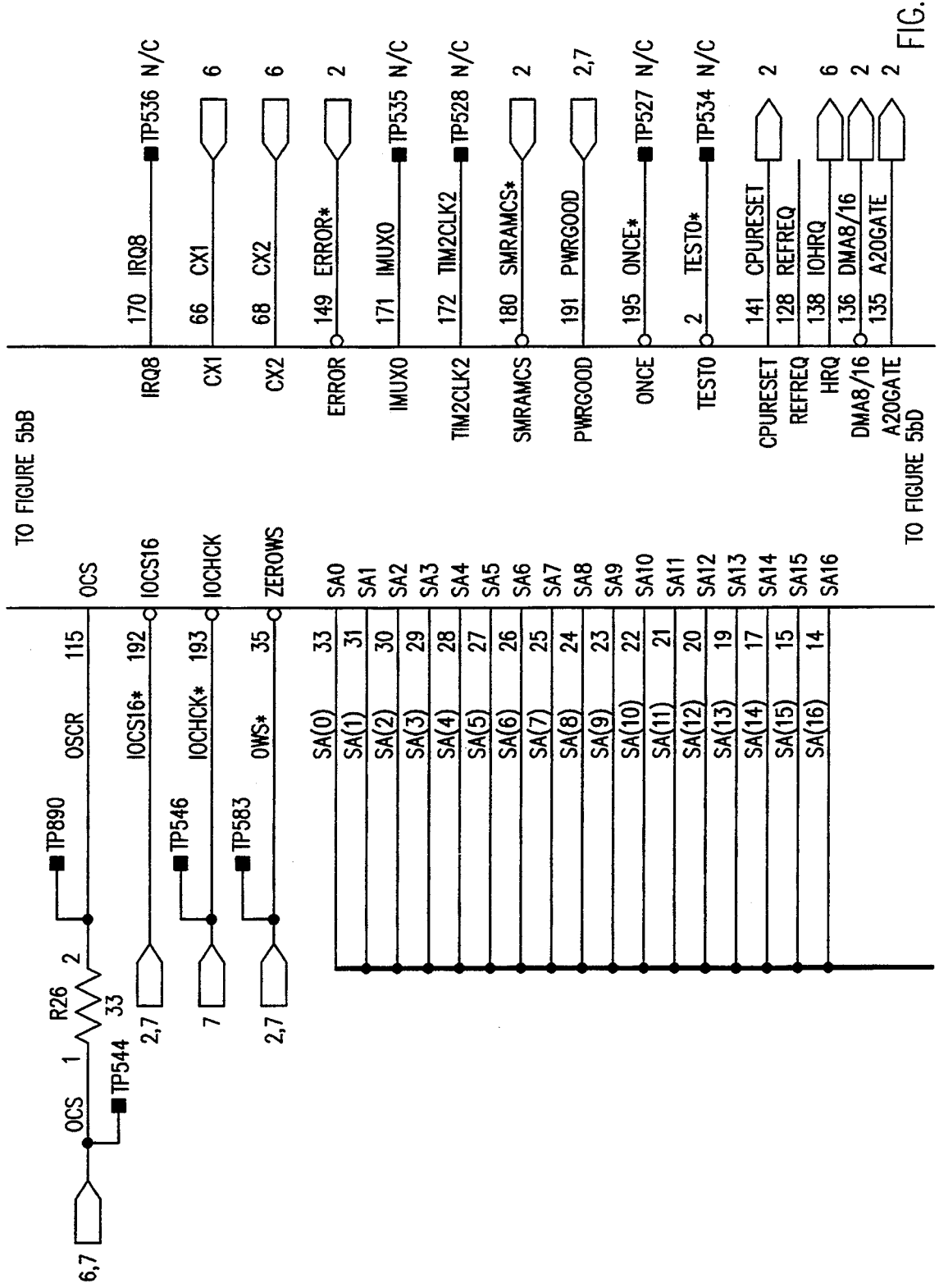
Figure 5B:
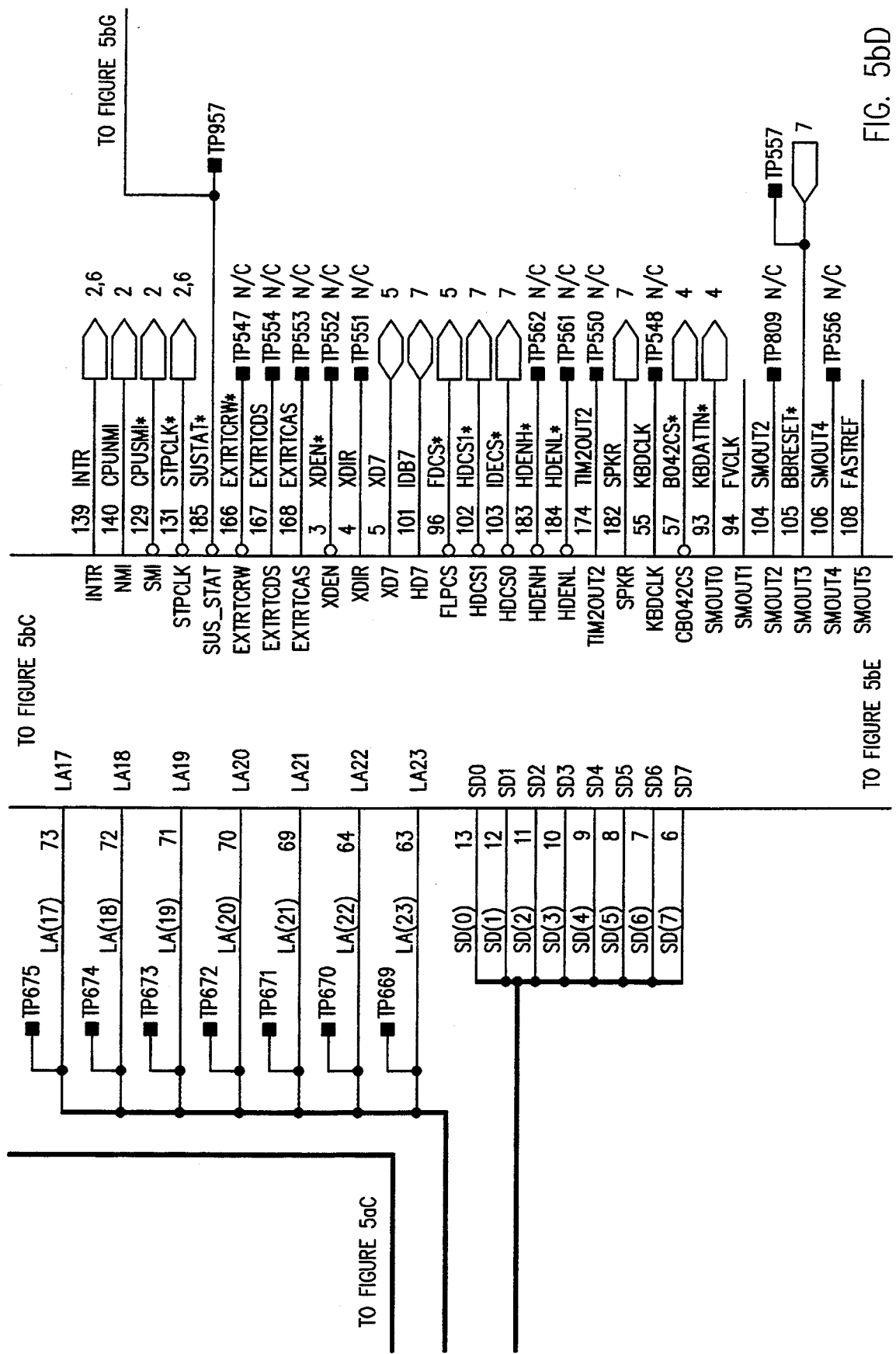
Figure 5B:
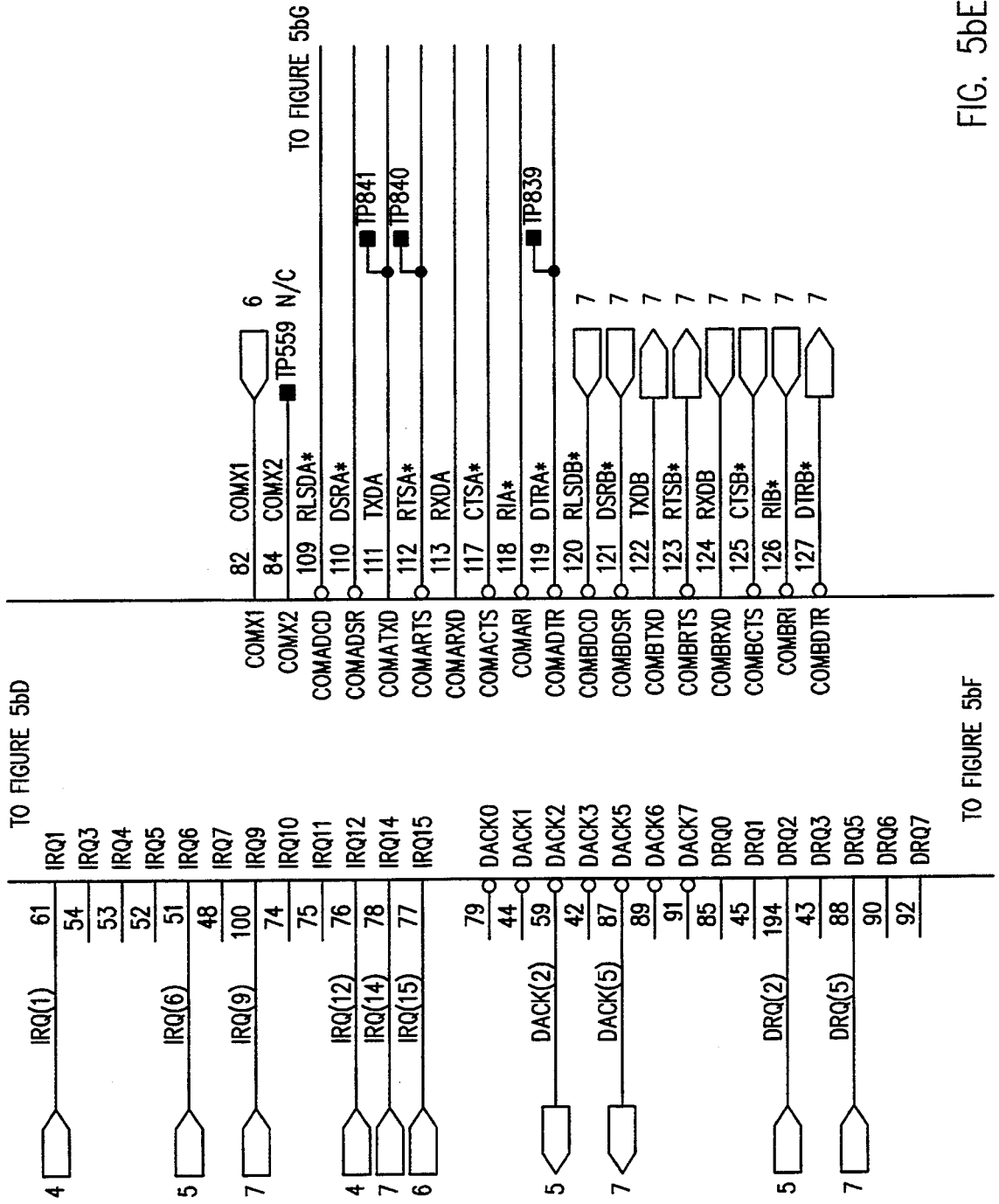
Figure 5B:
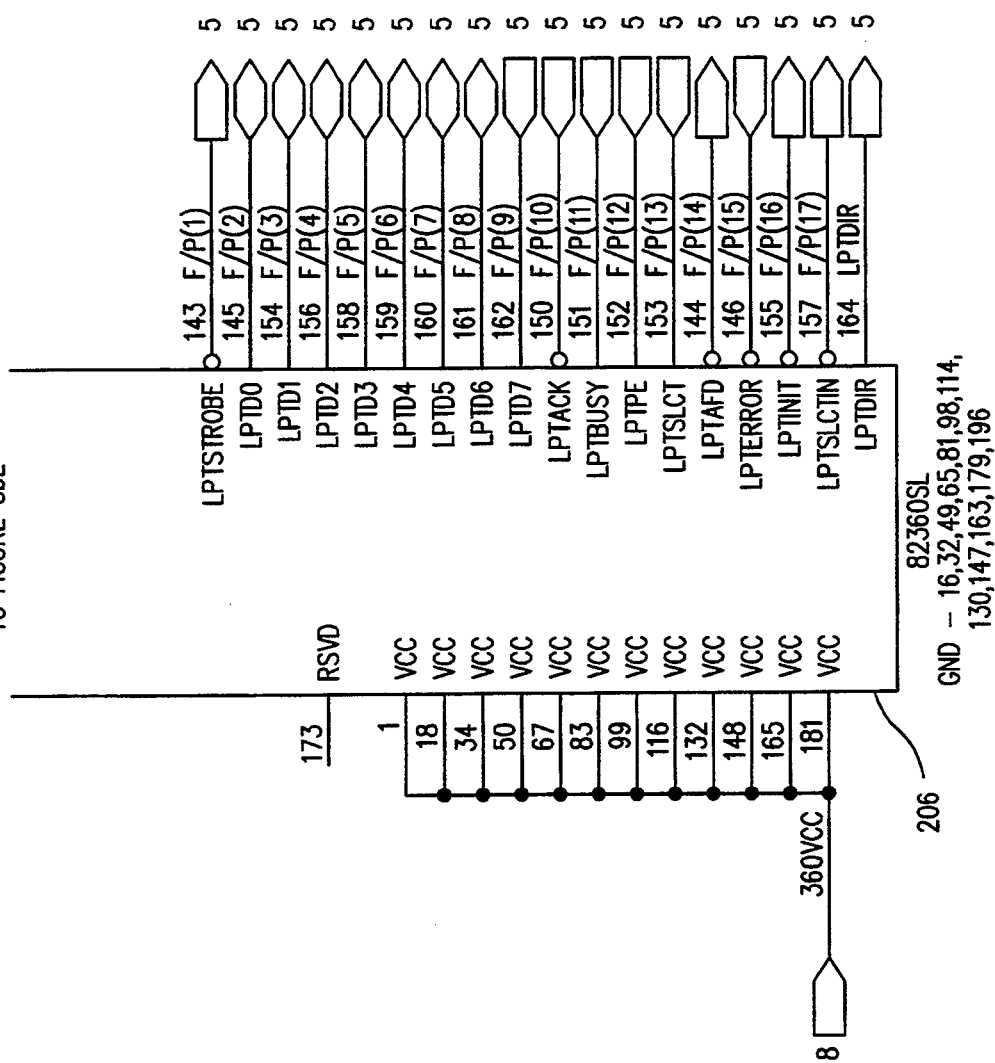
Figure 5B:
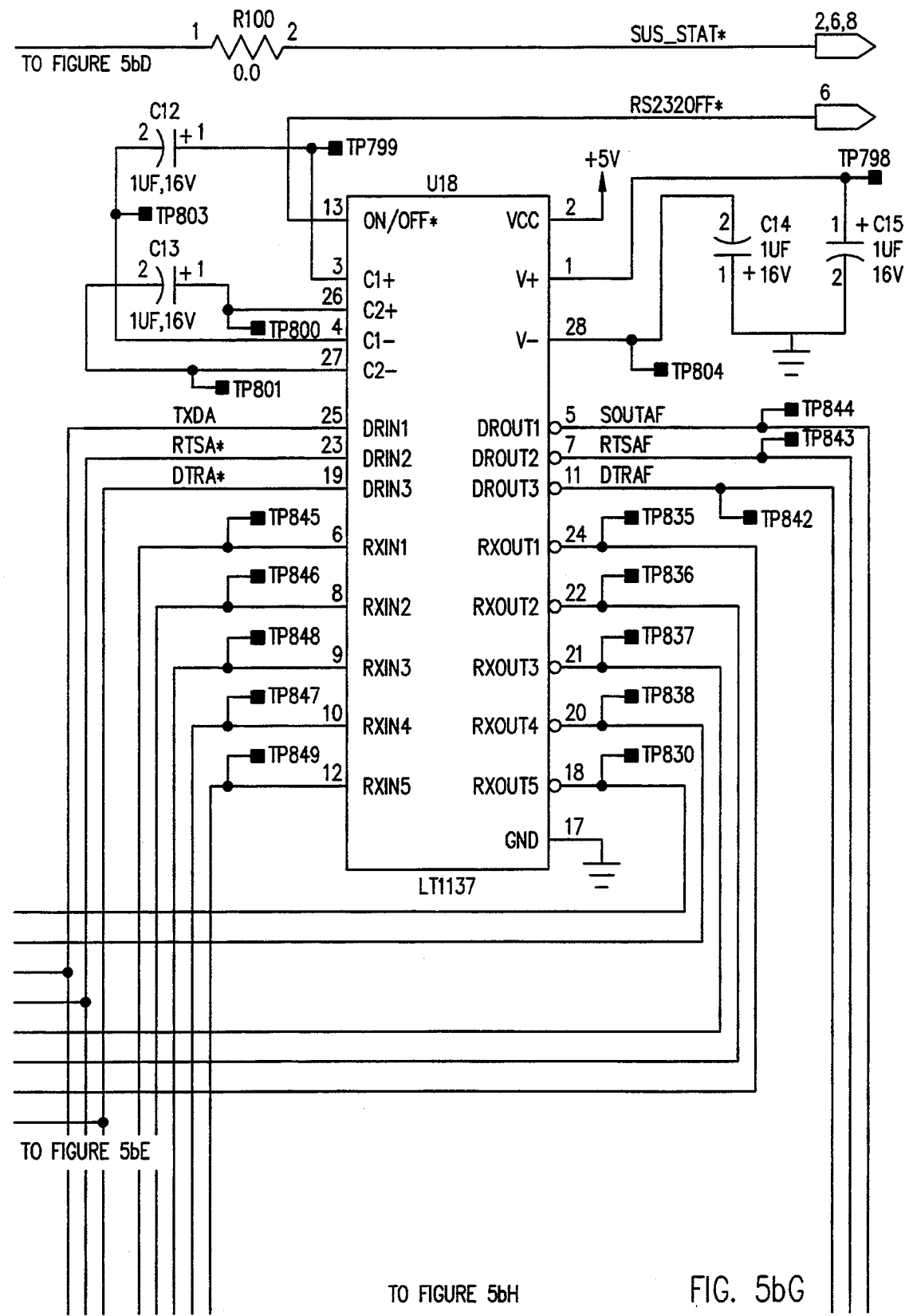
Figure 5B:
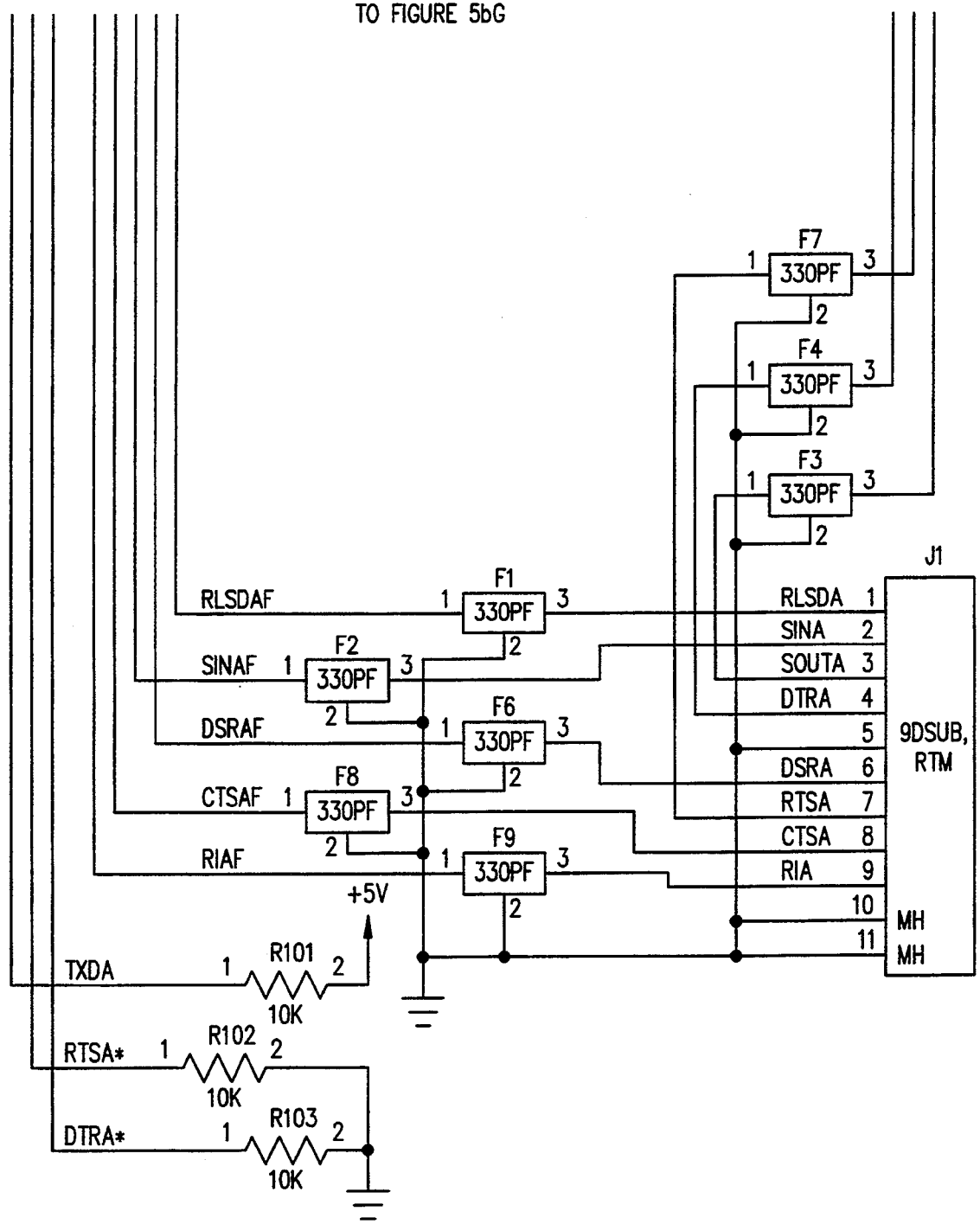
Figure 6A:
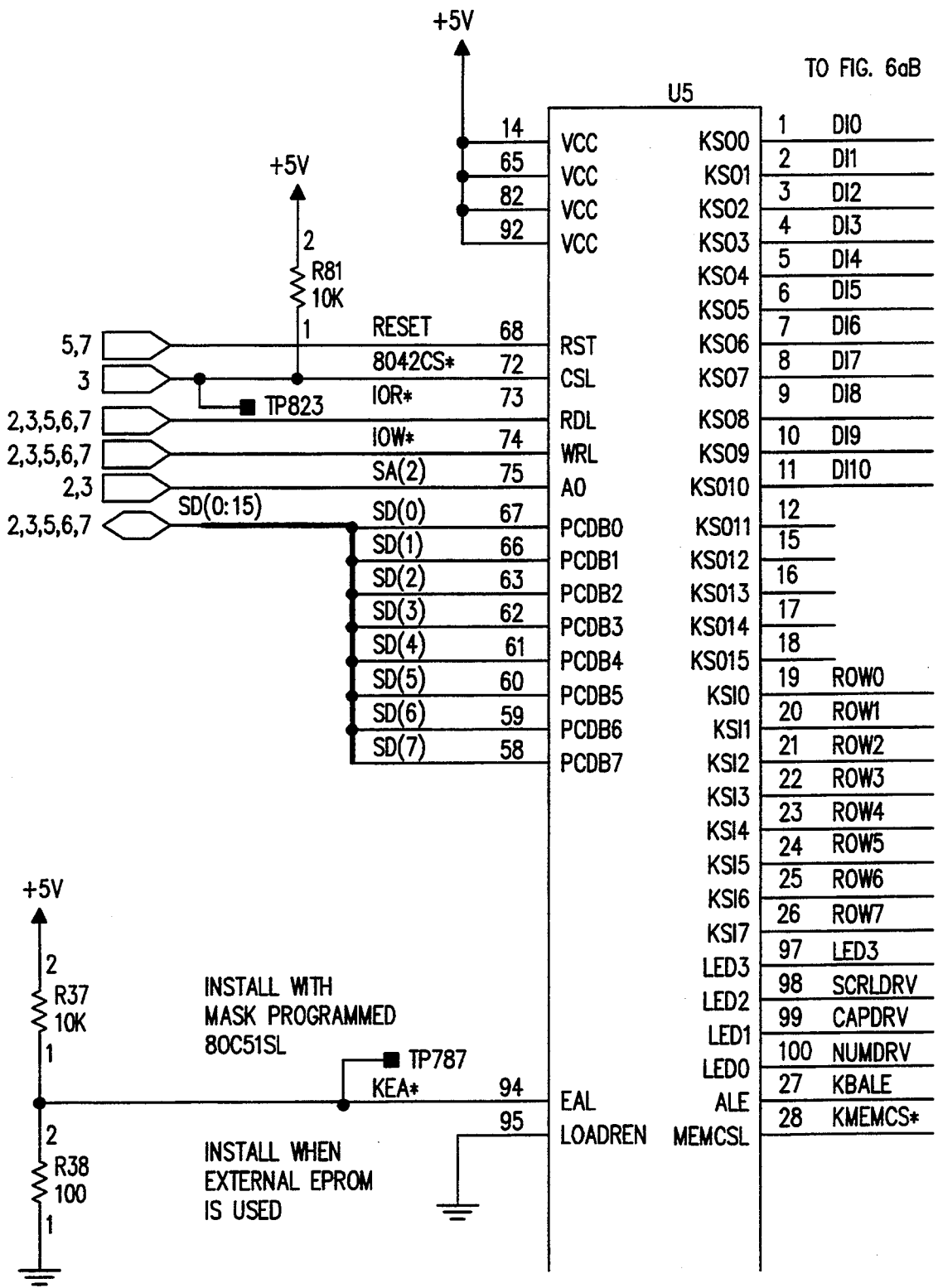
Figure 6A:
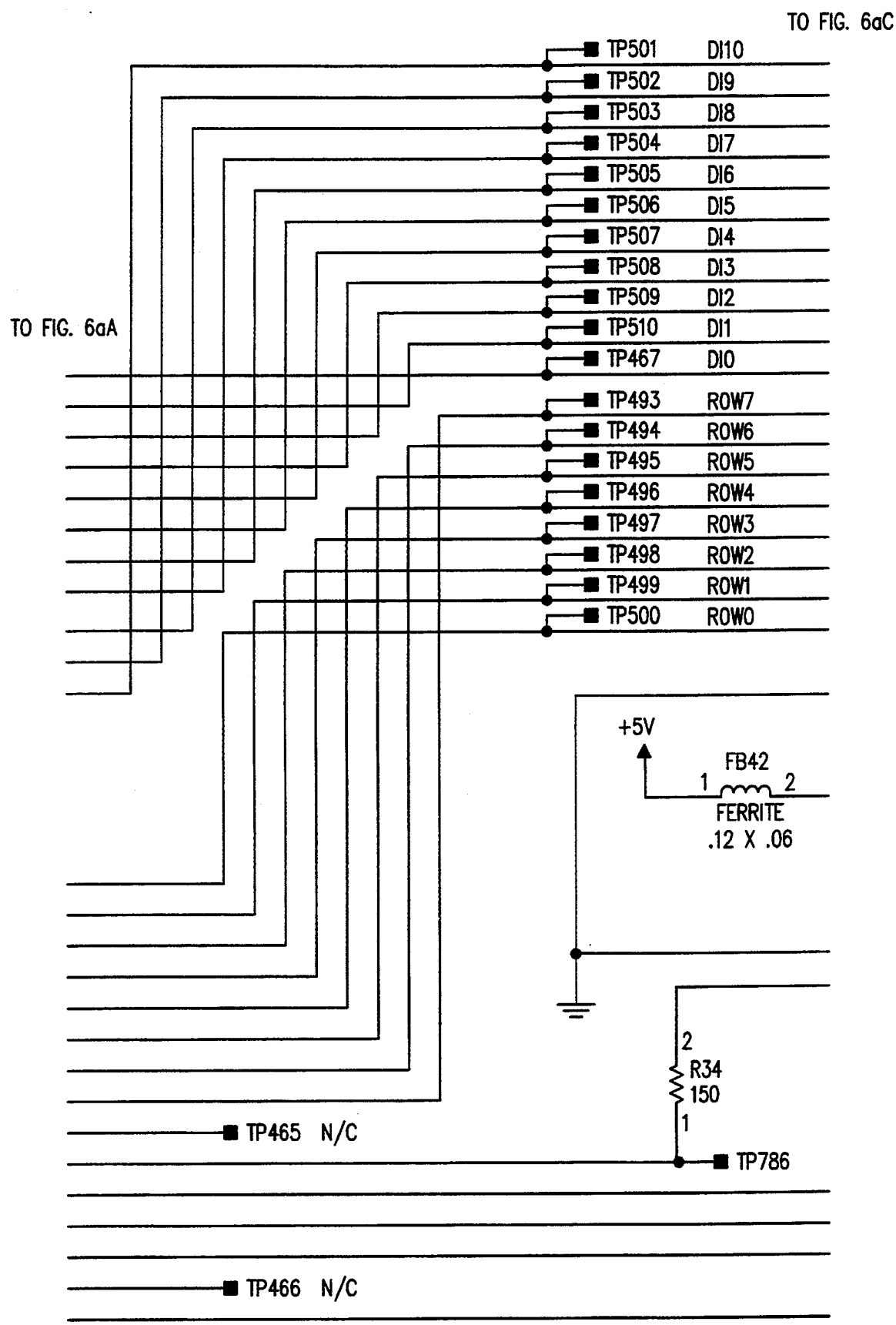
Figure 6A:
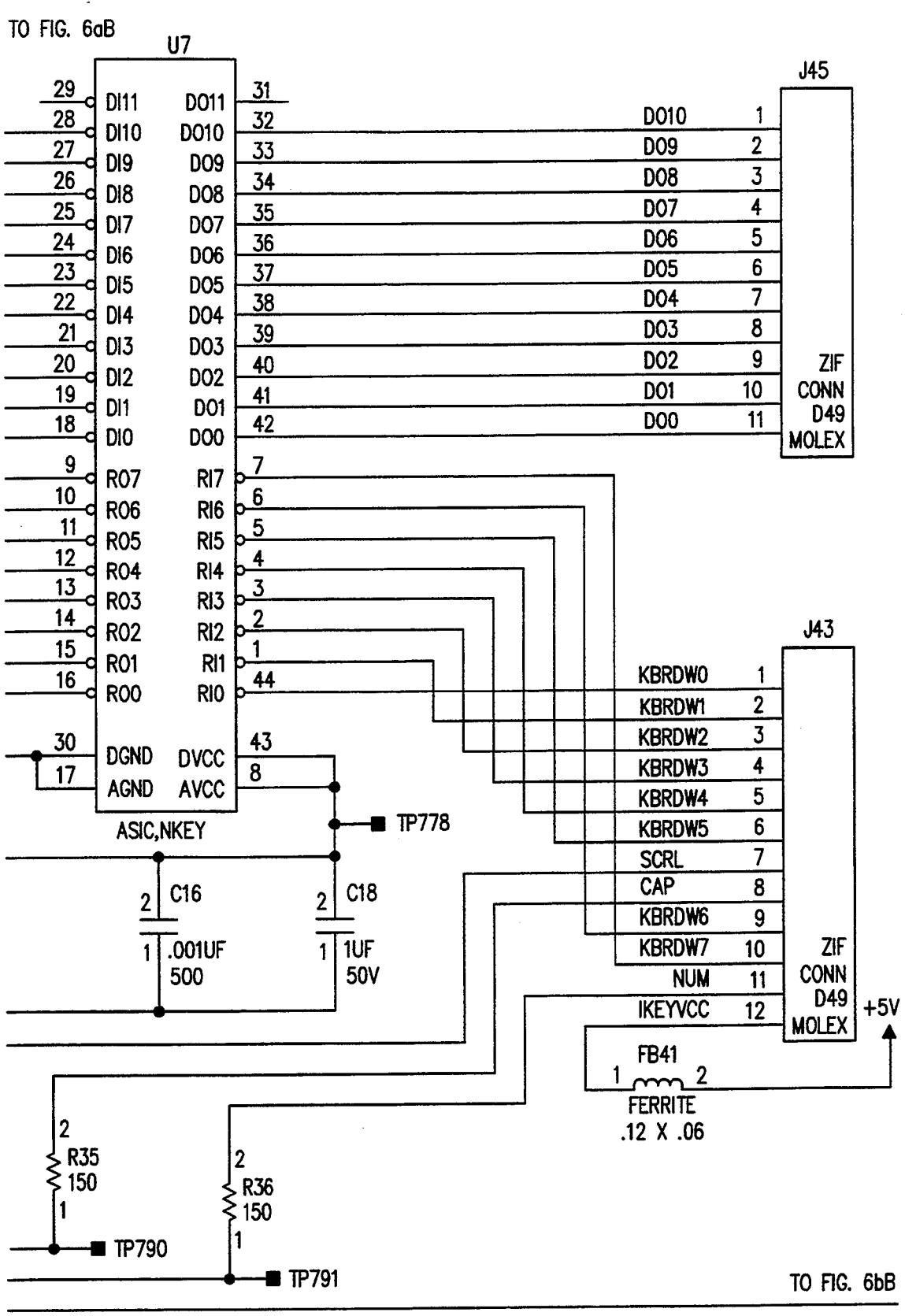
Figure 6A:
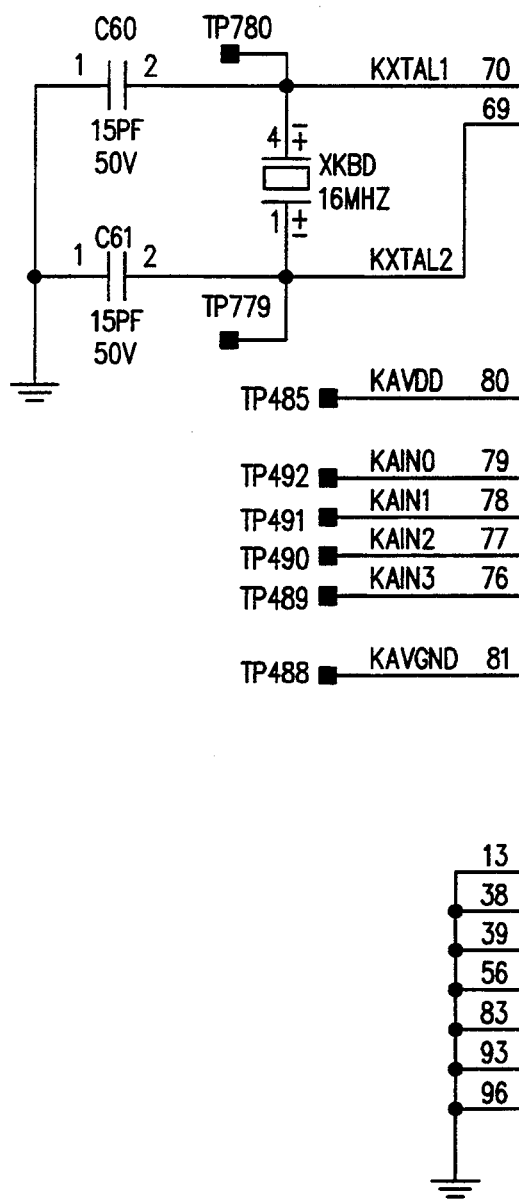
Figure 6A:
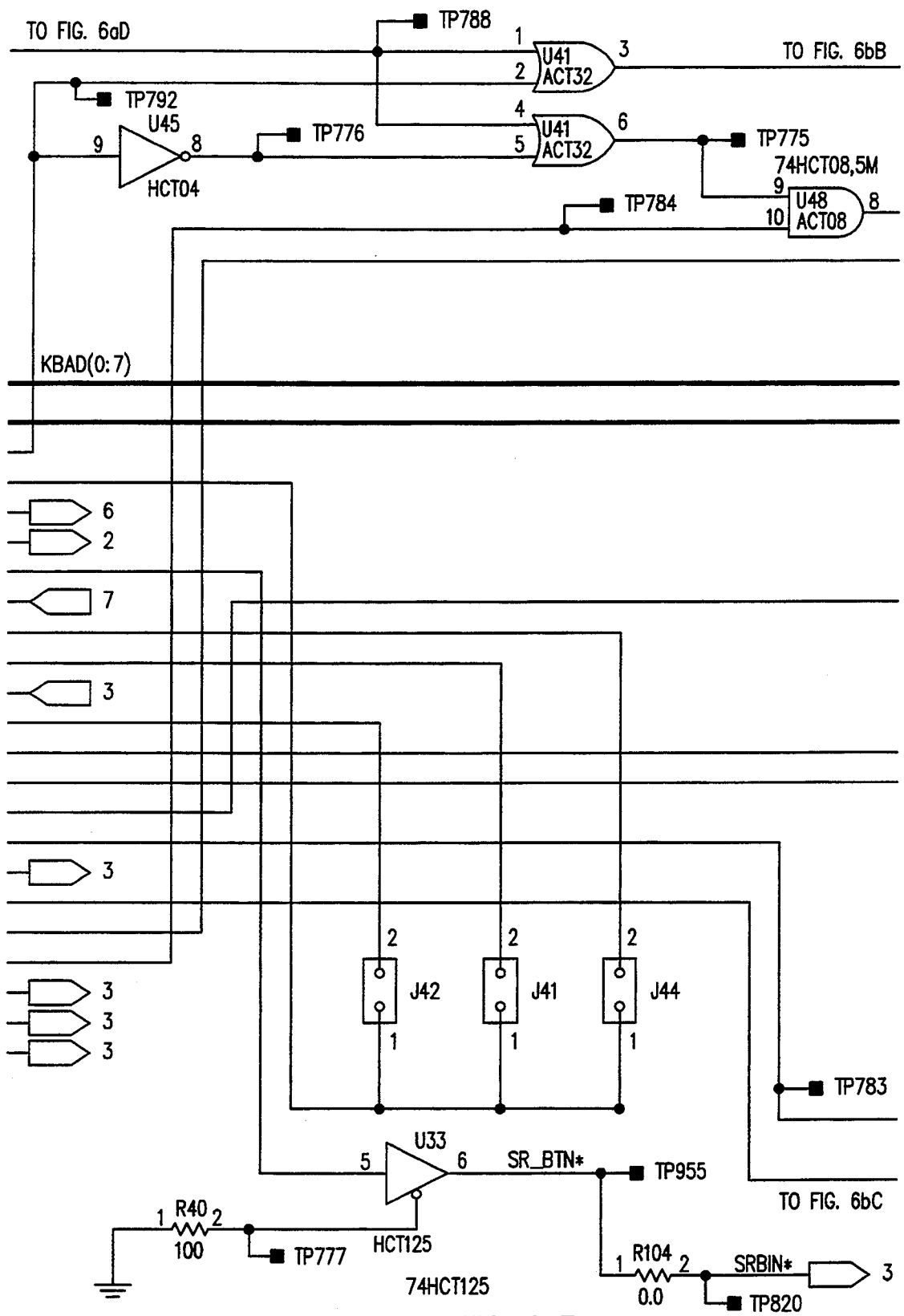
Figure 6B:
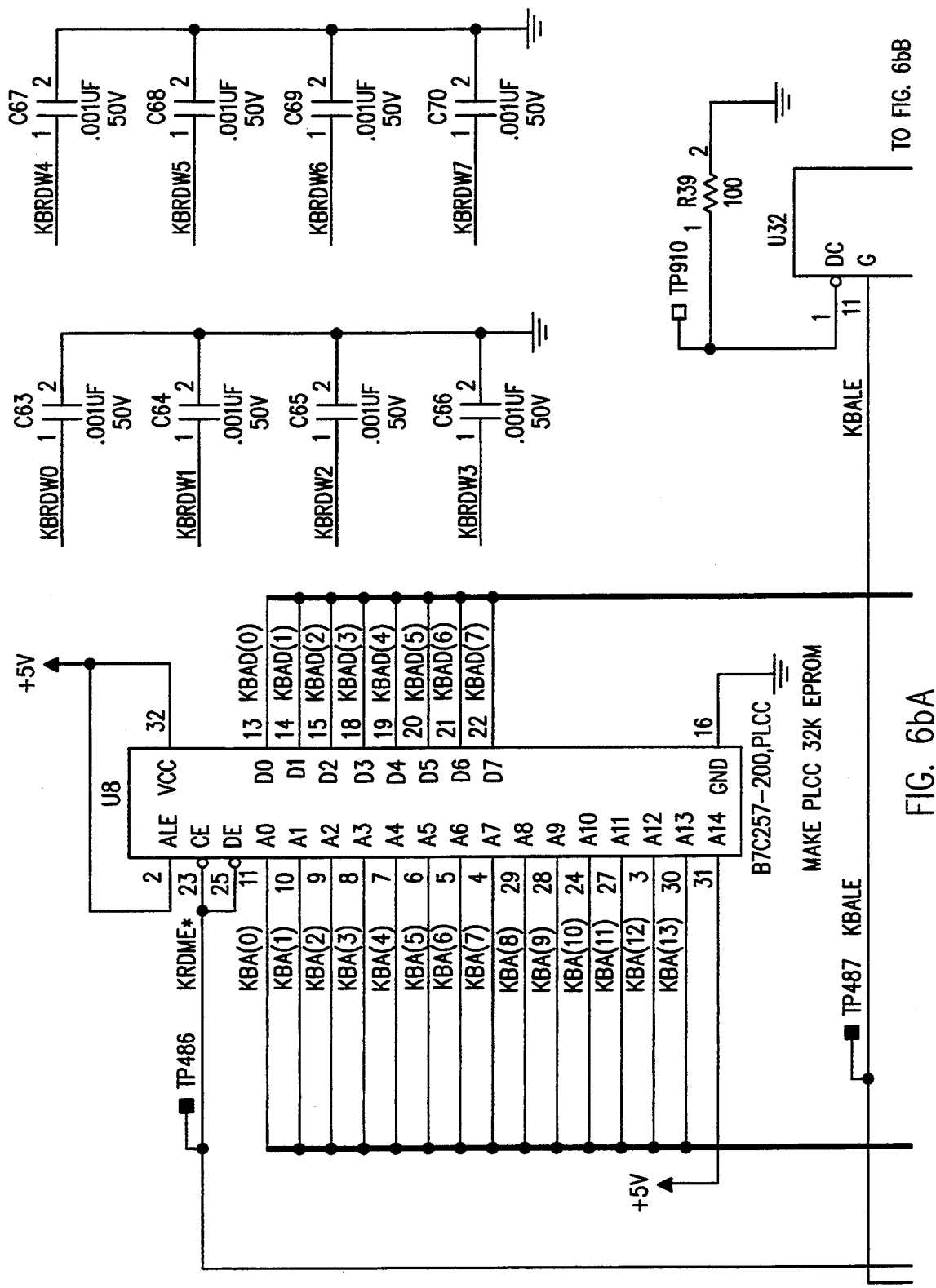
Figure 6B:
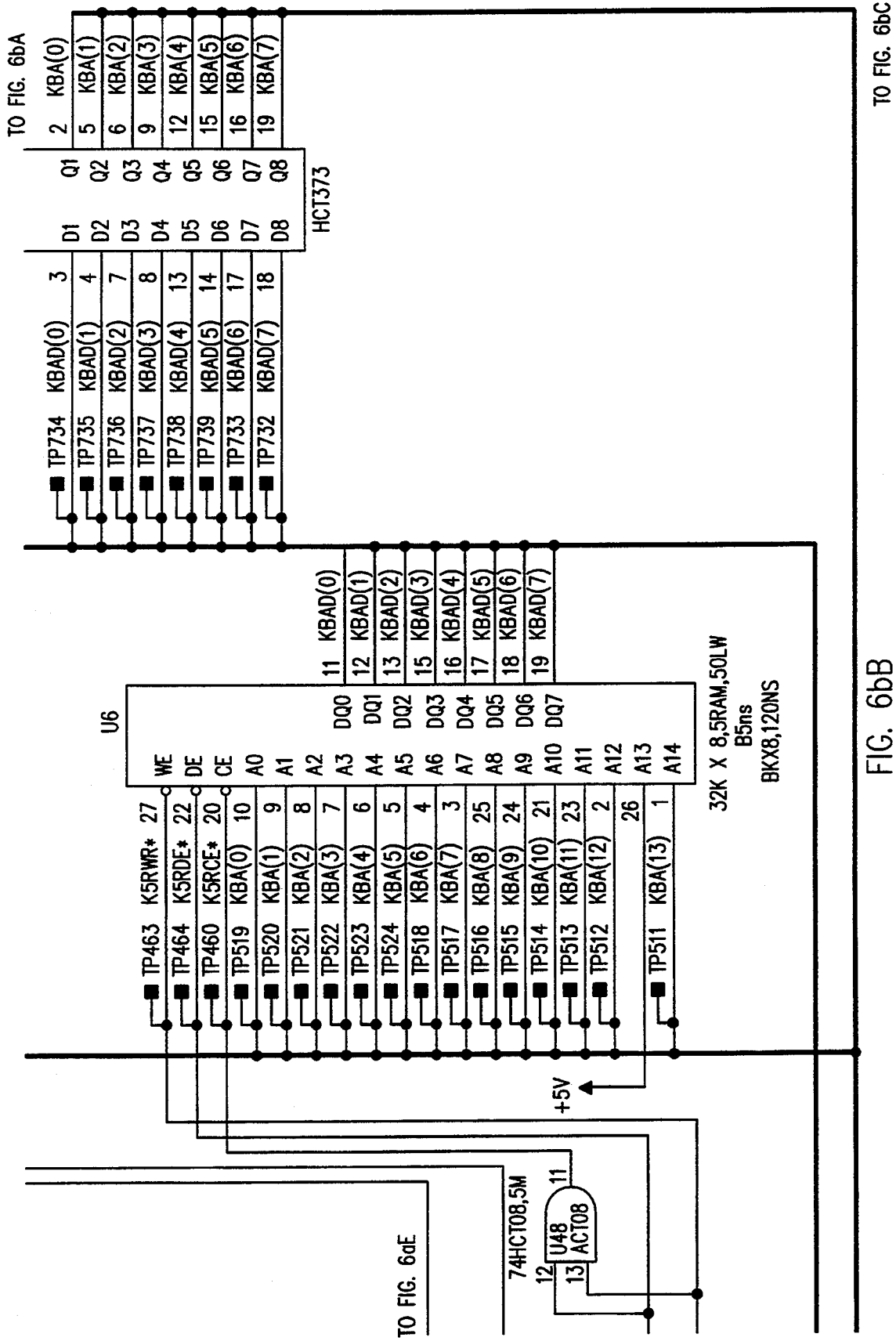
Figure 6B:
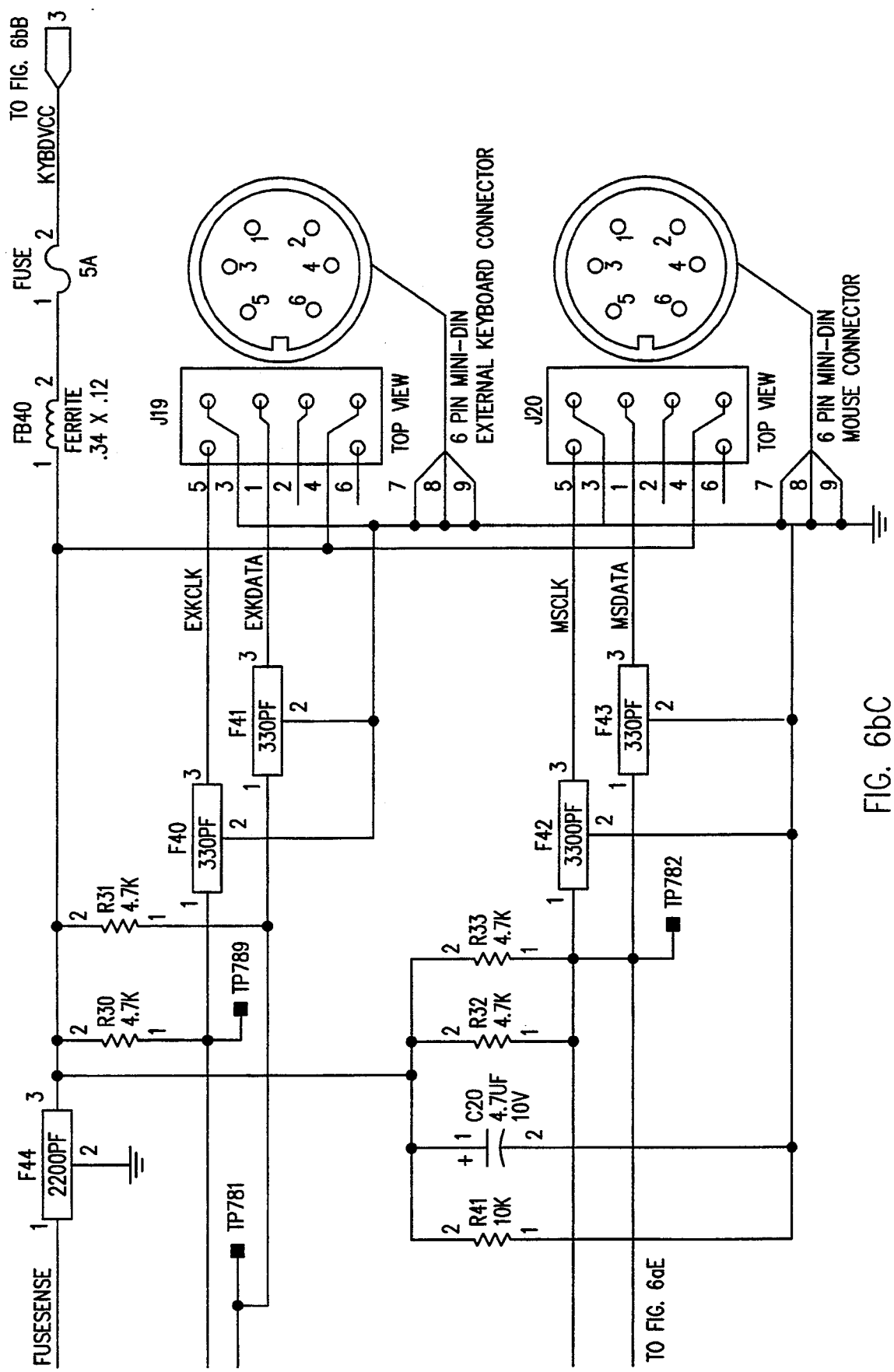
Figure 7A:
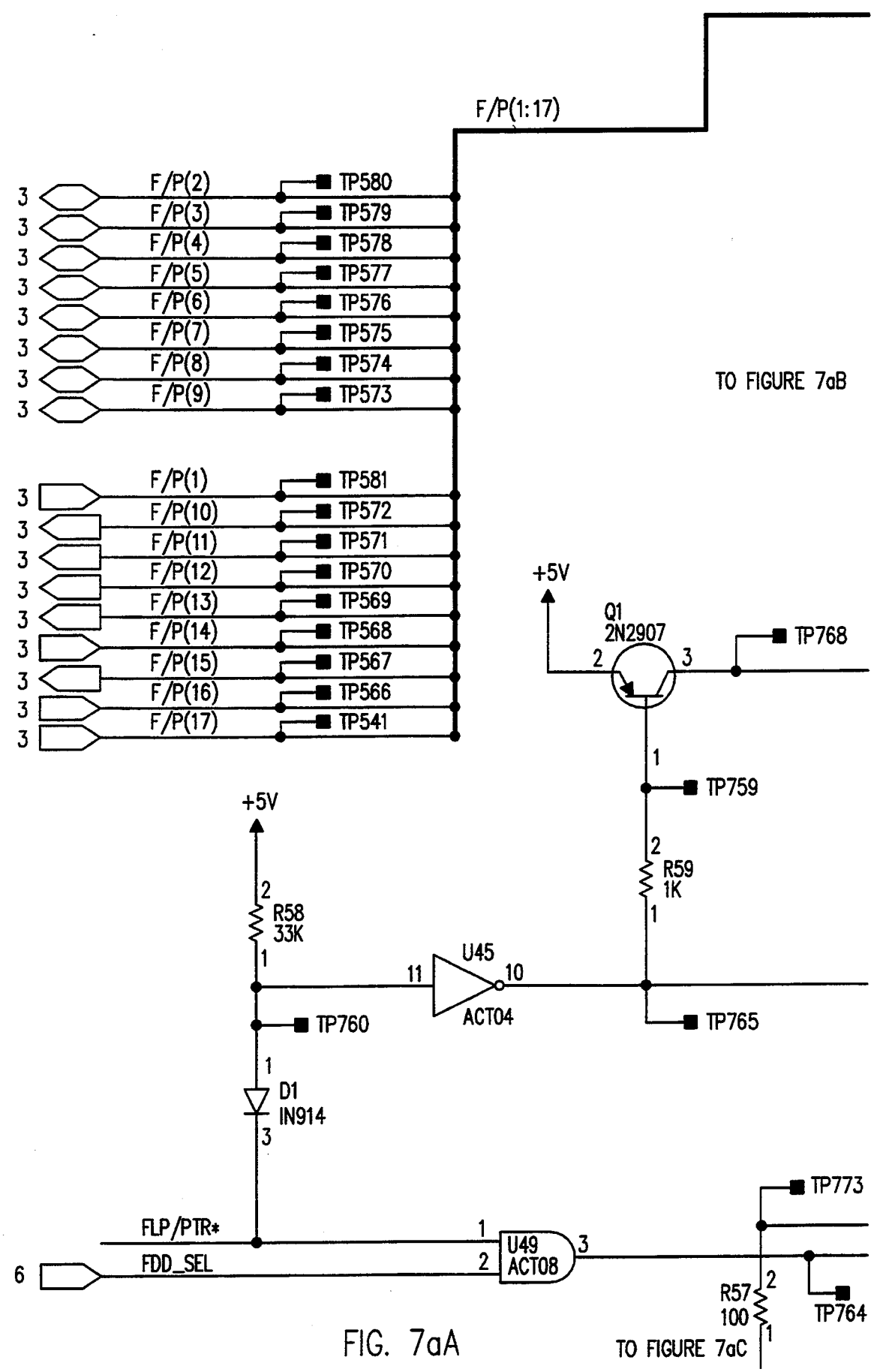
Figure 7A:
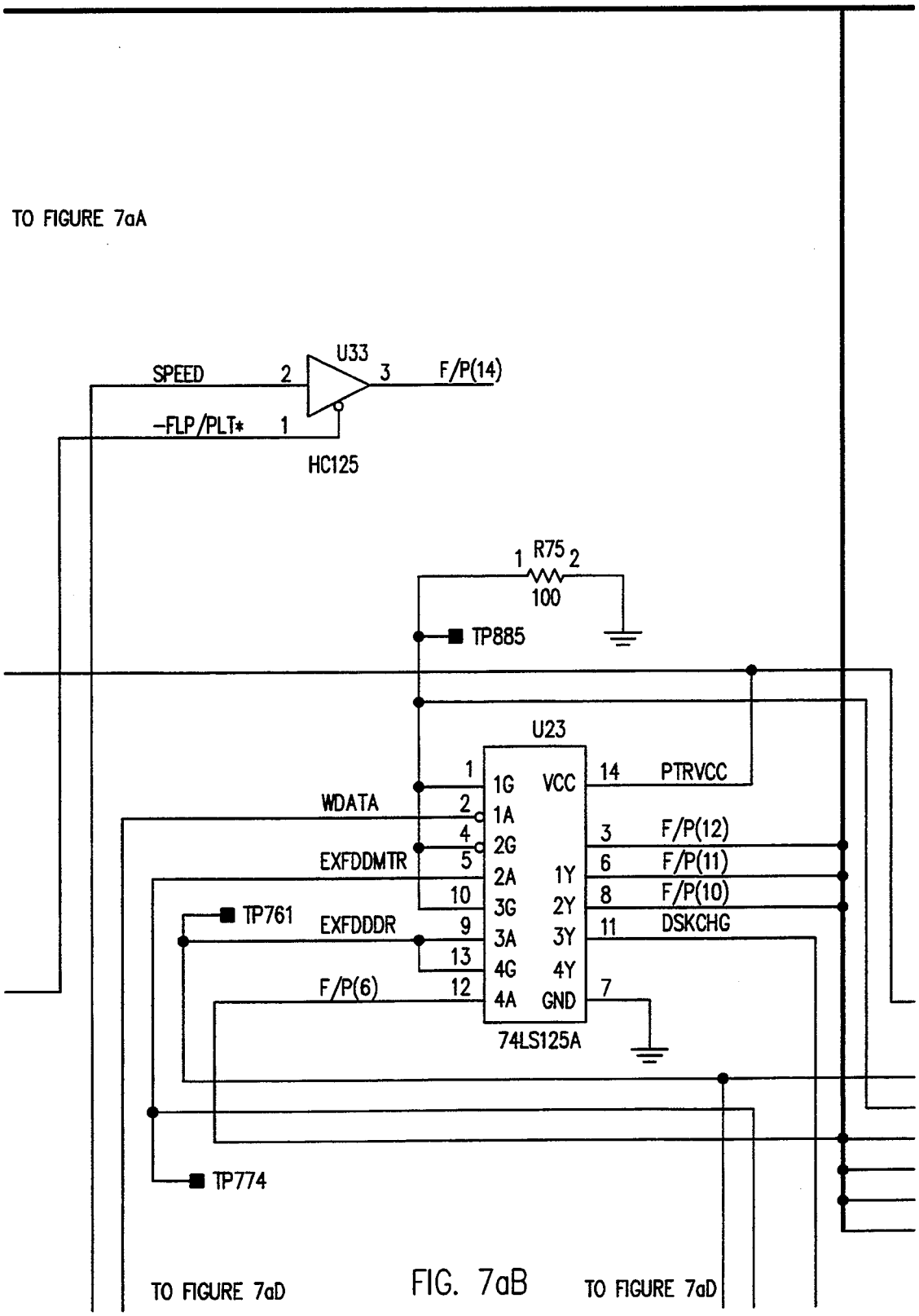
Figure 7A:
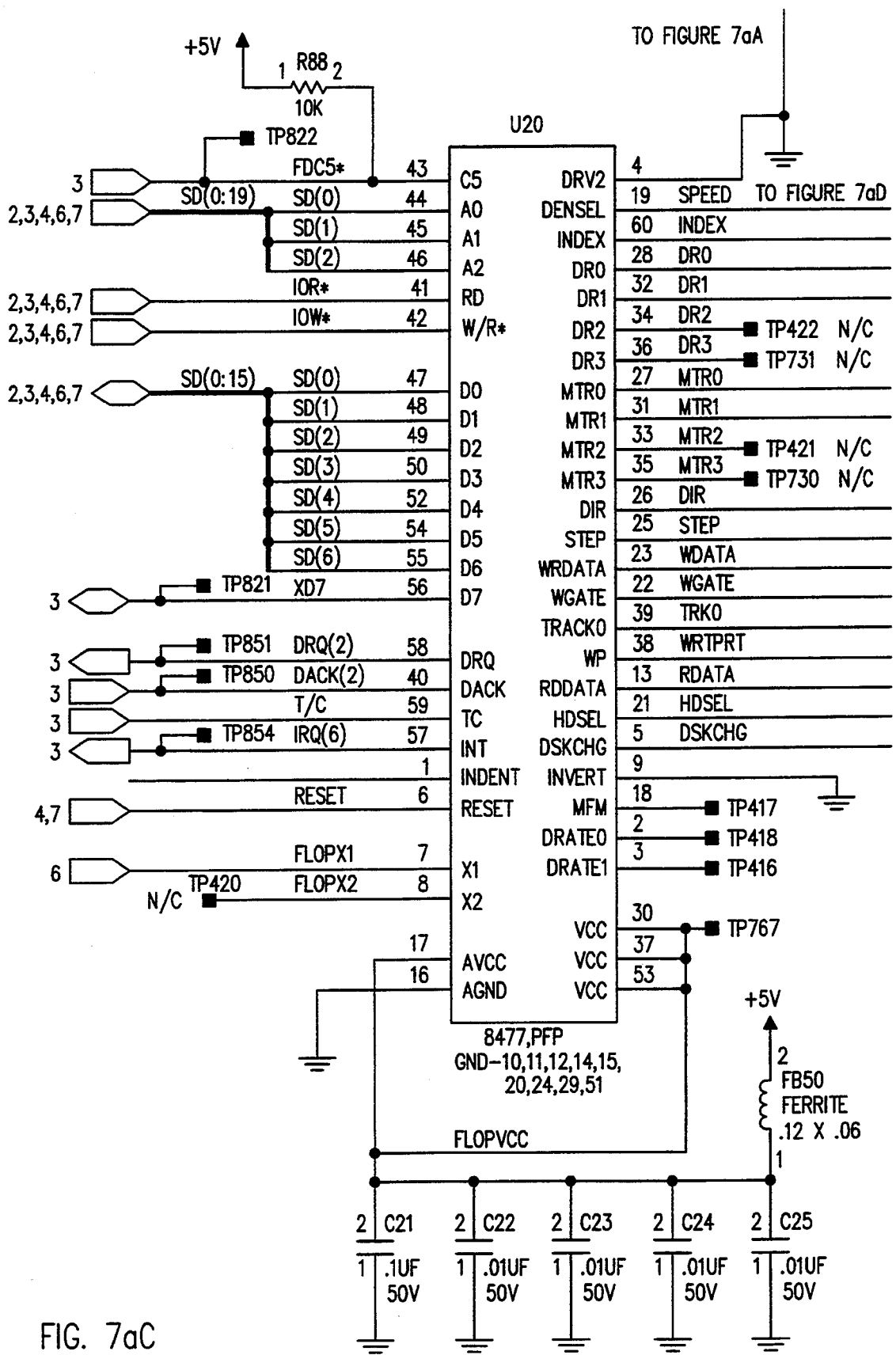
Figure 7A:
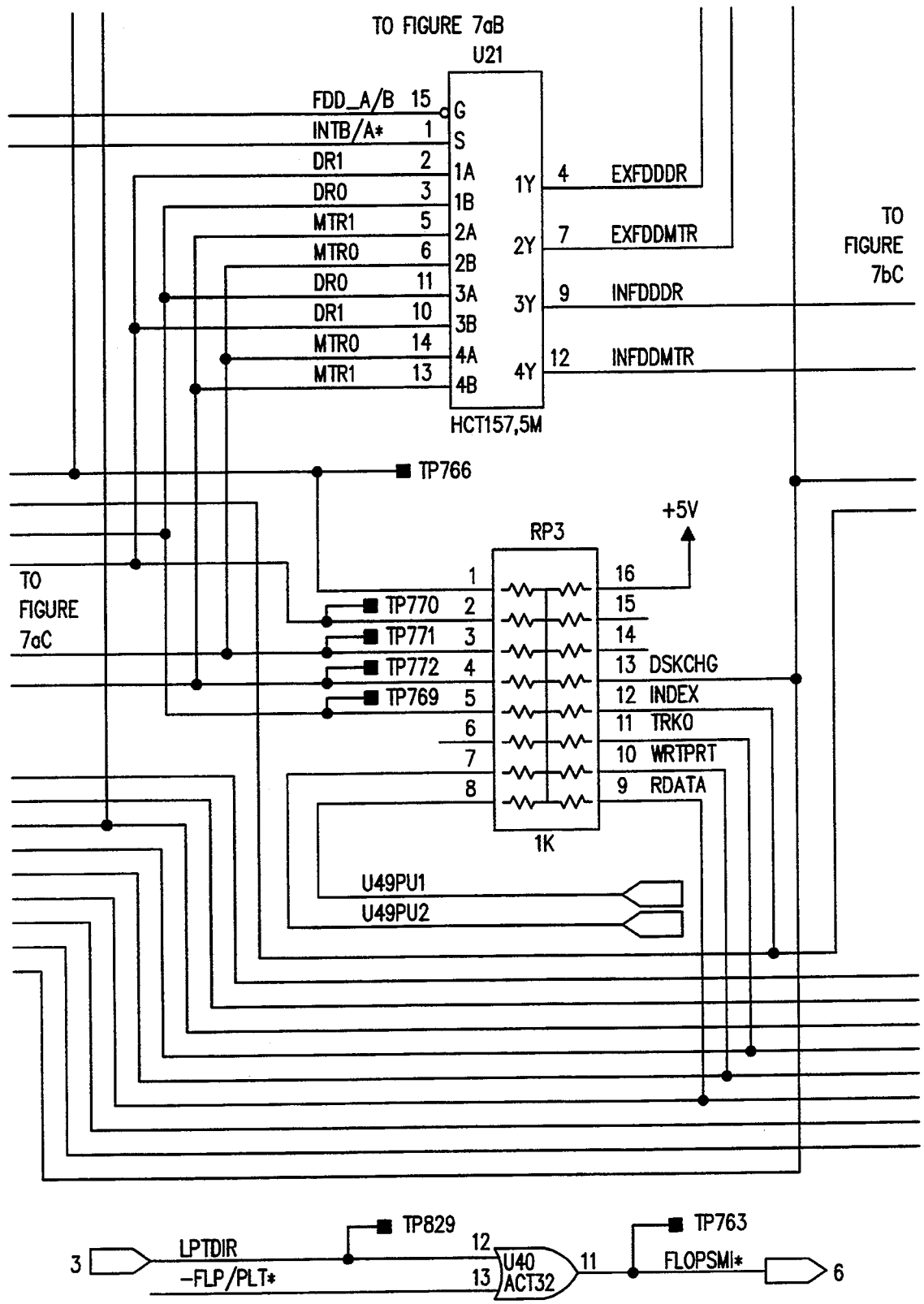
Figure 7B:
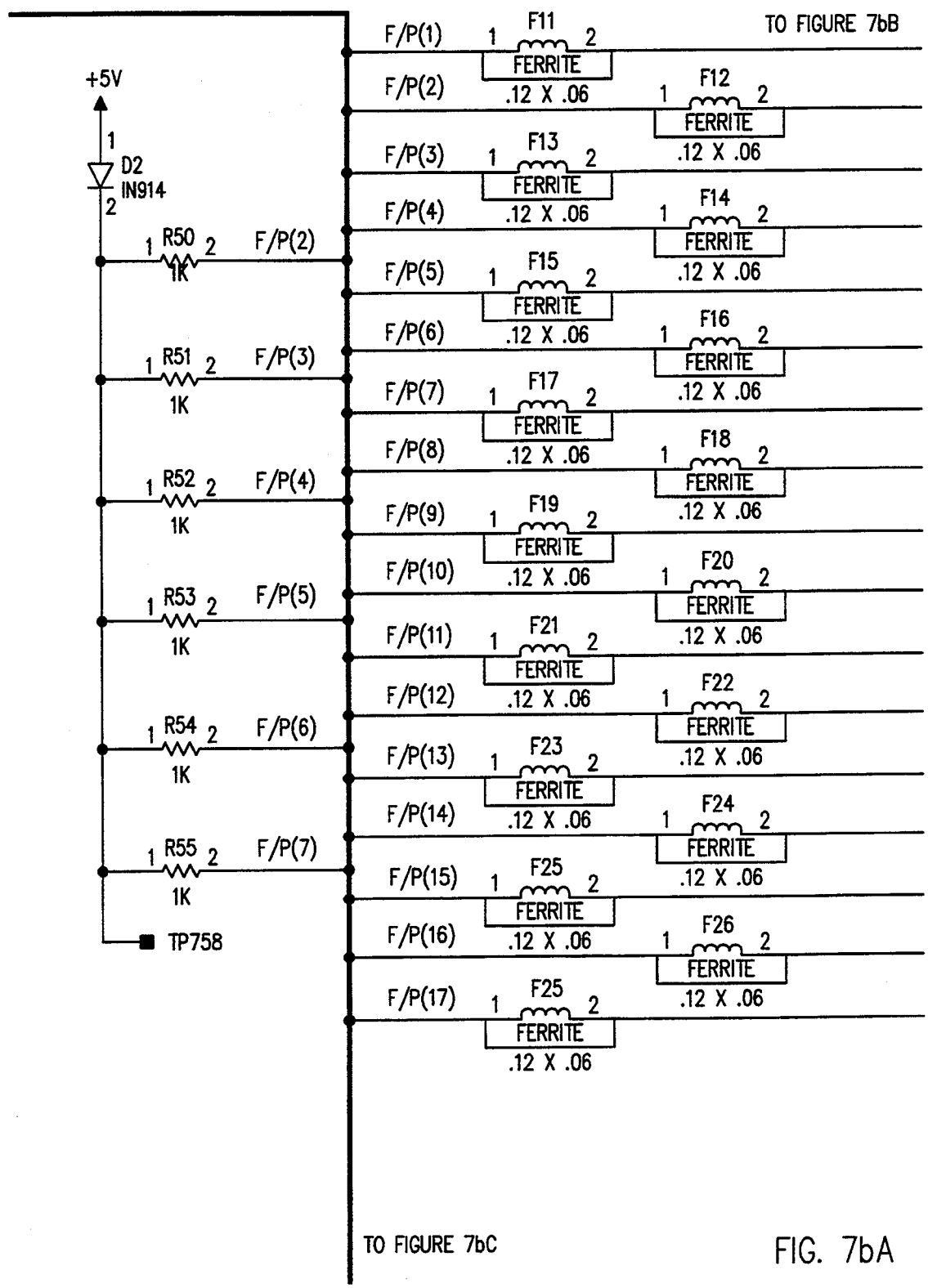
Figure 7B:
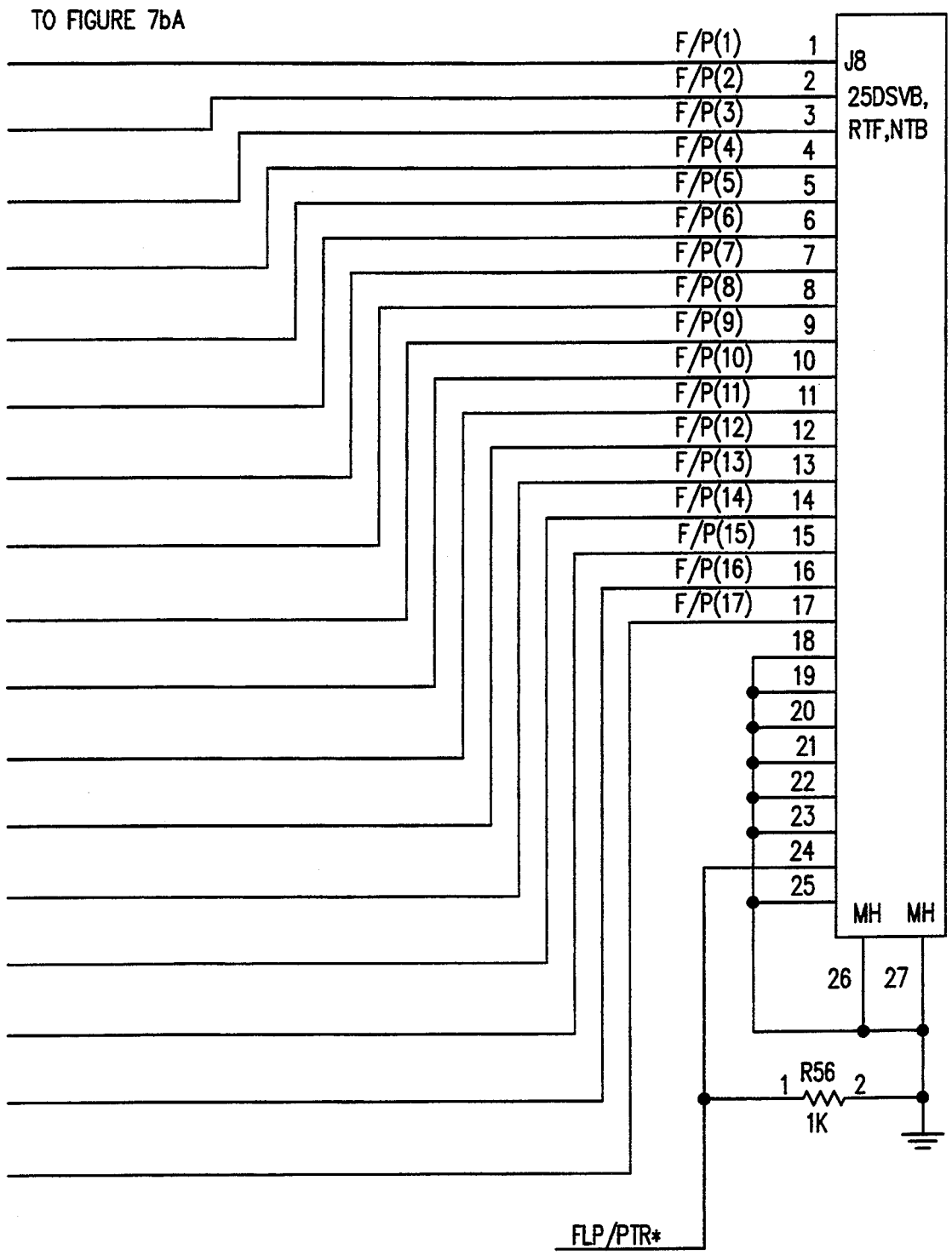
Figure 7B:
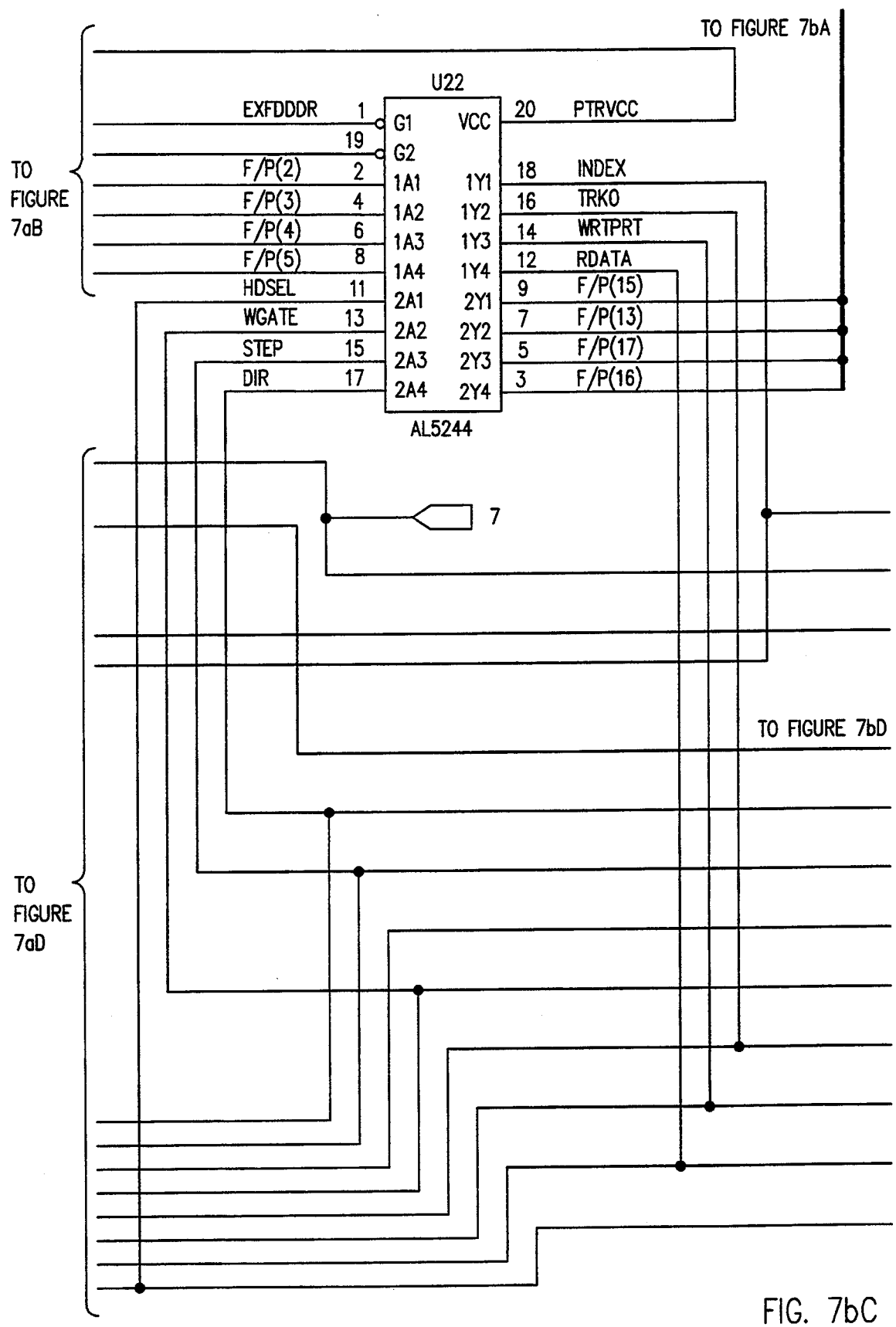
Figure 7B:
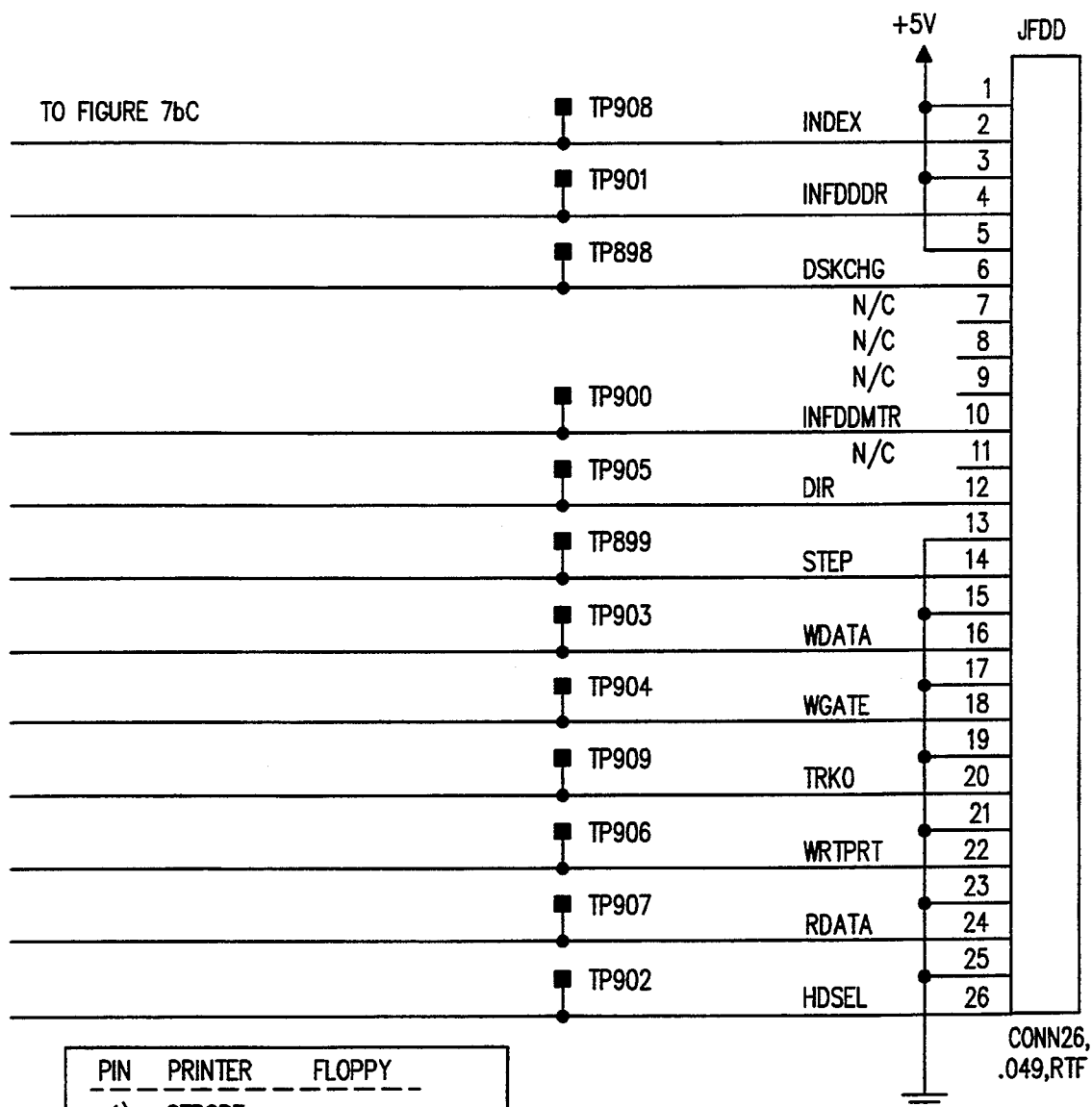
Figure 8A:
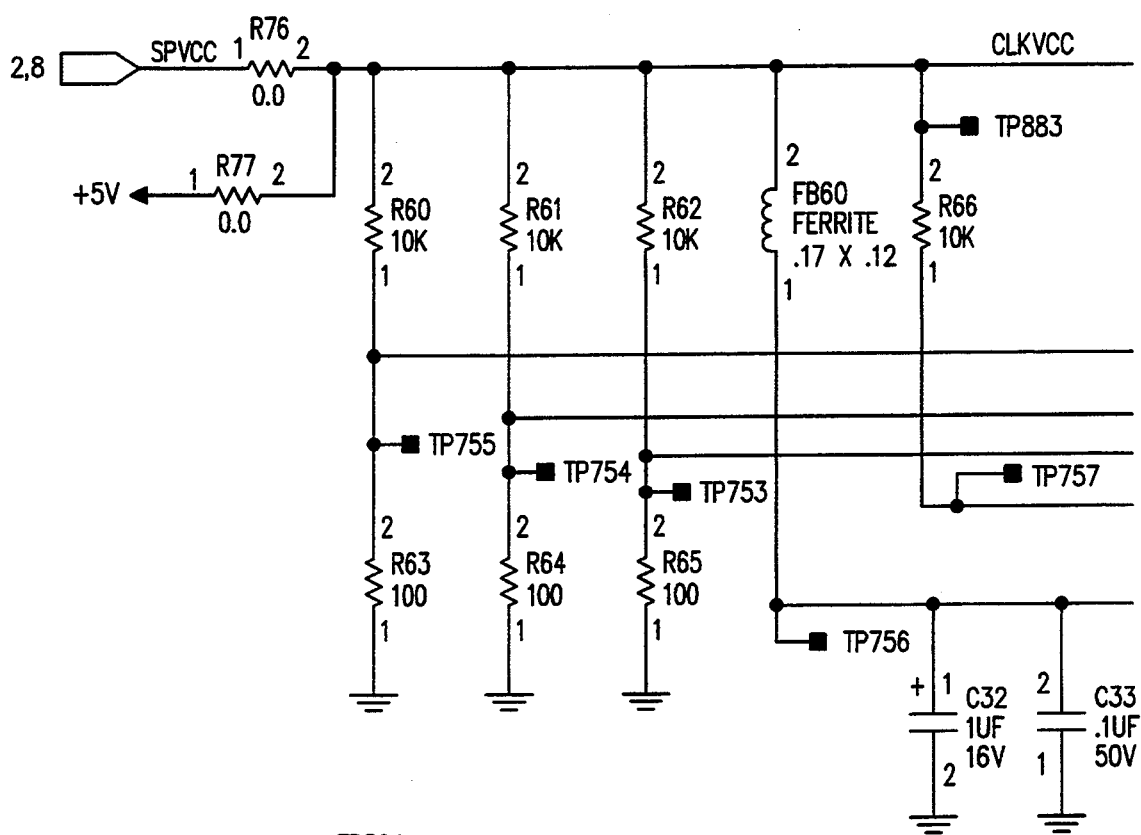
Figure 8A:
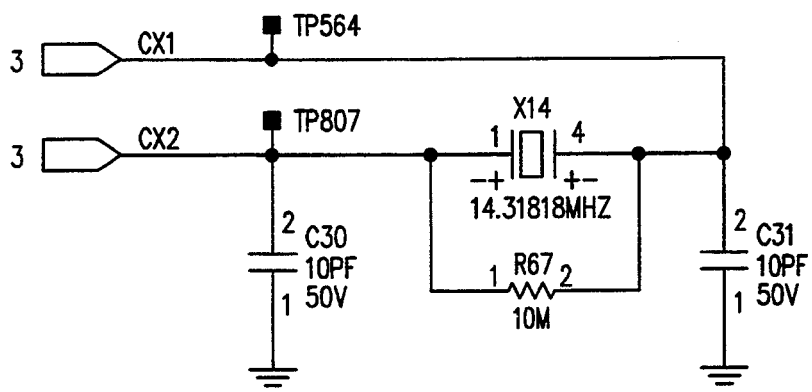
Figure 8A:
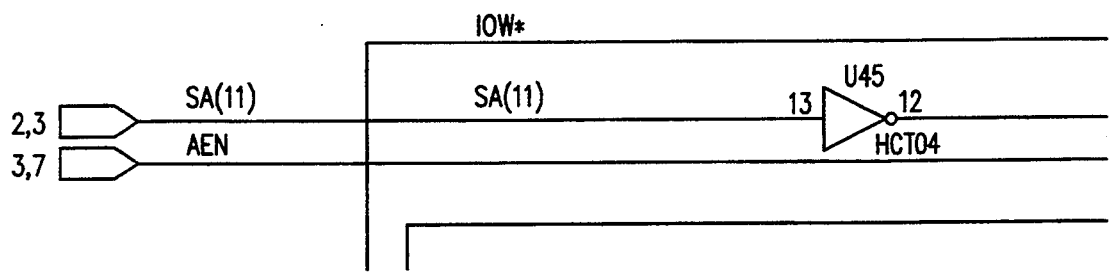
Figure 8A:
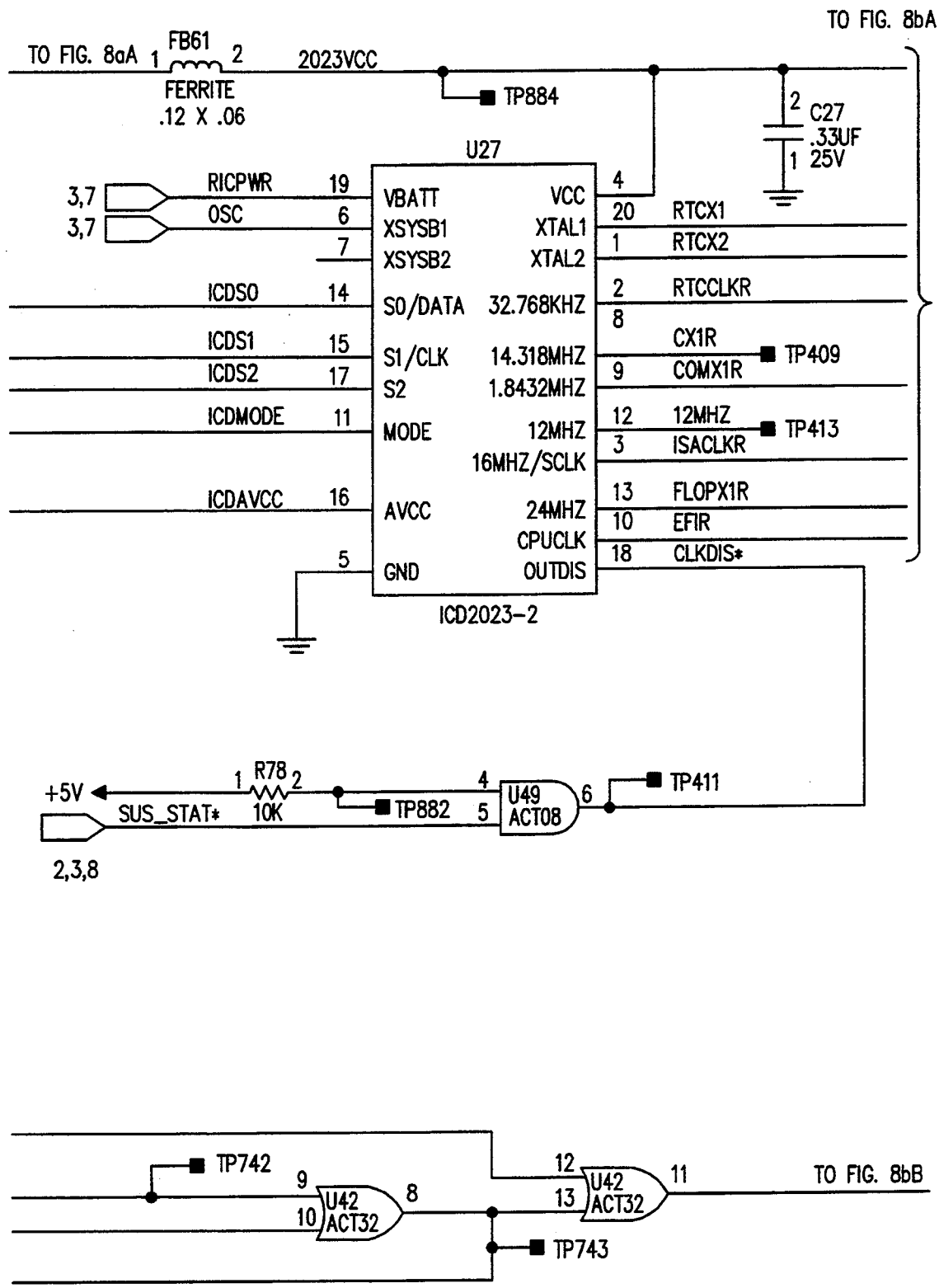
Figure 8A:
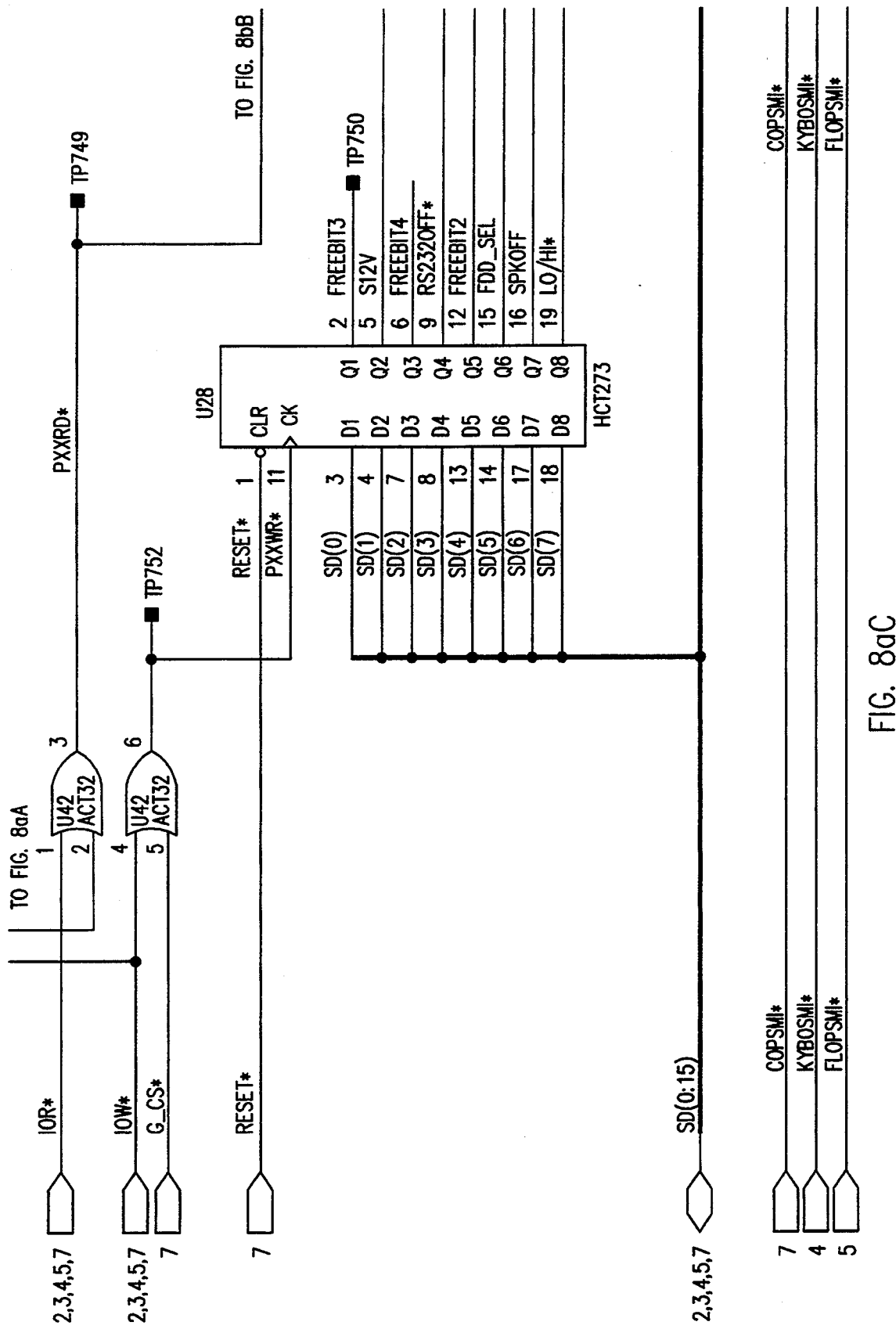
Figure 8B:
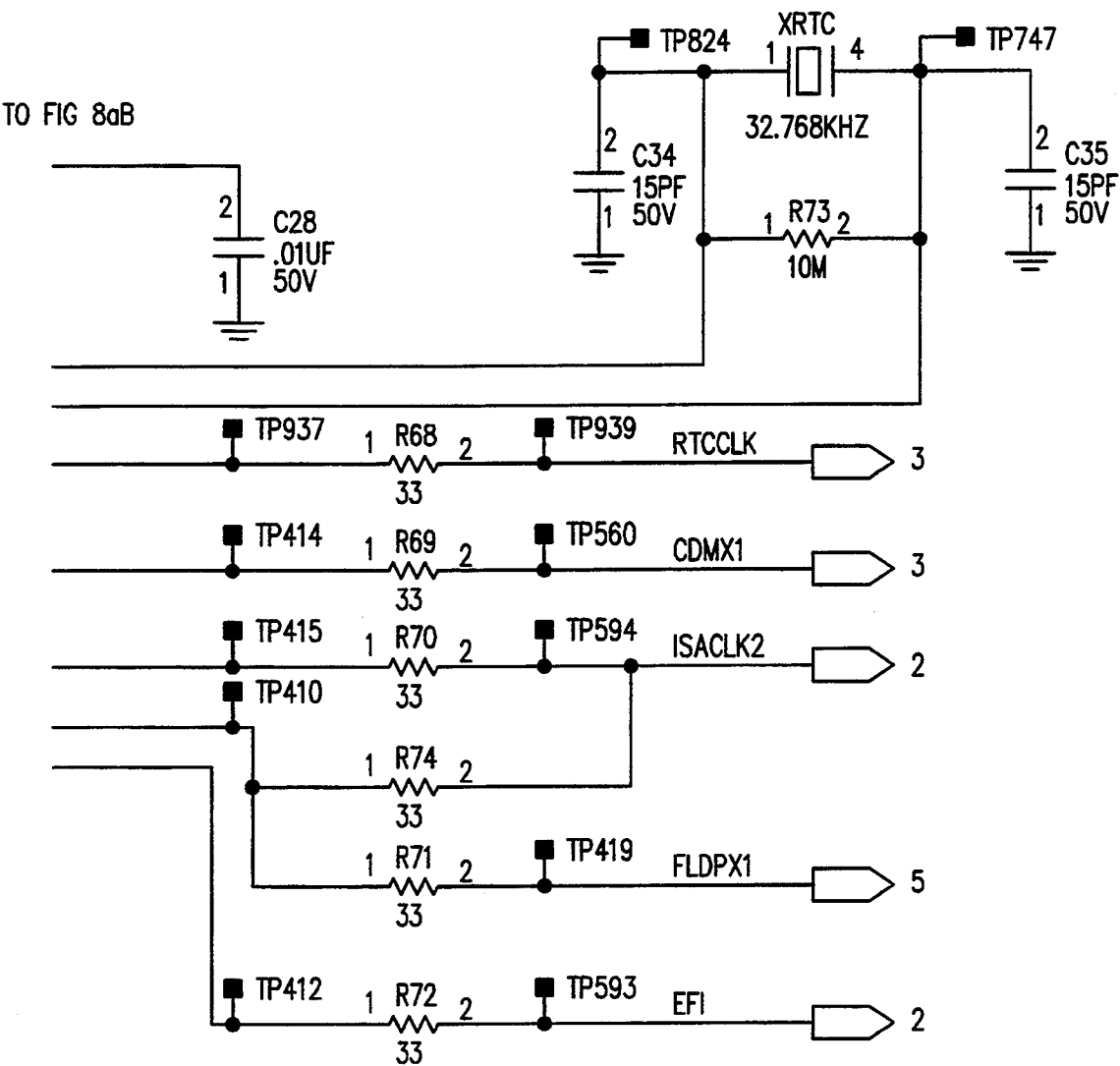
Figure 8B:
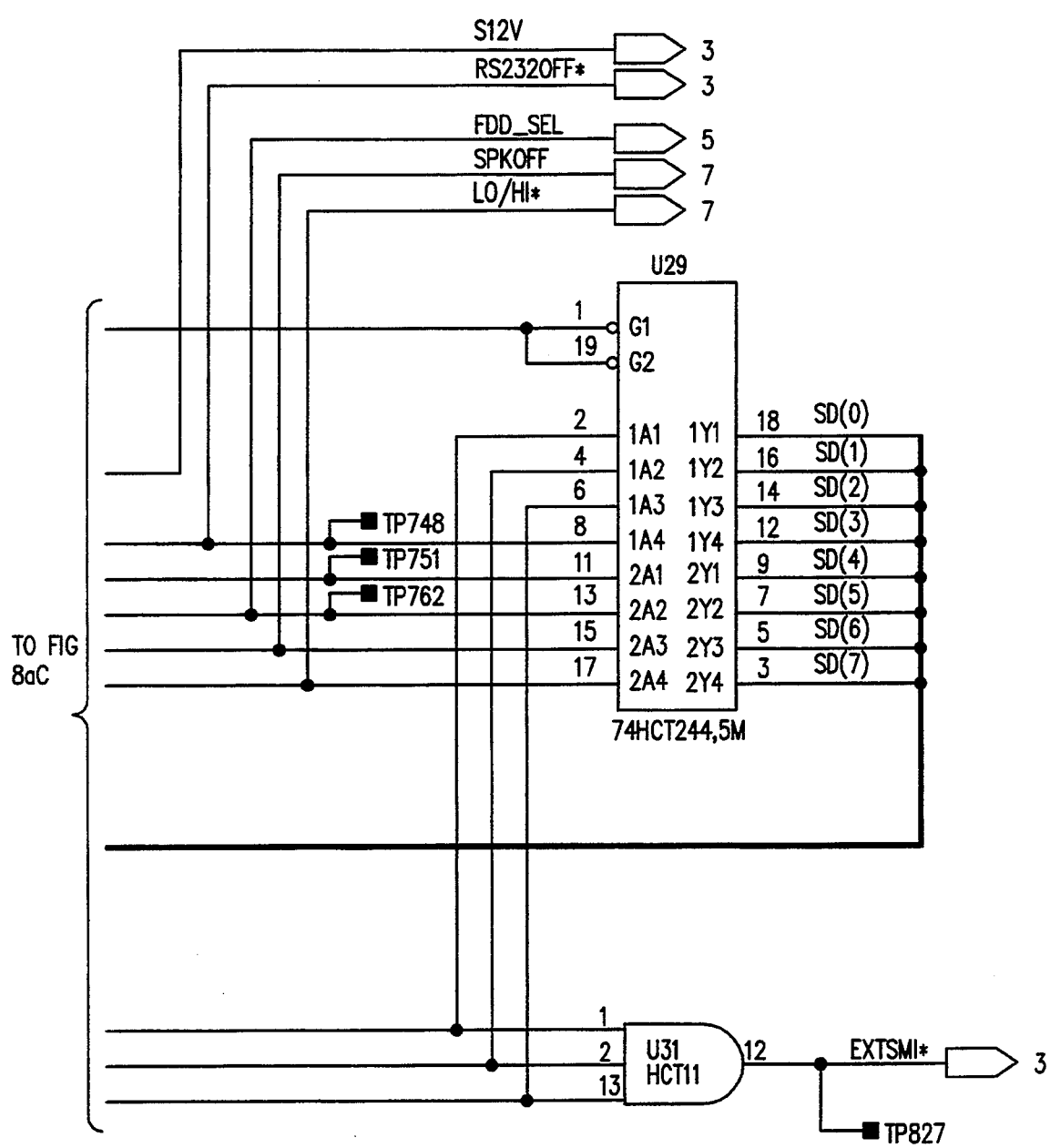
Figure 8B:
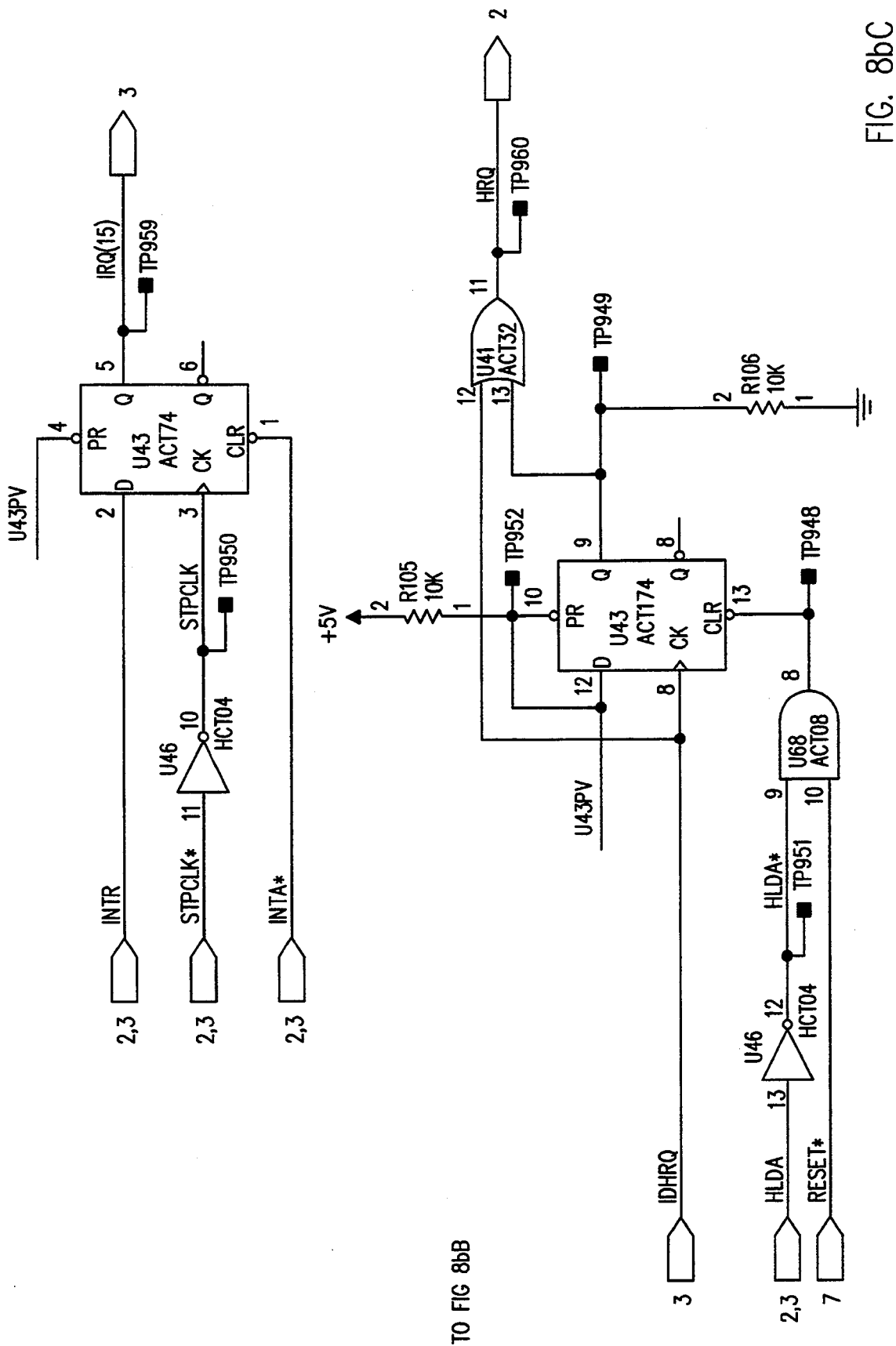
Figure 9A:
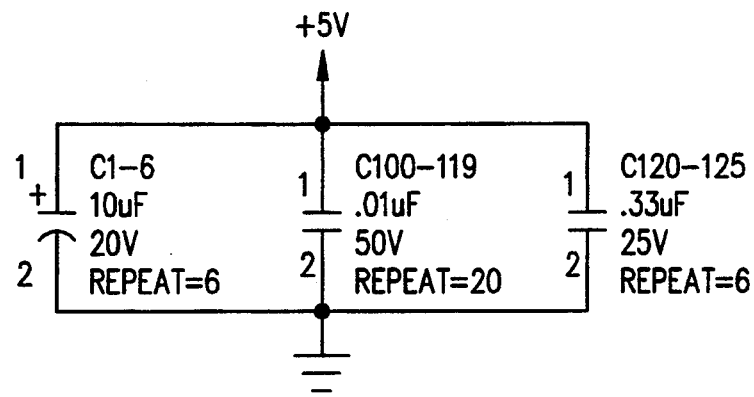
Figure 9A:
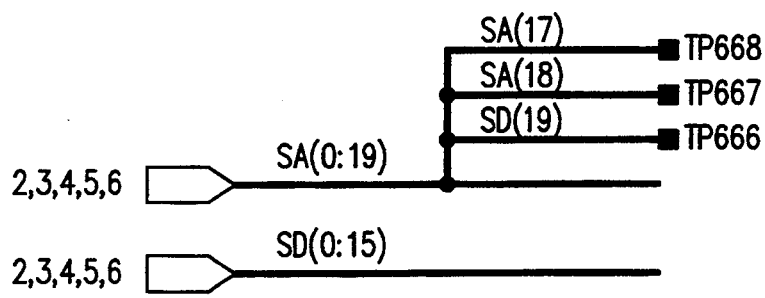
Figure 9A:
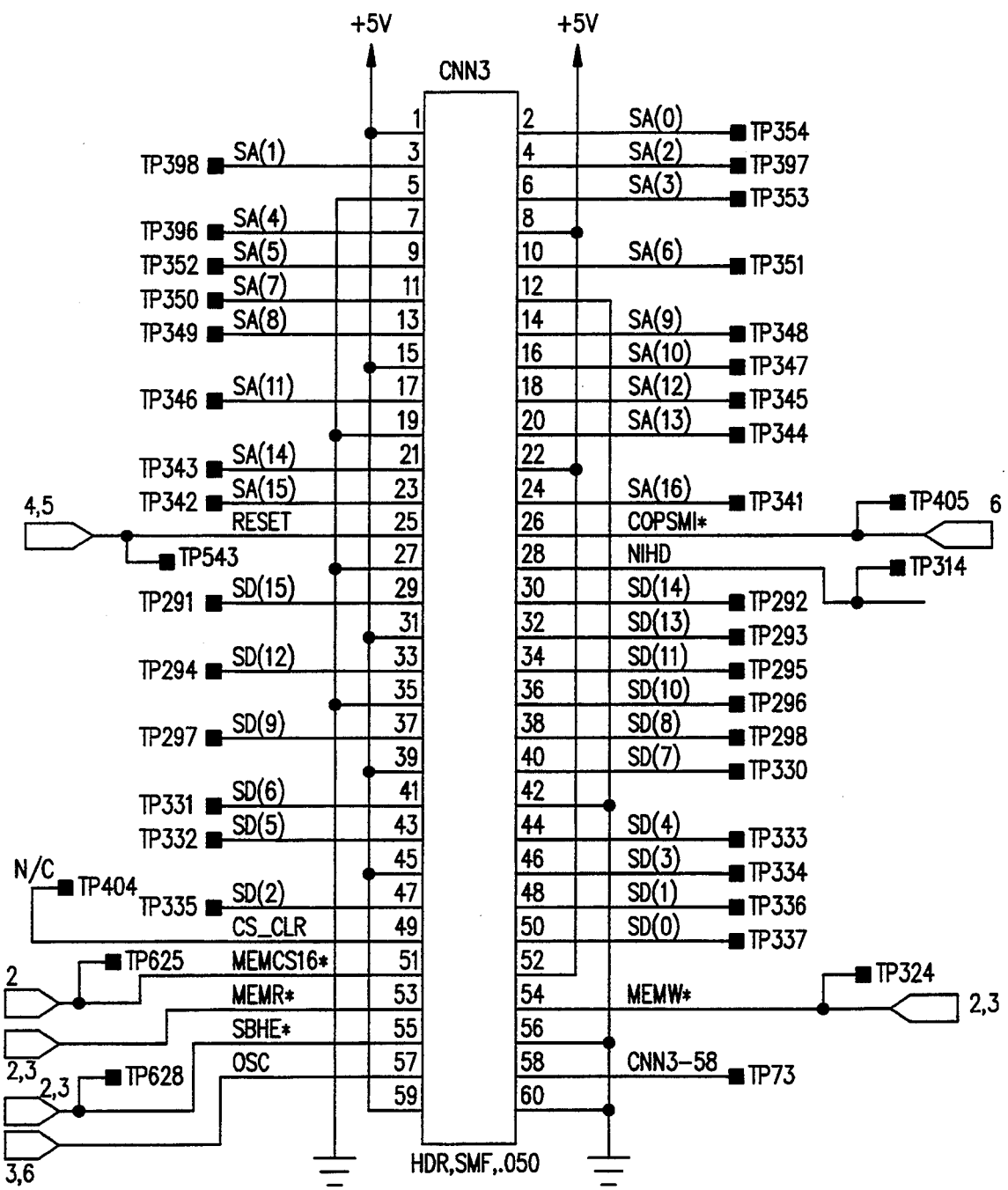
Figure 9B:
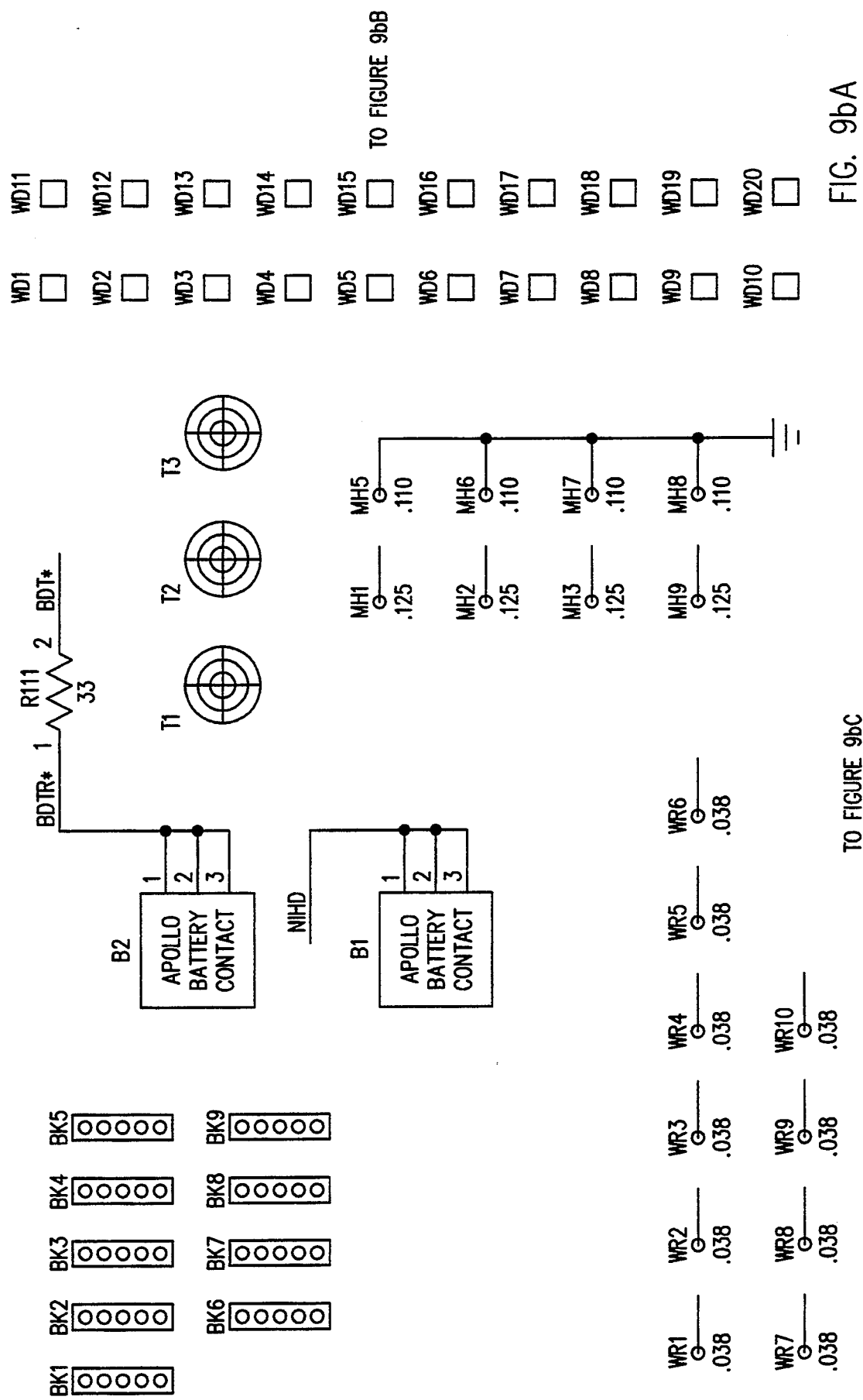
Figure 9B:
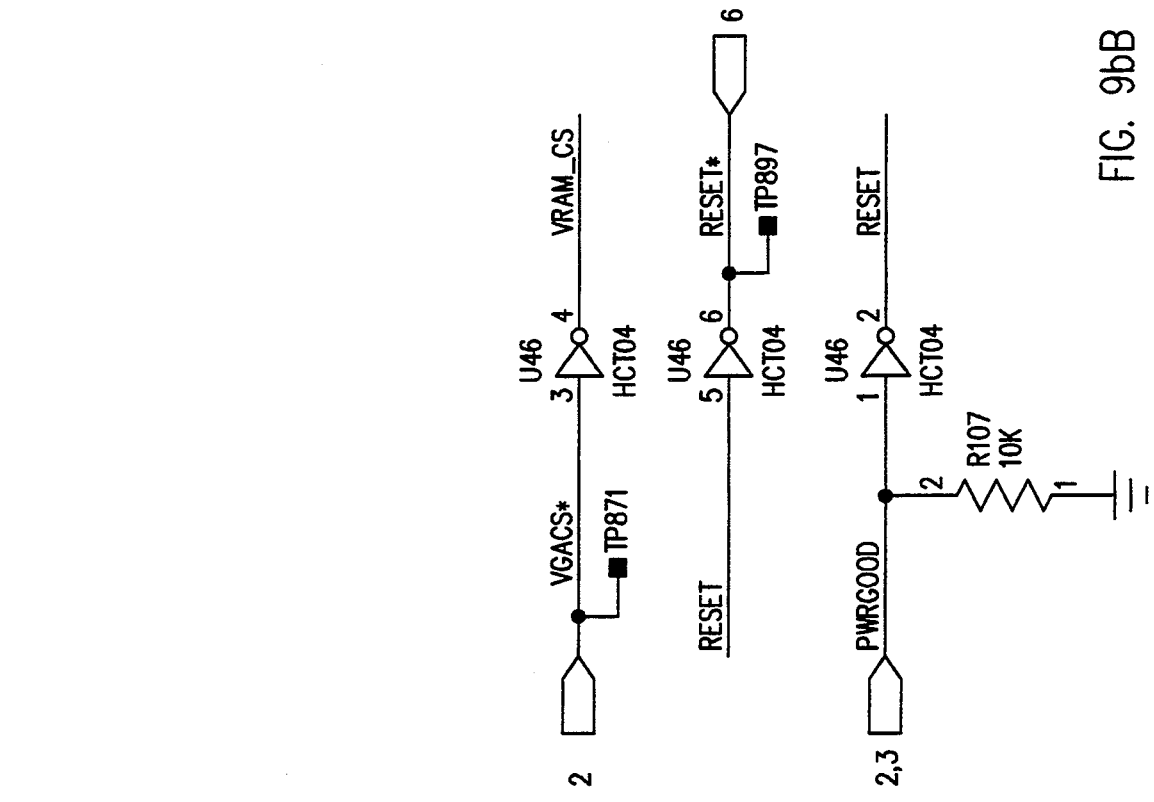
Figure 9B:
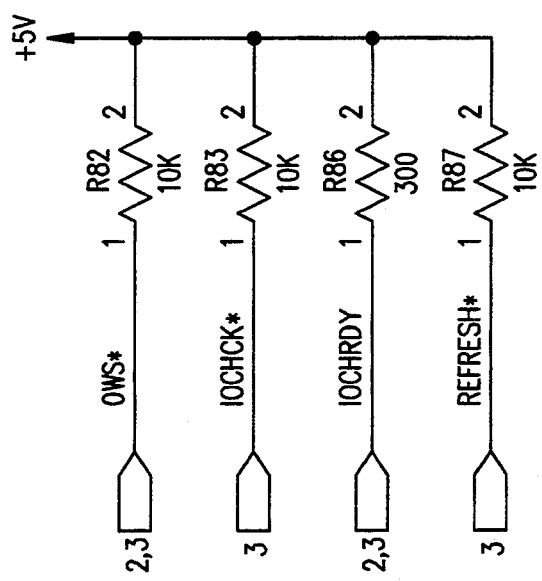
Figure 9B:
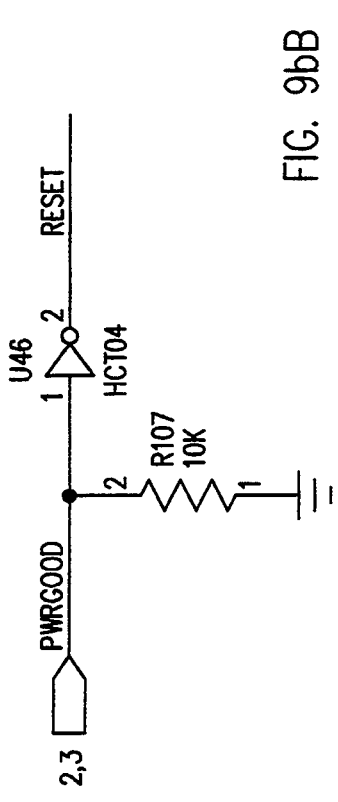
Figure 9B:
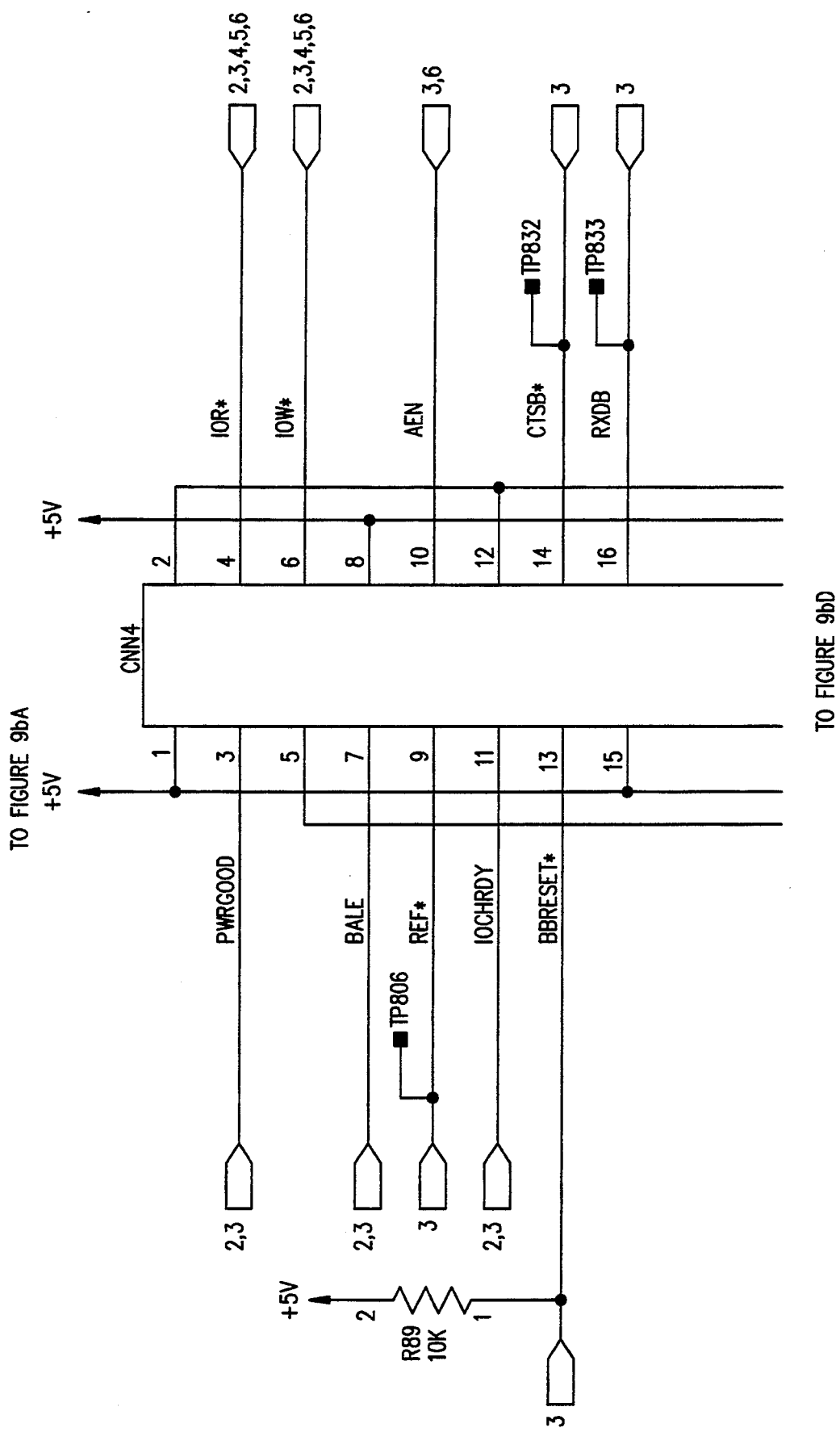
Figure 9B:
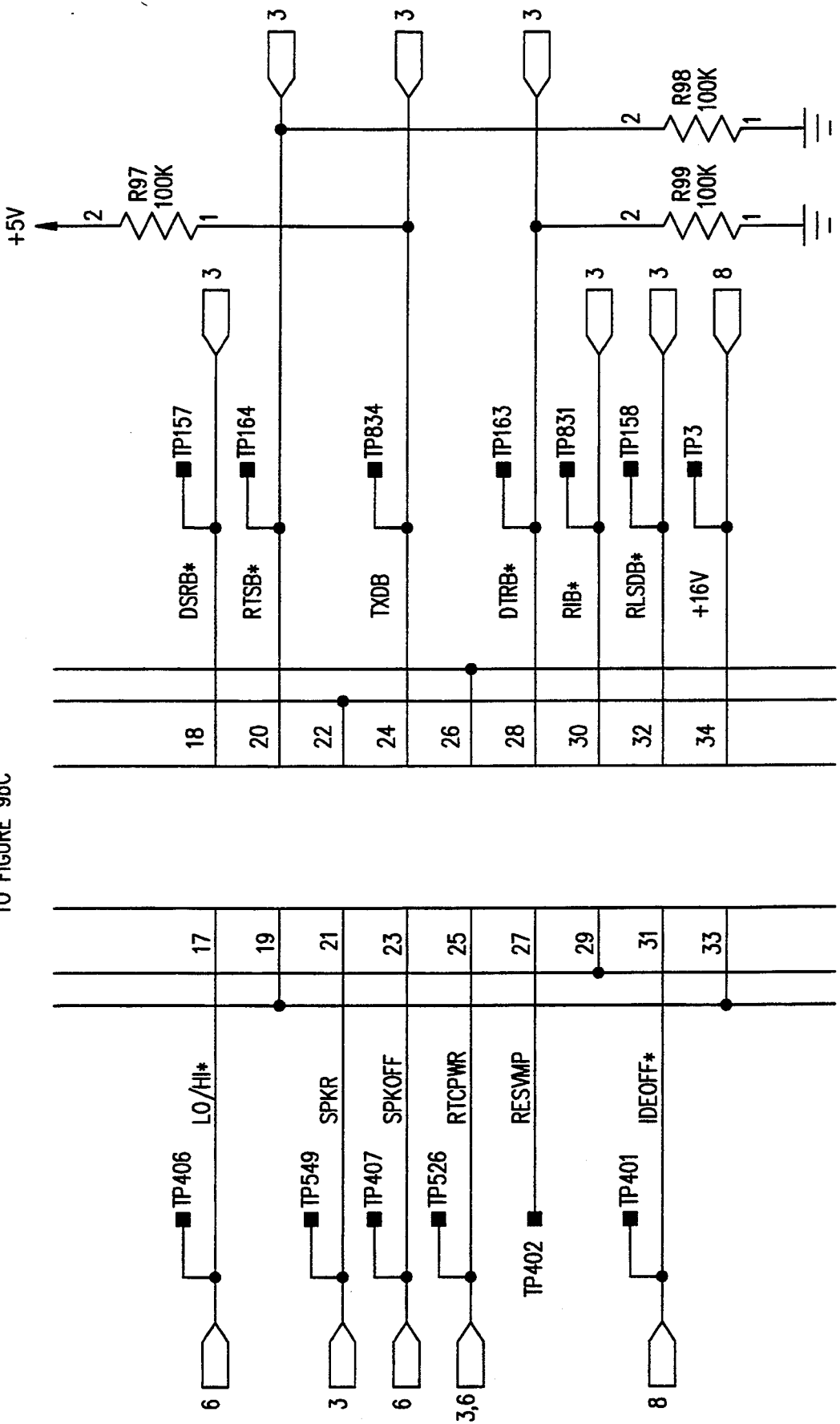
Figure 9B:
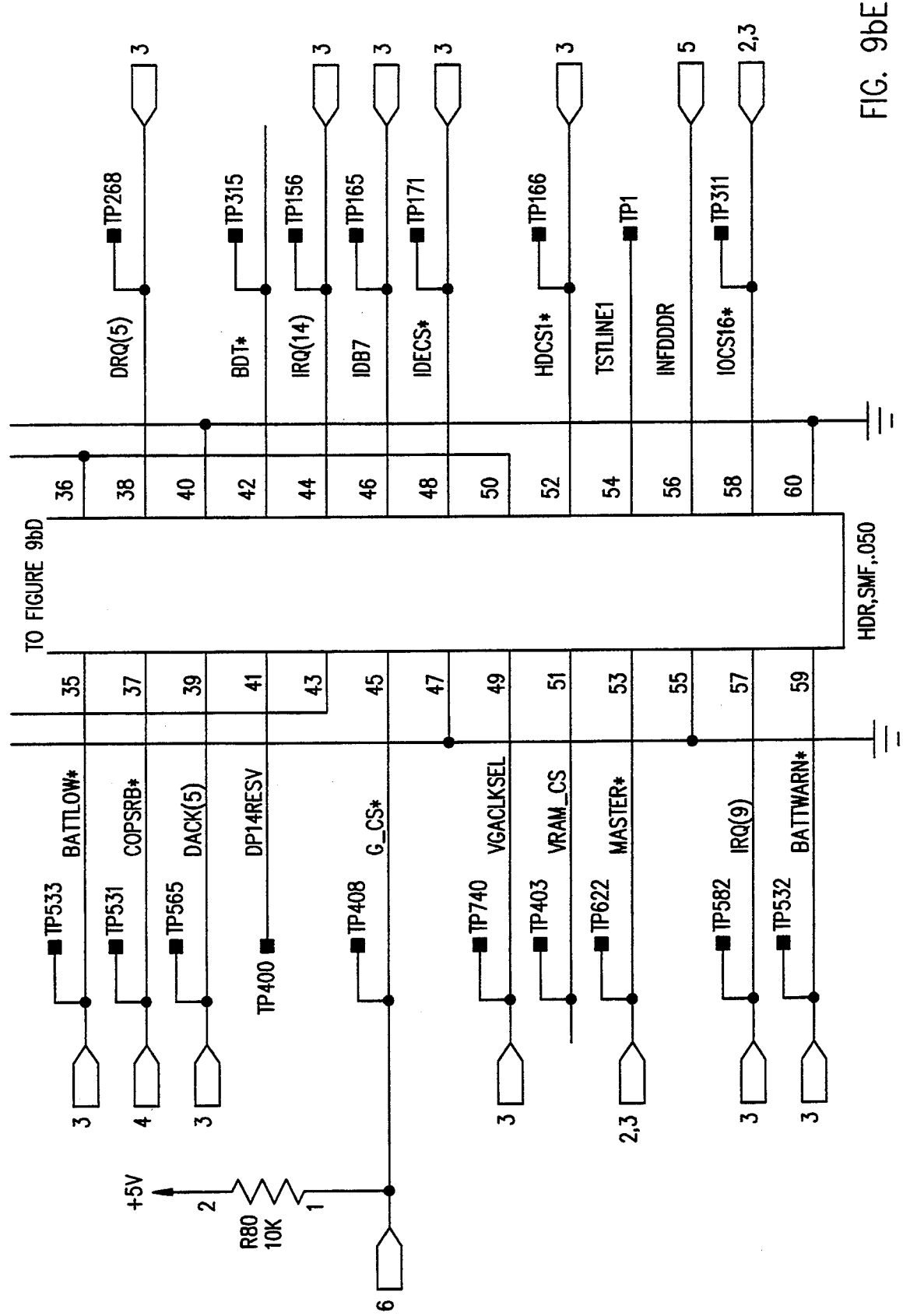
Figure 10A:
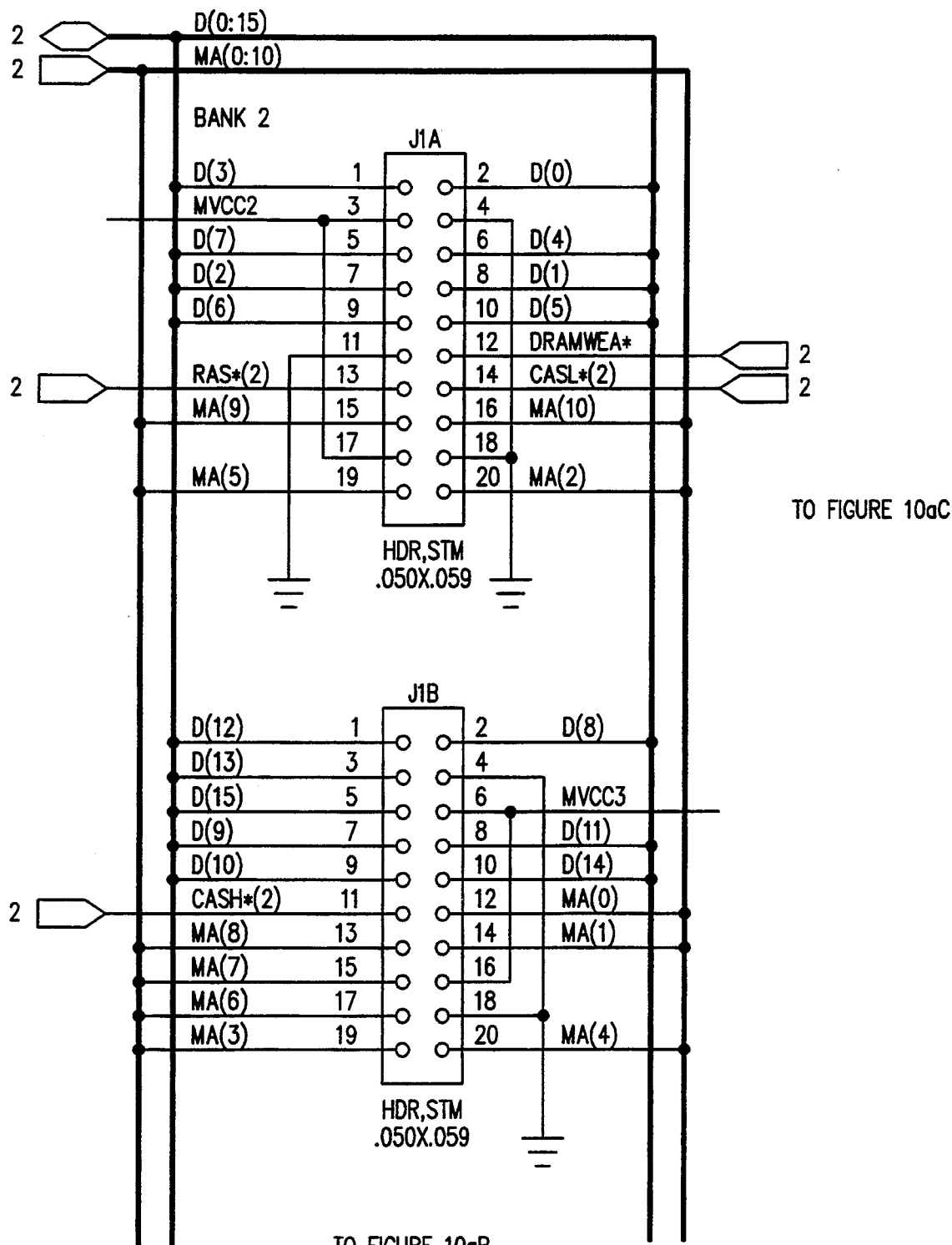
Figure 10A:
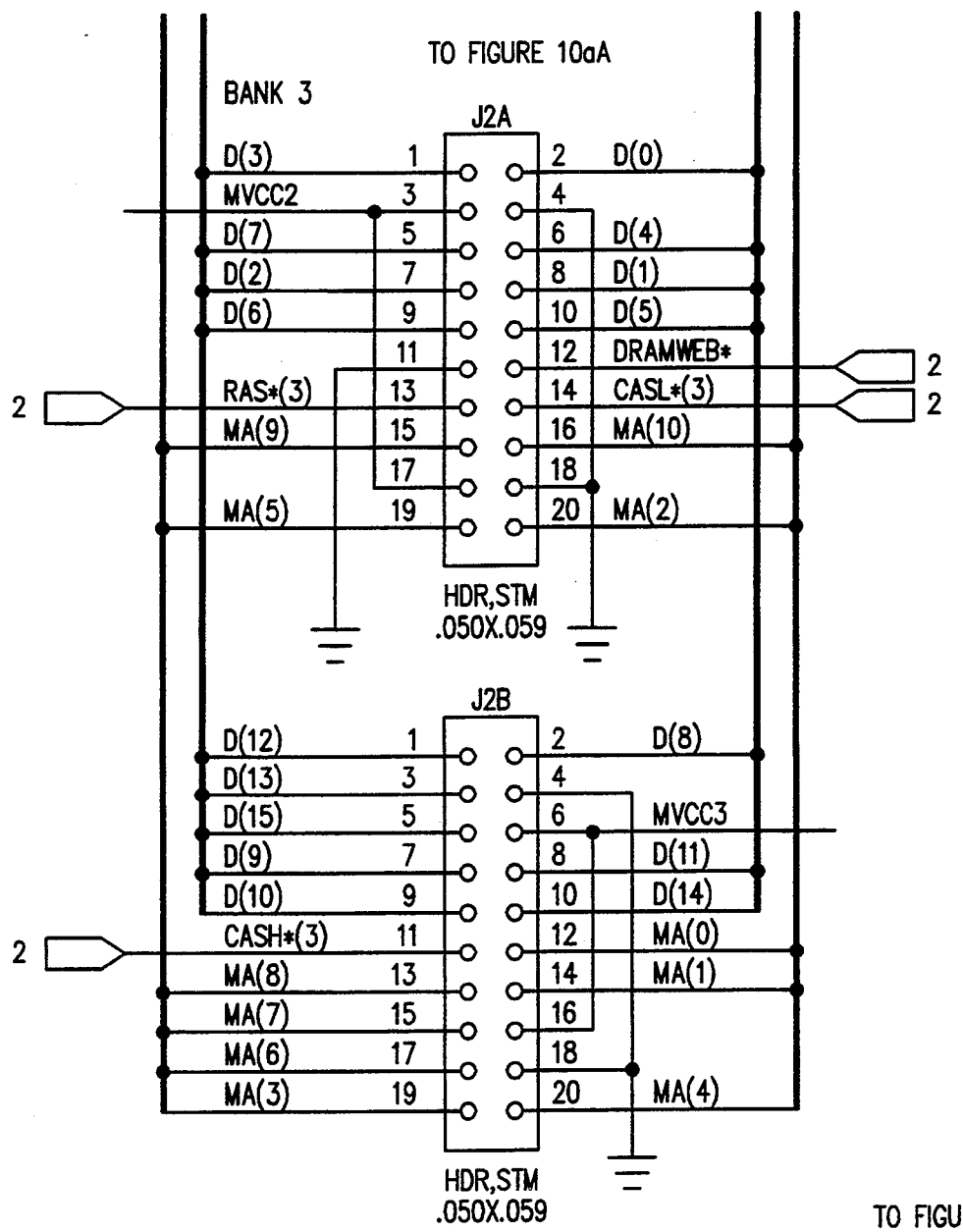
Figure 10A:
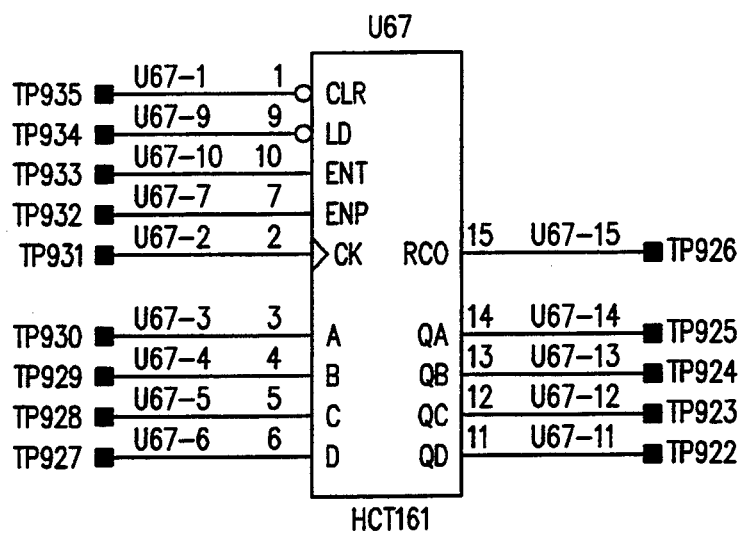
Figure 10A:
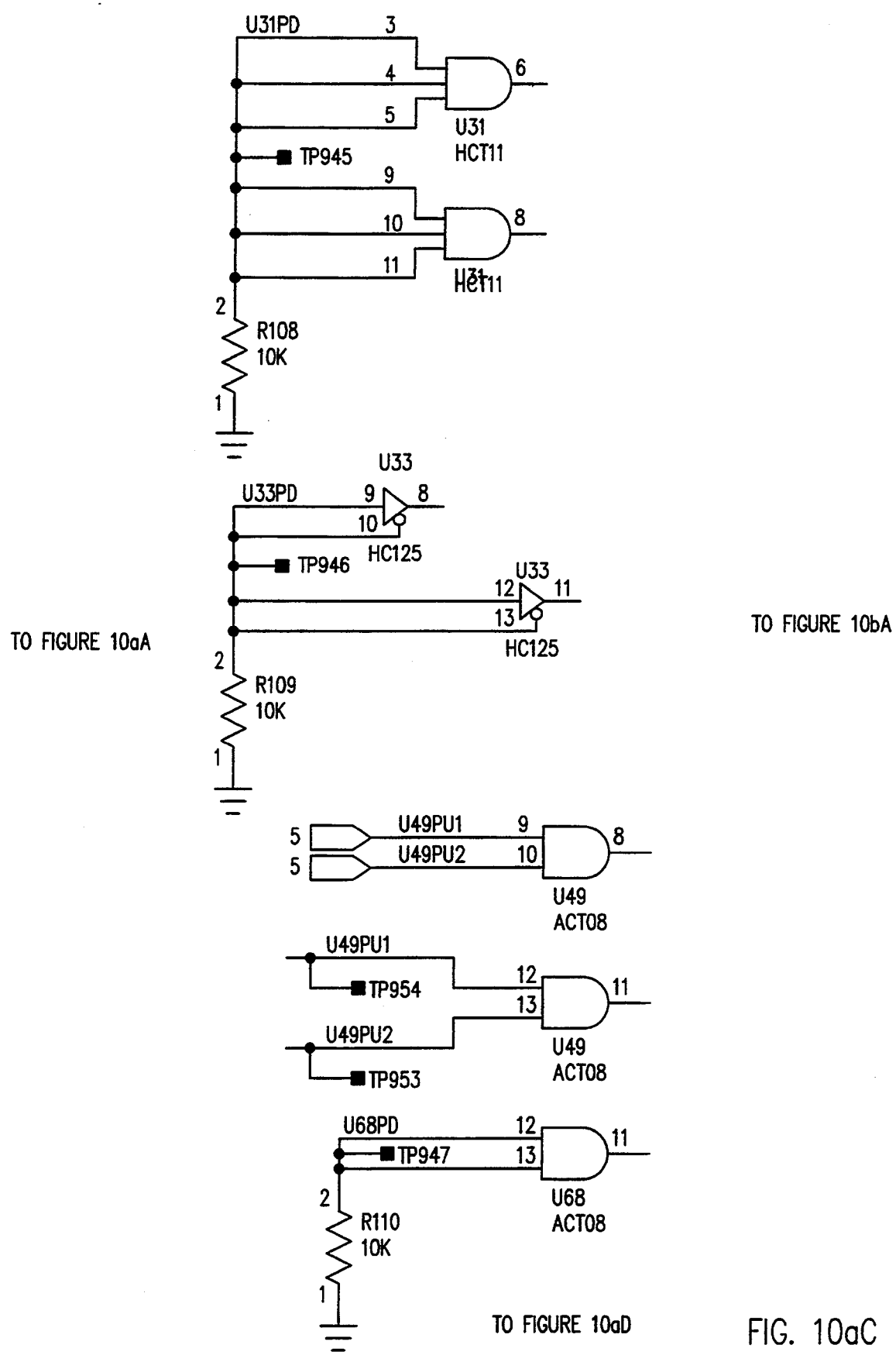
Figure 10A:
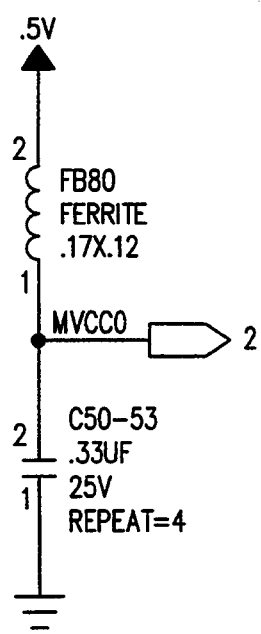
Figure 10A:
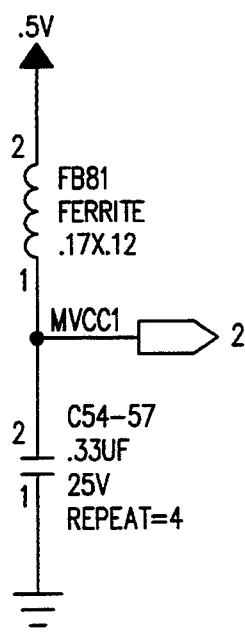
Figure 10A:
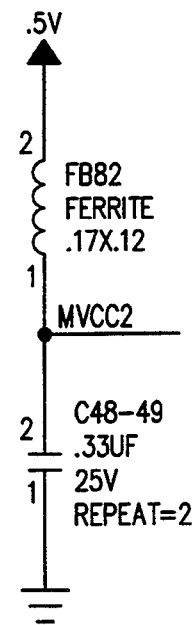
Figure 10B:
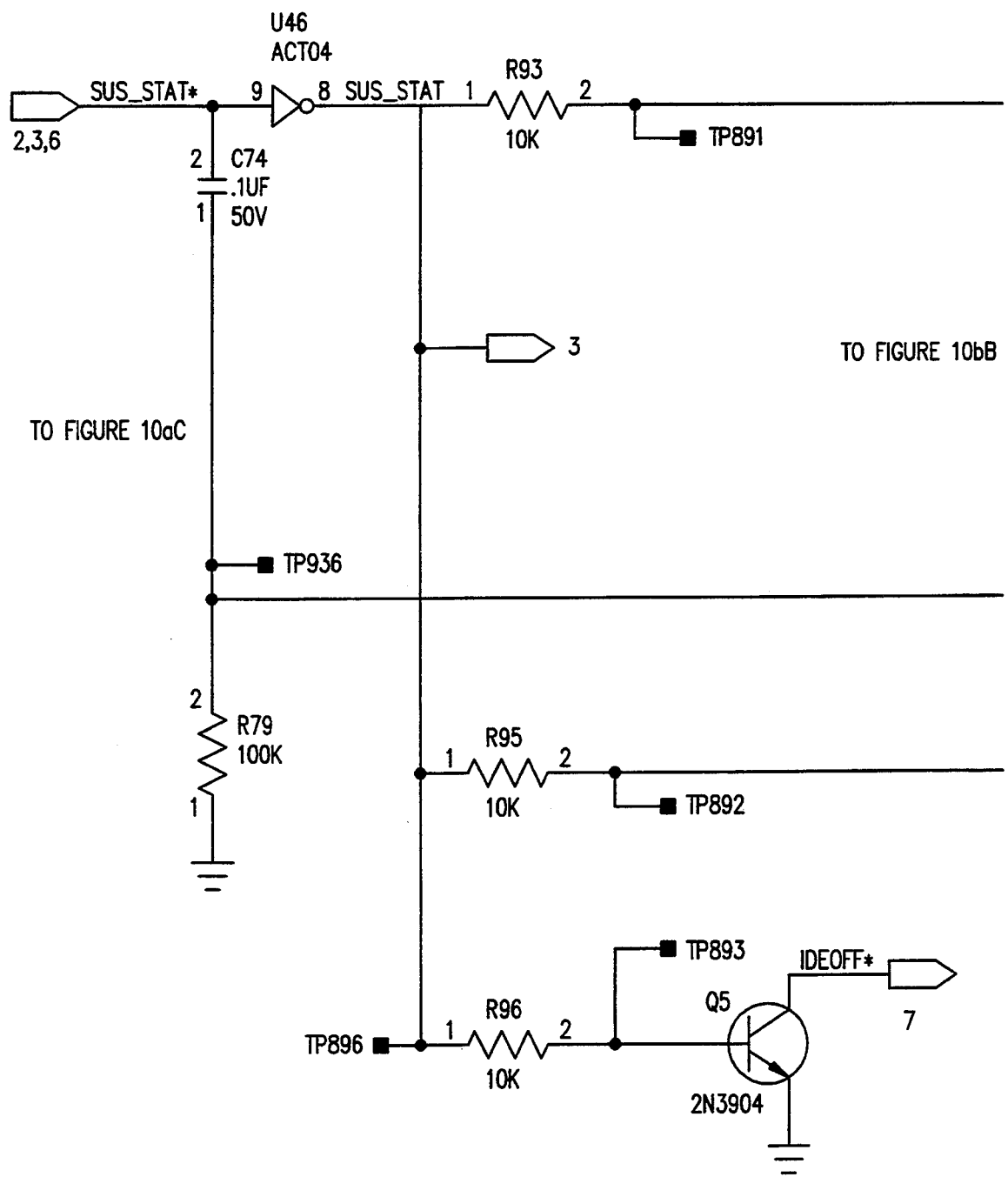
Figure 10B:
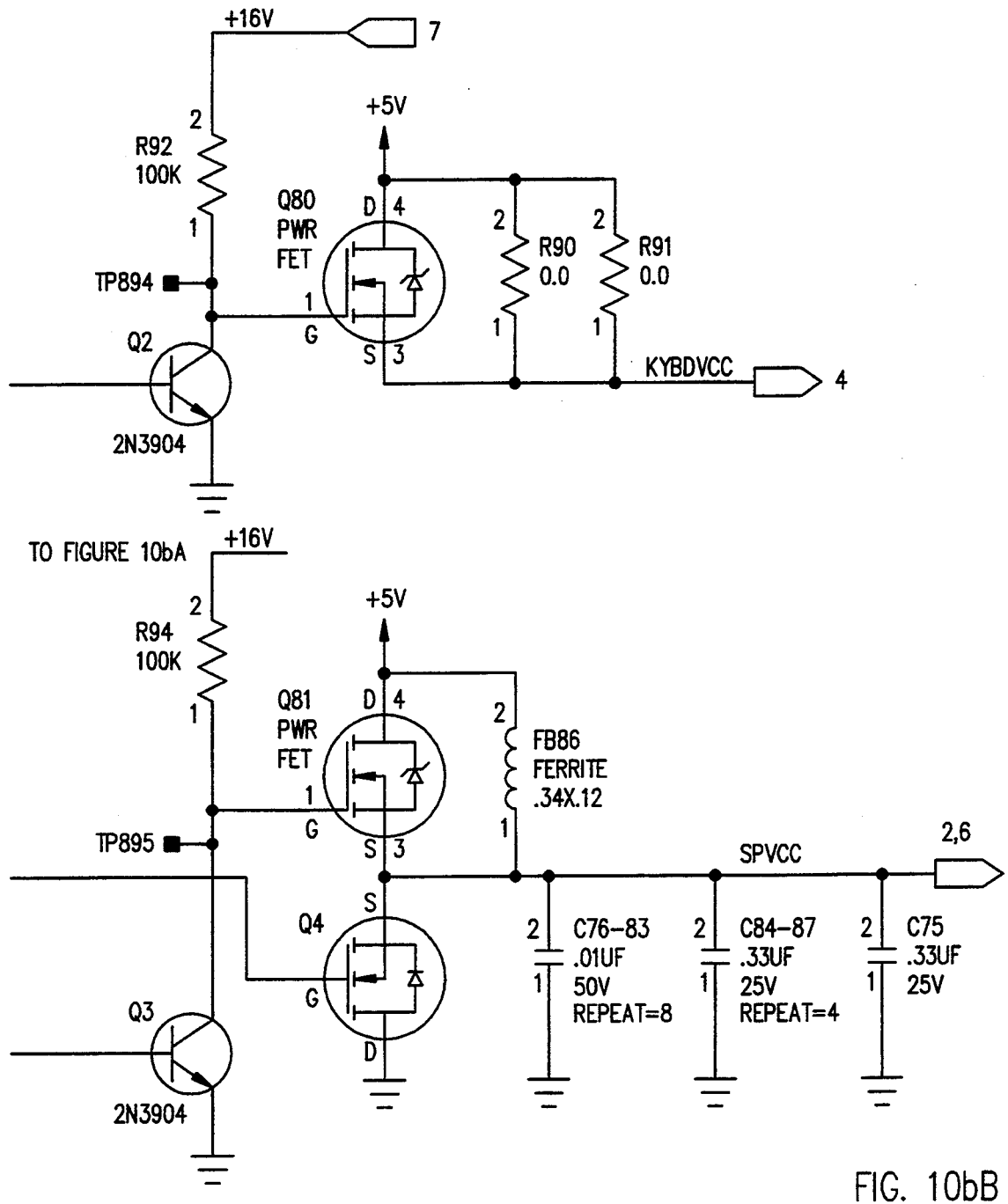
Figure 10B:
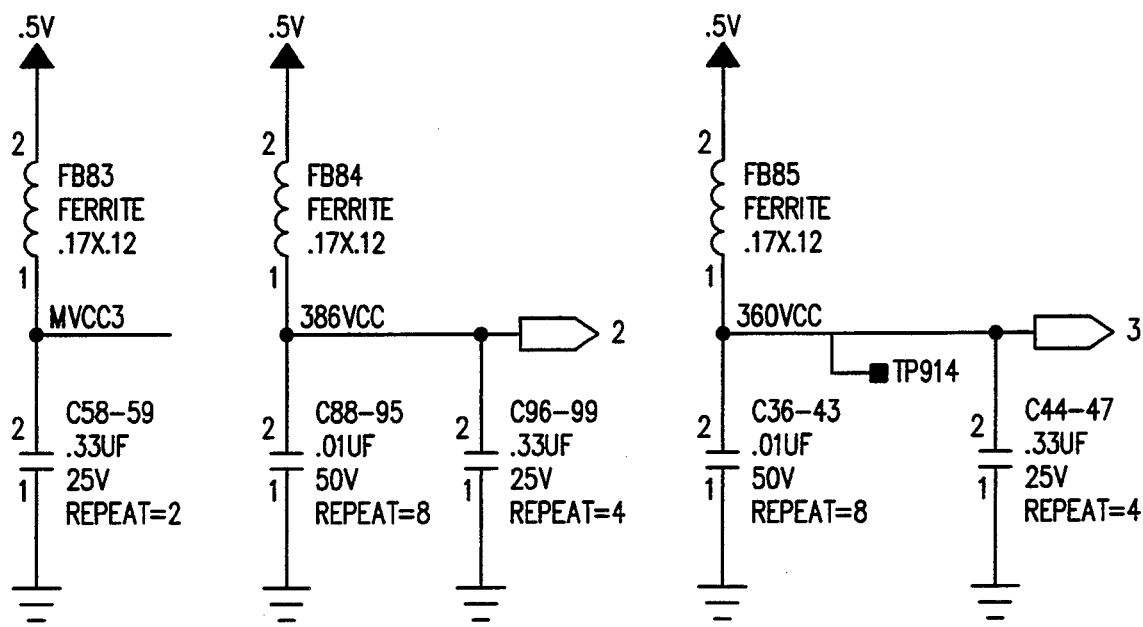

FIGS. 3a–b (which fit together to form one schematic diagram) indicate the functional portions of chips 202 and 206 and a slightly different selection of other items but does not include the items of FIG. 2 which are located on the bottom board (within broken line in the center of FIG. 2), and FIGS. 4a–10b illustrate the wiring in more detail. In particular, 80386SL chip 202 appears in FIG. 4b along with the cache 203A, DRAM memory 203, and math coprocessor 209 in FIG. 4a. 82360SL chip 206 appears in FIG. 5b along with EPROM 201 in FIG. 5a. Keyboard controller 210 is in FIG. 6a with the external keyboard connector and mouse connector in the lower righthand portion of FIG. 6b. Clock generator 204 appears in FIG. 8a.

The external clock is divided down to provide the CPU clock, any math coprocessor clock, and internal clock signals. The maximum CPU clock frequency is one half the EFI (external frequency input), but EFI may be further divided to generate the CPU clock: the contents of the CPUPWRMODE register within 386SX core may provide further division by 2, 4, or 8 (or even stopping the CPU clock). The CPU clock frequency sets the machine cycle time, and thus basically the CPU clock frequency determines the number of transistor switchings per second. The power consumed by 80386SL 202, memory 203, 82360SL 206, . . . occurs primarily during transistor switchings; that is, the typical CMOS devices making up the circuitry have virtually zero static power consumption. Of course, power consumed by items such as display screen backlighting, DRAM refresh, and the real time clock will be independent of the machine cycle time; however, the bulk of the circuitry, which represents about half of the power in a backlit-screen system, will consume power roughly in proportion to the CPU clock frequency. System 100 also has APM advanced power management compatible BIOS.

Figure 11:
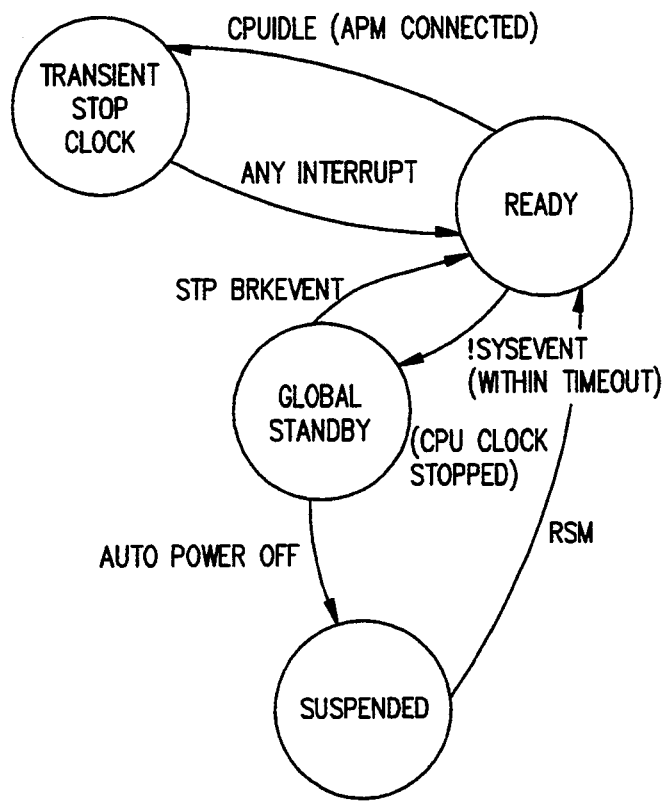
FIG. 11 shows a prior art state diagram.

FIG. 11 shows a prior art state diagram which may be adapted to the hardware system of FIGS. 1–10b with APM. In particular, first consider the system in the Ready state. If no System Event occurs for the time programmed in the Global Standby Timer, then a SMI is generated and the power management interrupt handler puts the system into the Global Standby state. The choice of System Events is by setting bits in the system events registers (SYS_EVNT_CFG0-SYS_EVNT_CFG2); the available bits correspond to any of the sixteen interrupts IRQ0–IRQ15 plus the following events RING_SEL (modem ring detect), INTR_SEL (any active interrupt), NMI_SEL (nonmaskable interrupt), PERR_SEL (parity error), IOCHCHK_SEL (active I/O channel check), and SUS_EVNT_SEL (hardware suspend events).

When in Global Standby state, the system has an Auto Power Off Timer which times out in a user selected time interval and starts the countdown of its Suspend Warning Timer which times out in 1 second. The occurrence of a Stop Break Event resets the timers and switches the system from Global Standby state back into the Ready state. The Stop Break Events are selected from the same items as the System Events. A timeout of the Suspend Warning Timer switches the system into the Suspend state through an SMI request. Once the Suspend state is entered, then a resume (RSM) as from a pulse of the Suspend/Resume button, a ring indication signal on the serial port, or an alarm from the real time clock will provide transition to the ready state.

If a CPU Idle call occurs when APM is connected and the system is in the Ready state, then the system moves into the Transient Stop Clock state which stops the clock but does not reset any timer. Any interrupt will bring the system back to the Ready state.

Figure 12:
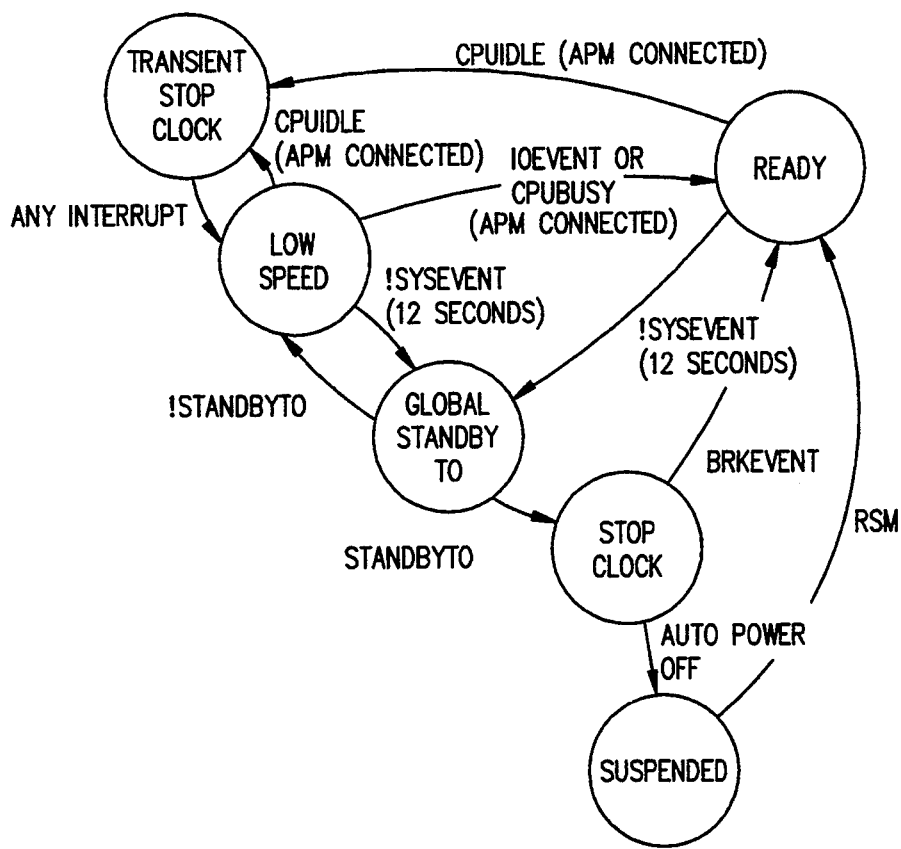
FIG. 12 illustrates a preferred embodiment state diagram.

FIG. 12 illustrates the state diagram for first preferred embodiment system 100 which provides for standby states with both a low speed clock and a stopped clock. The low speed clock permits detection of I/O events which may not generate interrupts. In particular, for an application such as data entry for a data base or word processing the keyboard will be intermittently used with gaps (such as to read the screen) on the order of tens of seconds during which running the CPU clock at one eighth its usual speed will save power but not freeze the screen.

Preferred embodiment 100 operates as follows. First consider the system in the Ready state. The SL system global standby timer counts down from 12 seconds (with time provided by real time clock 110), but the occurrence of any System Event, defined as an interrupt from keyboard 130, communication port 134, mouse 132, floppy disk controller 136, or hard disk controller (that is, an IRQ1, IRQ3, IRQ4, IRQ6, IRQ12, or IRQ14 interrupt), will reset the SL system global standby timer. The logical OR of these interrupts is denoted as SYSEVENT (system event), so SYSEVENT remaining false during the 12 seconds countdown leads to an SMI handler that divides the CPU clock frequency by a factor of 8, decrements a System Timeout software counter, and resets the 12 second SL system global standby timer. This is illustrated as the !SYSEVENT path state change from the Ready state to the transient Global Standby TO (global standby timeout) state and then immediately to the Low Speed state in FIG. 12 by the !STANDBYTO path. If STANDBYTO were true, then the STANDBYTO path from the transient Global Standby TO state to the Stop Clock state would be followed. STANDBYTO denotes the logical AND of !IOEVENT, !SYSEVENT, and !SYSTIMEOUT where SYSTIMEOUT denotes the System Timeout counter containing a positive count and IOEVENT denotes the logical OR of I/O activity events of the keyboard, either the first serial port (COM1) or the second serial port (COM2), the floppy disk drive, the hard disk drive, or the mouse. The System Timeout counter typically has a number such as 15 or 20 loaded initially, although this is programmable in software. A count such as 15 or 20 will lead to a 3 to 4 minute system timeout as described in the following. The entry into the Global Standby TO state decrements the System Timeout counter.

Alternatively, if during the 12 second interval in the Ready state (with APM connected) a CPU Idle call is made, then the CPU Idle function stops the CPU clock but has no effect on the SL system global standby timer. This is illustrated by the CPUIDLE state change path in FIG. 12 from the Ready state to the Transient Stop Clock state. Any interrupt will move the system from the Transient Stop Clock state to the Low Speed state.

When the 12 second countdown of the SL system global standby timer expires while the system is in the Low Speed state, the SMI handler puts the system into the transient Global Standby state and then immediately back into either the Low Speed state or the Clock Stop state, again depending upon STANDBYTO. FIG. 12 illustrates this with the !SYSEVENT path from the Low Speed state to the Global Standby TO state and then either the STANDBYTO path to the Clock Stop state or the !STANDBYTO path to the Low Speed state. Again, entry into the Global Standby TO state decrements the System Timeout counter and resets the SL system global standby timer. Note that when the System Timeout counter reaches zero, then STANDBYTO will become true and the exit from the Global Standby TO state will be to the Stop Clock state.

A CPU Busy call or an I/O event will switch the system from the Low Speed state back into the Ready state and reset the SL system global standby timer (12 seconds) and the System Timeout count. FIG. 12 illustrates this state change by the IOEVENT or CPUBUSY path. The Low Speed state permits power saving in time intervals such as pauses to read the screen between data entry or word processing interactions without stopping the CPU clock. And if the pause extends to 3 or 4 minutes, then the System Timeout counter will have counted down and the system will go into the Stop Clock state.

When in the transient Global Standby TO state if no system event occurs (!SYSEVENT true) and if no I/O event occurs (!IOEVENT true) and if the System Timeout counter has reached zero (!SYSTIMEOUT), then STANDBYTO is true and the SMI handler stops the CPU clock and the system enters the Stop Clock state as illustrated in FIG. 12. Note that for the System Timeout counter to reach zero the Global Standby TO state must have been entered 15 or 20 times and with a 12 second timeout to enter Global Standby TO, this means a total of 3 or 4 minutes of no system events or I/O events.

Once in the Stop Clock state the Auto Power Off Timer and its subsequent Auto Power Off Warning Timer are loaded and countdown as previously described; and if both timers time out, then the SMI handler puts the system into the Suspend state. The Auto Power Off Timer is loaded with a user selected time interval and when this expires the Power Off Warning Timer is then loaded with 1 second. However, the occurrence of a break event will switch the system from the Stop Clock state back to the Ready state. The break events are the interrupts IRQ1 (keyboard), IRQ3 (COM2), IRQ4 (COM1), IRQ8 (real time clock), and IRQ12 (mouse), and their logical OR is denoted BRKEVENT in FIG. 3. And the only escape from the Suspend state is a resume (RSM) event: a pulse of the Suspend/Resume button, a ring indication (modem) signal on the serial port, or an alarm from the real time clock will provide transition to the ready state.

The net effect of the states of FIG. 12 compared to those of FIG. 11 is a splitting of the Global Standby state (with CPU clock stopped) into three states: Low Speed, the transient Global Standby TO, and Stop Clock with CPU clock running slowly in two of the three states. A running CPU clock permits monitoring of I/O events that do not generate interrupts.

A Hot Key to disable the Low Speed state keeps the CPU clock at full speed during operations such as spreadsheet calculations which may not generate any interrupts or I/O events. A Hot Key to reenable the Low Speed state is also available.

Peripherals such as a hard disk drive and an LCD screen with backlighting will have their own local power management and may power down independently of the global standby and auto suspend of the SL system. Preferred embodiment 100 also has the option of disabling the power management of FIG. 12 and reverting to FIG. 11 power management.

Software Implementation Details

Following in the Appendix is a sample specific implementation of software portions of the disclosed innovations. This example is intended to better illustrate the disclosed generally applicable innovations, and to comply with the best-mode requirements of US patent law; but of course this specific implementation is subject to change (and will certainly be changed as time goes by), and can be altered, as will be apparent to those skilled in the art, in many details.

The code portions set forth below in the Appendix provide the most relevant portions of the code used, but of course these code portions are used in combination with large additional portions of code. In the presently preferred embodiment, the software structure given below is used in combination with Phoenix TM BIOS code; but several vendors (such as AMI) offer BIOS software, and the disclosed code can be used with another vendor's BIOS code if desired. (Of course, minor adjustments would have to be made to the called routine names, etc.)

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, the APM and the associated CPU Idle and CPU Busy calls could be omitted along with the Transient Stop Clock state, the values loaded into timers could be varied, such as the Global SL system timer may be in multiples of 4 seconds with the Intel chip set, the system counter could have larger or smaller counts loaded in order to provide for longer or shorter time intervals of slow speed operation prior to a switch to a stopped clock. Other combinations of events could be used for any of SYSEVENT, IOEVENT, and BRKEVENT.

```
sys_evnt_mask1     equ    5ah    ;5ah select kb, com1, com2, fdd
sys_evnt_mask2     equ    50h    ;50h select hdd and mouse
stop_break_mask1 equ     1ah    ;select kb,com1 mouse,com2 mouse
stop_break_mask2 equ    11h    ;select rtc alarm and mouse
hw_susreq_bit equ   1
asw_req_bit    equ    5
sw_req_bit     equ    0
lstdby_req_bit equ    3
ltrp_req_bit   equ    4
ext_smi_req_bit equ   6
gstdby_req_bit equ    2 ddcmode_feature db   disbl
ddcmode_control db   disbl
```

```
apwroff_count   dw      16
smi_req_sts_byte dw     00
ddcflag         db      off
dev0_lstdby_feature  db  disbl
dev1_lstdby_feature  db  disbl
dev2_lstdby_feature  db  disbl
dev3_lstdby_feature  db  disbl
dev4_lstdby_feature  db  disbl
dev5_lstdby_feature  db  disbl
dev0_lstdby_feature_save  db  disbl
dev1_lstdby_feature_save  db  disbl
dev2_lstdby_feature_save  db  disbl
dev3_lstdby_feature_save  db  disbl
dev4_lstdby_feature_save  db  disbl
dev5_lstdby_feature_save  db  disbl
ltrp_sts_byte   db      00h
systimeouthack  dw      1
systimeout      dw      1
cursystimeout   dw      1
perflag         db      off
apwroff_count   dw      16
apwroff_enable  db      enbl
dev0_lstdby_stat db     on
dev1_lstdby_stat db     on
dev2_lstdby_stat db     on
dev3_lstdby_stat db     on
dev4_lstdby_stat db     on
dev5_lstdby_stat db     on
hdd_stat        db      on
backlight_stat  db      on
lcdpanel_stat   db      on
dmahackflag     db      0
sm_req_cntrl_save db    0
userspeed       db      0
connect_flag    db      false
cpupwrmode_save dw      0
old_rtc_index   db      00h
sys_evnt0_byte         db  00h
sys_evnt1_byte         db  00h
sys_evnt2_byte         db  00h org     8000h
;entry module follows.this code sequence is executed everytime an smi occurs.
;------segment init follows.(pm code and data are within 64k)
        jmp     short pm_module
        db      "intel pm",00
pm_module:
        jmp     overdata
``` overdata:
```
            cli                             ;no interrupts..
            cld mov     ax,cs                   ;get code seg.
            mov     ds,ax                   ;initialise ds.
            mov     es,ax                   ;initialise es.
            mov     ss,ax                   ;initialise ss.
            mov     sp,stack_top            ;initialise stack pointer.

;----------------------------------------------------
; lock up the cpupwrmode register first.
            lock_cpupwrmode
            open_82360sl                    ;open 360 sl space..

alter_82360sl  cfgr1,0ffh,4             ;sm timers off read_82360sl   shnmimask mov     byte ptr [old_rtc_index],al     ;index and nmi
                                            ;mask saved...
    lock_82360sl unlock_cpupwrmode        ; full speed in SMI handler
    in      ax,cpupwrmode
    mov     [cpupwrmode_save],ax
    and     ax,0ffcfh
    out     cpupwrmode,ax
    lock_cpupwrmode mov     al,8dh                  ;no nmi.
    out     cmosadd,al jmp     $+2                     ;a recovery delay for cmos.
    jmp     $+2
    jmp     $+2
    in      al,cmosdata
    jmp     $+2                     ;a recovery delay for cmos.
    jmp     $+2
    jmp     $+2 open_82360sl
    read_82360sl   sm_req_sts       ; read sm_req_sts register.
    mov     cl,al mov     byte ptr [smi_req_sts_byte],al
```

```
exit_smi:
        btr     [smi_req_sts_byte],asw_req_bit       ; is it software asmi ?
        jc      asw_smi_process
        btr     [smi_req_sts_byte],hw_susreq_bit ; is it suspend ?
        jc      hw_susreq_process
        btr     [smi_req_sts_byte],sw_req_bit        ; is it software smi ?
        jc      sw_smi_process
        btr     [smi_req_sts_byte],ltrp_req_bit ; is it local trap ?
        jc      ltrp_req_process
        btr     [smi_req_sts_byte],lstdby_req_bit ; is it local standby ?
        jc      lstdby_req_process
        btr     [smi_req_sts_byte],ext_smi_req_bit ; is it ext smi ?
        jc      ext_smi_process
        btr     [smi_req_sts_byte],gstdby_req_bit ; is it global standby ?
        jc      gstdby_req_process asmi_exit:

lock_82360sl
        lock_cpupwrmode mov     al,byte ptr [old_rtc_index]
        out     cmosadd,al              ;application index restored.

lock_cpupwrmode
        open_82360sl                    ;open 360 sl space..

alter_82360sl  cfgr1,0fbh,0     ;sm timers on

;----------------------------------------
;enable smi by writing to smi_clr register.

write_82360sl  smi_clr,00       ; write the 82360sl register.
;----------------------------------------
;enable cpu reset by 82360sl by writing to smi_mark register.

write_82360sl  smi_mark,00 ; write the 82360sl register.
;----------------------------------------
;close 82360sl space..

lock_82360sl unlock_cpupwrmode               ; restore CPU speed
        mov     ax,[cpupwrmode_save]
        out     cpupwrmode,ax
        lock_cpupwrmode

;----------------------------------------------------------------
```

;execute rsm instruction to get back to the application.

```
        db      0fh,0aah        ; no assembler knows this yet.ha.ha..

asw_smi_process:                        ; APM flows through here
        alter_82360sl   sm_req_sts,0dfh,00h read_xmos       XCM_SMIresumeflag
        cmp     al,55h
        je      resume_process
        jmp     apm_req lstdby_req_process :
        read_82360sl    lstdby_sts
        push    ax
        TREPORT ,<LsbE>
        pop     ax
        push    ax
        mov     cl,al
        shr     al,4
        HEXASC
        mov     ch,al
        mov     al,cl
        and     al,0fh
        HEXASC mov     dx,SMARTVU
        out     dx,al
        inc     dx
        mov     al,ch
        out     dx,al
        pop     ax cmp     al,00h                  ;is there a local stdby req ?
        jnz     short lstdby_ok lstdby_sts_faulty :
        TREPORT ,<LsbE>
        alter_82360sl   sm_req_sts,0f7h,00h
        jmp     exit_smi ;local standby processing begins here...

lstdby_ok :
        test    al,dev0_stdbyreq        ;test for first device..
        jz      short next_local_1      ;if not try next.
```

```
                push    ax
                alter_82360sl lstdby_sts,0feh,00h
                pop     ax
;----------------------------------------------------------------
next_local_1 :

test    al,dev1_stdbyreq        ;test for second device..
                jz      next_local_2            ;if not try next..

push    ax cmp     byte ptr [dev1_lstdby_stat],off
                je      skip_dev1_1 mov     al,"1"                  ;al = 4ch is lstdby code.
                call near ptr manage_local_1 ;put the device to standby.

;we flag the device off..

skip_dev1_1:
                alter_82360sl lstdby_sts,0fdh,00h
                pop     ax
;----------------------------------------------------------------
next_local_2 :

test    al,dev2_stdbyreq        ;test for third device..
                jz      short next_local_3      ;if not try next..

push    ax
                cmp     byte ptr [dev2_lstdby_stat],off
                jz      short skip_dev2_1 mov     al,"1"                  ;al = 4ch is lstdby code.
                call near ptr manage_local_2 ;put the device to standby.

;we flag the device off..

skip_dev2_1:
                alter_82360sl lstdby_sts,0fbh,00h
                pop     ax
;----------------------------------------------------------------
next_local_3 :

test    al,dev3_stdbyreq        ;test for fourth device..
                jz      short next_local_4      ;if not try next.

push    ax
                cmp     byte ptr [dev3_lstdby_stat],off
                jz      short skip_hdd3_1
```

```
                mov     al,"l"                  ;al = 4ch is lstdby code.
                call    near ptr manage_local_3 ;put the device to standby.

;we flag the device off..

skip_hdd3_l:
                alter_82360sl   lstdby_sts,0f7h,00h
                pop     ax next_local_4 :
                test    al,dev4_stdbyreq
                jz      short next_local_5 push    ax
                alter_82360sl   lstdby_sts,0efh,00h

;----------------------------------------------------------------
;at present local standby timer 5 is not used...
                pop     ax
next_local_5 :
                test    al,dev5_stdbyreq
                jz      short local_stdby_exit alter_82360sl   lstdby_sts,0dfh,00h local_stdby_exit :
                alter_82360sl   sm_req_sts,0f7h,00h jmp     exit_smi ltrp_req_process :

read_82360sl    ltrp_sts cmp     al,00h                  ;no request bit set ?
                jnz     short ltrp_ok           ;if set ok else trap faulty.

;no trap request bit is set , so report the error and exit.

ltrp_faulty :
                alter_82360sl   sm_req_sts,0efh,00h
                TREPORT ,<LtpE>
                jmp     exit_smi
ltrp_ok :

;now we begin trap processing...

mov     byte ptr [ltrp_sts_byte],al
```

```
            test    al,dev0_trpreq          ;is it trap 0 ??
            jz      short next_trp_1        ;try next...

push    ax mov     al,"t"                  ;trap management code = t
            call near ptr manage_local_0
            cmp     [ddcflag],off
            je      skip_ddc_on_0
            mov     al,"t"
            call near ptr manage_local_4
skip_ddc_on_0:
            alter_82360sl ltrp_sts,0feh,00h ;reset trap request..
            pop     ax
;--------------------------------------------------
next_trp_1 :
            test    al,dev1_trpreq
            jz      short next_trp_2 push    ax cmp     byte ptr [dev1_lstdby_stat],on
            je      skip_dev1_t
            mov     al,"t"
            call near ptr manage_local_1
skip_dev1_t:

cmp     [ddcflag],off
            je      skip_ddc_on_1
            mov     al,"t"
            call near ptr manage_local_4
skip_ddc_on_1:

alter_82360sl ltrp_sts,0fdh,00h
            pop     ax

;--------------------------------------------------
next_trp_2 :
            test    al,dev2_trpreq
            jz      short next_trp_3
            push    ax cmp     byte ptr [dev2_lstdby_stat],on
            je      skip_dev2_t
            mov     al,"t"
            call near ptr manage_local_2
skip_dev2_t:
```

```
                cmp     [ddcflag],off
                je      skip_ddc_on_2
                mov     al,"t"
                call    near ptr manage_local_4
skip_ddc_on_2:

alter_82360sl ltrp_sts,0fbh,00h
                pop     ax
;----------------------------------------------------
next_trp_3 :
                test    al,dev3_trpreq
                jz      short next_trp_4 push    ax cmp     byte ptr [dev3_lstdby_stat],on
                je      norestart
                mov     al,"t"
                call    near ptr manage_local_3
                mov     ds:byte ptr [IOrestart],0ffh    ; restart HD I/O
norestart:

cmp     [ddcflag],off
                je      skip_ddc_on_3
                mov     al,"t"
                call    near ptr manage_local_4
skip_ddc_on_3:

alter_82360sl ltrp_sts,0f7h,00h
                pop     ax
;----------------------------------------------------
next_trp_4 :
                test    al,dev4_trpreq
                jz      short next_trp_5 push    ax
                mov     al,"t"
                call    near ptr manage_local_4 alter_82360sl ltrp_sts,0efh,00h
                pop     ax
;----------------------------------------------------
next_trp_5 :
                test    al,dev5_trpreq
                jz      short exit_trp push    ax
                mov     al,"t"
```

```
                call  near ptr manage_local_4
                alter_82360sl ltrp_sts,0bfh,00h
                pop   ax
;----------------------------------------------------------------
exit_trp :
;now we reset the group request bit of the trap system.

alter_82360sl sm_req_sts,0efh,00h
                jmp   exit_smi

;----------------------------------------------------------------
;
;
; global standby in the 360 is always set to 4 seconds (presently this
; appears as a periodic 12 second timer with the current B0 step 360).
; A software timer is used for the users selected Standby Timeout.
; If no IO events occured in the last 12 seconds the clock speed
; is dropped to CLK/8 and the SW counter decremented; otherwise,
; the CPU is set to run at full speed and the SW counter reset.
;
; The user's selected Standby timeout would be set through the
; automatic system management trap.
;
gstdby_req_process :

;----------------------------------------------------------------
;apm support is provided here...

mov   al,stdbyrequest
                extrn apm_event_process:near
                call  near ptr apm_event_process
                jc    noapmgstdby
                jmp   exit_smi
noapmgstdby:

open_82360sl alter_82360sl cfgr1,0fbh,0        ; sm timers on mov   [perflag],on
                cmp   [systimeouthack],0          ; DDC mode only
                je    gotone
                jmp   clearandbail
stopclock:

call  zf_iflcd
                jz    nolidcheck
```

```
                cmp     [lidclose],enbl             ; lid closed with
                je      noapwr                       ; crt
nolidcheck:
                cmp     [apwroff_enable],enbl
                jne     noapwr
                mov     cx,[apwroff_count]
                write_82360sl apwr_tmrh,<ch>
                write_82360sl apwr_tmrl,<cl>
                alter_82360sl apwr_tmrh,0ffh,80h
                jmp     overnoapwr
noapwr:
                alter_82360sl apwr_tmrh,07fh,0   ; kill apwr for now
overnoapwr:

cmp     byte ptr [dev3_1stdby_stat],off
                jz      short skip_hdd3off mov     al,"l"
                call near ptr manage_local_3
skip_hdd3off:

lock_82360sl
                mov     bl,0
                call    vga_sleep
                mov     [perflag],off
                open_82360sl
                alter_82360sl sm_req_sts,0ffh,80h cmp     byte ptr [dev1_1stdby_stat],off
                jz      short skip_backlight1off mov     al,"l"
                call near ptr manage_local_1
skip_backlight1off:

cmp     byte ptr [dev2_1stdby_stat],off
                jz      short skip_backlight2off mov     al,"l"
                call near ptr manage_local_2
skip_backlight2off:

mov     al,"t"
                call    manage_local_4
                lock_82360sl
                in      al,21h
                not     al
                and     al,stop_break_mask1
```

```
                mov     bl,al open_82360sl
        write_82360sl   stp_brk_cfg0,<bl>
        lock_82360sl in      al,0a1h
                not     al
                and     al,stop_break_mask2
                mov     bl,al open_82360sl read_82360sl    resume_mask
                test    al,4
                jz      alarmok
                and     bl,not 1
alarmok:
        write_82360sl   stp_brk_cfg1,<bl> write_82360sl   sys_evnt_cfg2,0    ; kill sys events read_82360sl    resume_mask
                test    al,2
                jz      ringok
        write_82360sl   stp_brk_cfg2,81h   ; enable sus only
                jmp     overenablering
ringok:
        write_82360sl   stp_brk_cfg2,83h   ; enable ring and sus
overenablering:

;------------------------------------------------------------
; WARNING: timing sensitive code
                mov     al,54h      ; reprogram the refresh for STP_CLK#
                jmp     $+2         ; coinciding with REFREQ problem
                jmp     $+2
                jmp     $+2
                out     43h,al
                mov     al,12h
                jmp     $+2
                jmp     $+2
                jmp     $+2
                out     41h,al db      10h dup (90h)      ;16 no ops (approx. 48 clocks)

read_82360sl    stp_clk
```

; WARNING: timing sensitive code

;-------------------------------------------------

```
                db      10h dup (90h)           ;16 no ops...

write_82360sl   stp_brk_cfg2,0
                lock_82360sl mov     bl,-1
                call    vga_sleep ;we reset the global standby request bit and also sys_in_stdby bit....
                mov     ax,[systimeouthack]
                mov     [cursystimeout],ax open_82360sl
novgasleep:
                alter_82360sl   sm_req_sts,7bh,00
                alter_82360sl   cfgr1,0ffh,4            ;sm timers off read_82360sl    sm_req_sts
                test            al,hw_susreq
                jz              no_auto_poweroff auto_poweroff:

;so we jump to the suspend module which processes it..
                write_82360sl   sys_evnt_cfg2,5         ; enable sys events
                jmp             hw_susreq_process clearandbail:
                cmp     [ddcflag],off           ; if no IO activity
                je      gotone                  ; decrement system
                mov     ax,[cursystimeout]      ; timeout counter
                or      ax,ax
                jz      stopclock               ; if zero, stop clock
                dec     ax
                mov     [cursystimeout],ax
                jmp     timedout gotone:
                mov     ax,[systimeouthack]
                mov     [cursystimeout],ax
timedout:
        push    ax
        TREPORT ,<Tick>
        pop     ax
```

```
            mov     cl,al shr     al,4
            HEXASC
            mov     ch,al
            mov     al,cl
            and     al,0fh
            HEXASC mov     dx,SMARTVU
            out     dx,al
            inc     dx
            mov     al,ch
          , out     dx,al mov     al,"1"
            call    manage_local_4
            jmp     novgasleep
;------------------------------------------------
no_auto_poweroff :
            write_82360sl  sys_evnt_cfg2,5    ; enable sys events
            lock_82360sl cmp     [perflag],on
            je      notickfix
            TREPORT ,<Tick>
            call    fixtick
notickfix:

open_82360sl
            jmp     exit_smi

;------------------------------------------------
;routine hdd_cntrl
;------------------------------------------------
            public  hdd_cntrl
hdd_cntrl   proc    near
            push    ax
            push    bx
            push    cx
            push    dx cmp     bl,0
            jnz     short switch_on_hdd
```

```
switch_off_hdd:
            call    hd_sleep mov     byte ptr [hdd_stat],off
            mov     byte ptr [dev3_lstdby_stat],off jmp     short exit_hdd
switch_on_hdd :
            call    hd_wakeup
            call    fixtick mov     byte ptr [hdd_stat],on
            mov     byte ptr [dev3_lstdby_stat],on
exit_hdd :
            pop     dx
            pop     cx
            pop     bx
            pop     ax
            ret
hdd_cntrl   endp lcd_panel_cntr:
backlight_cntr:
            push    ax
            push    bx
            push    cx
            push    dx
;------------------------------------
            cmp     bl,0
            jnz     short switch_on_backlight
switch_off_backlight :
            cmp     byte ptr [backlight_stat],off
            je      exit_backlight mov     byte ptr [backlight_stat],off
            mov     byte ptr [lcdpanel_stat],off call    vga_off
            call    backlight_off jmp     short exit_backlight
;------------------------------------
switch_on_backlight :
            cmp     byte ptr [backlight_stat],on
            je      short exit_backlight
            mov     byte ptr [backlight_stat],on
            mov     byte ptr [lcdpanel_stat],on
```

```
        call    backlight_on
        call    vga_on
exit_backlight :

pop     dx
        pop     cx
        pop     bx
        pop     ax
        ret
```

;------------------------------------------------------------
;
;routine backlight_cntrl is as follows....
;it may be noted that in our present example , from the on/off view point
;we regard back light and lcd as the same device. the reason for this
;is that when we switch off lcd or back light , there is no point in keeping
;the other on.but from the power management architecture view point , they
;are considered as two seperate devices. this allows us to have two trap
;mechanisms to bring the video system up . one is mouse movement and other
;is any key board activity..
;bl = 0 back light will be turned off else turned on..
;------------------------------------------------------------
;bl = 0 back light will be turned off else turned on..

```
        public  lcd_panel_cntrl
        public  backlight_cntrl
lcd_panel_cntrl:
backlight_cntrl:
        push    ax
        push    bx
        push    cx
        push    dx
```

;------------------------------------------------------------

```
        cmp     bl,0
        jnz     short switch_on_backlight1
switch_off_backlight1 :
        cmp     byte ptr [backlight_stat],off
        je      exit_backlight1
        mov     byte ptr [backlight_stat],off
        mov     byte ptr [lcdpanel_stat],off call    backlight_off
        call    vga_off mov     byte ptr [dev2_1stdby_stat],off
        mov     byte ptr [dev1_1stdby_stat],off
        jmp     short exit_backlight1
```

;------------------------------------------------------------

```
switch_on_backlight1 :
        cmp     byte ptr [backlight_stat],on
```

```
            je      short exit_backlight1
            mov     byte ptr [backlight_stat],on
            mov     byte ptr [lcdpanel_stat],on
            mov     byte ptr [dev2_lstdby_stat],on
            mov     byte ptr [dev1_lstdby_stat],on call    vga_on
            call    backlight_on
exit_backlight1 :

pop     dx
            pop     cx
            pop     bx
            pop     ax
            ret ;
; vga sleep - changes type of VGA power-down mode
;
; bl = 0 vga will be turned off else turned on
;
vga_sleep:
            push    ax
            push    bx
            push    cx
            push    dx
;------------------------------------------------
            cmp     bl,0
            jnz     short switch_on_vga call    backlight_off
            call    save_vga_state
            jmp     short exit_vga
;------------------------------------------------
switch_on_vga:

call    restore_vga_state
exit_vga:
            pop     dx
            pop     cx
            pop     bx
            pop     ax
            ret ;------------------------------------------------
;trap 0 is used to track the DMA page register due to the B0 step errata.
;a 3 in the floppy DMA page register (81h) will disable SMI's until
```

;it's changed. Future steppings should actually watch 3f4h and 3f5h for
;FD activity.
;------------------------------------------------------------ manage_local_0        proc    near
            push    bx
;------------------------------------
;we need to disable the trap first before we read the pic stuff..else
;we get into a endless smi queue mode , because this read generates
;and adds a pending trap smi to 360sl and so on...

alter_82360sl  trp_adr_msk_dev0,7fh,00h in      al,81h
        mov     bl,al alter_82360sl  trp_adr_msk_dev0,0ffh,080h ;enable trap.

test    [dmahackflag],1
        jnz     short blocked cmp     bl,3
        jne     short exit_manage read_82360sl  sm_req_cntrl
        mov     [sm_req_cntrl_save],al
        mov     al,"t"
        call    manage_local_1
        mov     al,"t"
        call    manage_local_2
        mov     al,"t"
        call    manage_local_3
        mov     al,"t"
        call    manage_local_4
        write_82360sl  sm_req_cntrl,90h
        mov     [dmahackflag],1 jmp     short exit_manage
blocked:
        cmp     bl,3
        je      short exit_manage mov     bl,[sm_req_cntrl_save]
        write_82360sl  sm_req_cntrl,<bl>
        mov     [dmahackflag],0 exit_manage :

```
                pop     bx
                ret
manage_local_0  endp
```

;----------------------------------------------------------
; control system clock speed
;----------------------------------------------------------
; If the "adaptive mode" is enabled, this function set traps on the
; HD, FD, COM1, COM2, LPT1, and the KB controller. A trap will then bring
; the CPU back to full or the user's selected speed. The user's selected
; speed would be set through the automatic system management trap.
;----------------------------------------------------------

```
manage_local_4  proc    near
                push    bx
                push    cx
                push    dx
;----------------------------------
                cmp     al,"1"
                jz      lstdby_support_4
trap_support_4:
```

;when we switch on a device we need to disable the corresponding
;trap mechanism for that particular device...

```
                cmp     byte ptr [dev2_lstdby_stat],off
                je      short trap_hack_42
                alter_82360sl trp_adr_msk_dev2,3fh,00h
trap_hack_42:
                cmp     byte ptr [dev1_lstdby_feature],disbl
                je      noserial
                cmp     byte ptr [dev1_lstdby_stat],off
                je      short trap_hack_41
noserial:
                alter_82360sl trp_adr_msk_dev1,3fh,00h
trap_hack_41:
                cmp     byte ptr [dev3_lstdby_stat],off
                jz      short trap_hack_43
                alter_82360sl trp_adr_msk_dev3,3fh,00h
trap_hack_43:
                alter_82360sl trp_adr_msk_dev4,3fh,00h
                alter_82360sl trp_adr_msk_dev5,3fh,00h cmp     [ddcflag],off
                je      exit_manage_4 mov     [ddcflag],off
                mov     bl,[userspeed]
```

```
            mov     bh,0
            shl     bx,4
            and     [cpupwrmode_save],0ffcfh
            or      [cpupwrmode_save],bx
            jmp     exit_manage_4 lstdby_support_4 :
            mov     [ddcflag],on cmp     [connect_flag],true
        je      checkcontrol
        cmp     [ddcmode_feature],disbl
        je      noclockdorking
        jmp     overapm
checkcontrol:
        cmp     [ddcmode_control],disbl
        je      noclockdorking
overapm:
            mov     bx,3
            shl     bx,4
            and     [cpupwrmode_save],0ffcfh
            or      [cpupwrmode_save],bx
noclockdorking:

alter_82360sl   trp_adr_msk_dev1,3fh,0
            alter_82360sl   trp_adr_msk_dev2,3fh,0
            alter_82360sl   trp_adr_msk_dev3,3fh,0
            alter_82360sl   trp_adr_msk_dev4,3fh,0
            alter_82360sl   trp_adr_msk_dev5,3fh,0
            mov     cx,50
            loop    $
            alter_82360sl   trp_adr_msk_dev1,3fh,80h  ;enbl trp1.
            alter_82360sl   trp_adr_msk_dev2,3fh,80h  ;enbl trp2.
            alter_82360sl   trp_adr_msk_dev3,3fh,80h  ;enbl trp2.
            alter_82360sl   trp_adr_msk_dev4,3fh,80h  ;enbl trp4.
            alter_82360sl   trp_adr_msk_dev5,3fh,80h  ;enbl trp5.

;disable local timers 4,5 alter_82360sl   stdby_tmr_cntrl,0cfh,00h

;-------------------------------
            xor     ax,ax
exit_manage_4 :
            pop     dx
            pop     cx
```

```
                    pop     bx
                    ret
manage_local_4      endp ;-----------------------------------------------------------
;manages the device for local stdby.managing lcd.
manage_local_2              proc    near
                    push    bx
                    push    cx
                    push    dx
;----------------------------------
                    cmp     al,"l"
                    jz      short lstdby_support_2
trap_support_2 :
                    mov     byte ptr [dev2_lstdby_stat],on call    zf_iflcd
                    jnz     wakeitup
                    cmp     [lidclose],enbl
                    je      lckill2
wakeitup:
                    mov     bl,0ffh
                    call near ptr lcd_panel_cntr
lckill2:

alter_82360sl   trp_adr_msk_dev2,03fh,00h
                    cmp     byte ptr [dev2_lstdby_feature],disbl
                    jz      exit_manage_2 alter_82360sl   stdby_tmr_cntrl,0ffh,04h
                    jmp     exit_manage_2 lstdby_support_2 :
                    mov     byte ptr [dev2_lstdby_stat],off cmp     byte ptr [dev1_lstdby_feature],disbl
                    je      noserialmouse
                    cmp     byte ptr [dev1_lstdby_stat],on
                    je      notoffyet_2
noserialmouse:
                    mov     bl,0
                    call near ptr lcd_panel_cntr
notoffyet_2:
                    alter_82360sl   trp_adr_msk_dev2,03fh,00h
                    mov     cx,50
                    loop    $
                    alter_82360sl   trp_adr_msk_dev2,3fh,80h  ;enbl trp2.
```

```
;disable local timer
          alter_82360sl  stdby_tmr_cntrl,0fbh,00h

;----------------------------------
          xor    ax,ax
exit_manage_2 :
          pop    dx
          pop    cx
          pop    bx
          ret
manage_local_2     endp ;------------------------------------------------------------
;manages the device for local stdby.managing lcd.
manage_local_1              proc    near
          push   bx
          push   cx
          push   dx
;----------------------------------
          cmp    al,"l"
          jz     short lstdby_support_1
trap_support_1 :
          mov    byte ptr [dev1_lstdby_stat],on cmp    [lidclose],enbl
          je     lckill1 mov    bl,0ffh
          call near ptr lcd_panel_cntr
lckill1:
          alter_82360sl  trp_adr_msk_dev1,03fh,00h
          cmp    byte ptr [dev1_lstdby_feature],disbl
          jz     exit_manage_1 alter_82360sl  stdby_tmr_cntrl,0ffh,02h
          jmp    exit_manage_1 lstdby_support_1 :
          mov    byte ptr [dev1_lstdby_stat],off cmp    byte ptr [dev1_lstdby_feature],disbl
          je     exit_manage_1
          cmp    byte ptr [dev2_lstdby_stat],on
          je     notoffyet_1
          mov    bl,0
          call near ptr lcd_panel_cntr
notoffyet_1:
```

```
            alter_82360sl  trp_adr_msk_dev1,03fh,00h
            mov     cx,50
            loop    $
            alter_82360sl  trp_adr_msk_dev1,3fh,80h  ;enbl trp1.
```

;disable local timer
```
            alter_82360sl  stdby_tmr_cntrl,0fdh,00h
```

;------------------------------------
```
            xor     ax,ax
exit_manage_1 :
            pop     dx
            pop     cx
            pop     bx
            ret
manage_local_1     endp
```

;-----------------------------------------------------------
;manages the device for local stdby.managing hard disk.
```
manage_local_3            proc  near
            push    bx
            push    cx
            push    dx
```
;------------------------------------
```
            cmp     al,"1"
            jz      short lstdby_support_3
trap_support_3 :
```

;when we switch on a device we need to disable the corresponding
;trap mechanism for that particular device...
```
            mov     bl,0ffh
            call near ptr hdd_cntrl
            alter_82360sl  trp_adr_msk_dev3,03fh,00h
            cmp     byte ptr [dev3_lstdby_feature],disbl
            jz      exit_manage_3
            alter_82360sl  stdby_tmr_cntrl,0ffh,08h
            jmp     exit_manage_3
```

;trap is disabled ..but we need to enable the lstdby timer so that the
;particular device can go to stand by again in case of a prolonged inactivity.

lstdby_support_3 :
;when we switch off the device , during local standby , we need to enable the
;corresponding trap mechanism , so that the device can be switched on again
;when it's services are needed by the upper level software.also we need to
;disable the corresponding lstdby timer.

```
            mov     bl,0
```

```
                call    near ptr hdd_cntrl
                alter_82360sl  trp_adr_msk_dev3,03fh,00h
                mov     cx,50
                loop    $
                alter_82360sl  trp_adr_msk_dev3,3fh,80h  ;enbl trp3.

alter_82360sl  stdby_tmr_cntrl,0f7h,00h

;------------------------------------
                xor     ax,ax
exit_manage_3 :
                pop     dx
                pop     cx
                pop     bx
                ret
manage_local_3     endp ;----------------------------------------------------------------
;the apm 1.0 version support module follows...the control falls here
;on an apm request from the upper level software..
;
;first we make certain sanity checks..
;sanity checks results will be as follows..
;no errors ..perfectly sensible...cy = 0.
;if cy = 1 then ah will have the error code..see equate file for error
;code values..
apm_req:
                call    near ptr sanity_check
                jc      no_cpu_idle_process apm_call :
                mov     si,ax_cpu_dump+2
                mov     ax,word ptr [si]
                cmp     al,cpu_idle_fn
                jnz     no_cpu_idle_process cpu_idle_call :
                call near ptr cpu_idle_process
                jmp     asmi_exit no_cpu_idle_process :
                mov     si,ax_cpu_dump+2
                mov     ax,word ptr [si]

mov     si,bx_cpu_dump
                mov     bx,word ptr [si]
```

```
                mov     si,cx_cpu_dump
                mov     cx,word ptr [si]

;now we process the remaining apm functions..retrieve all registers...
;first lemme check for invalid calls...

cmp     ah,apm_fn
                jz      ok6
not_ok6 :
                stc                             ;caller is guilty..
                mov     ax,invalid_call
                jmp     sw_apm_exit ok6 :
                cmp     al,installation_check
                jnz     next_apm_fn1
instl_chk :
                call near ptr install_apm_check
                jmp     sw_apm_exit
next_apm_fn1 :
                cmp     al,interface_connect
                jnz     next_apm_fn2
connect_call :
                call near ptr apm_connect_call
                jmp     sw_apm_exit
next_apm_fn2 :
                cmp     al,interface_disconnect
                jnz     next_apm_fn5
disconnect_call:
                call near ptr apm_disconnect_call
                jmp     sw_apm_exit
next_apm_fn5 :
;now check for interface connection..

cmp     byte ptr [connect_flag],true
                jz      ok_all_set connect_error :
                mov     ax,not_connect_err
                stc
                jmp     sw_apm_exit
ok_all_set :
                cmp     al,cpu_busy
                jnz     next_apm_fn6
busy_cpu :
                call near ptr apm_cpu_busy
                jmp     sw_apm_exit
next_apm_fn6 :
```

```
                cmp     al,set_power_state
                jnz     next_apm_fn7
set_power :
                call near ptr apm_set_power
                jmp     sw_apm_exit
next_apm_fn7 :
                cmp     al,apm_cntrl
                jnz     next_apm_fn8
control_apm :
                call near ptr pm_control
                jmp     sw_apm_exit
next_apm_fn8 :
                cmp     al,default_load
                jnz     next_apm_fn9
default_param :
                call near ptr load_default_parm
                jmp     sw_apm_exit
next_apm_fn9 :
                cmp     al,get_apm_sts
                jnz     next_apm_fn10
apm_sts :
                call near ptr get_apm_status
                jmp     sw_apm_exit
next_apm_fn10 :
                cmp     al,get_apm_evnt
                jnz     no_more_apm_fns
apm_event :
                call near ptr get_apm_event
                jmp     sw_apm_exit no_more_apm_fns :
                stc
;------------------------------------------------------------
sw_apm_exit :
                pushf
                mov     si,flag_cpu_dump
                and     word ptr [si],carry_clear_mask popf
                jnc     get_regs
                or      word ptr [si],carry_set_mask
get_regs :
                mov     si,ax_cpu_dump
                mov     word ptr [si],ax
                mov     si,bx_cpu_dump
                mov     word ptr [si],bx
                mov     si,cx_cpu_dump
```

```
        mov    word ptr [si],cx
        jmp    asmi_exit
```

;
; cpu idle process
;
; slows CPU to CLK/8 and enables the dynamic clock mode
; if dynamic mode in effect
;

;----------------------------------------------------------------
;the procedure for processing cpu_idle process follows..
;i/p = none...and o/p = none. it wakes up on any interrupt from the hardware.
;the upper level os issues a cpu_idle call whenever it finds that all the
;invoked applications are waiting for some kind of input and are idling..
;there can be several cpu_idle calls per second. the number of such calls
;depends on how much the cpu is loaded by the operating system and invoked
;applications..the apm spec tells us that we can reduce consumption of
;the system during these brief intervals ..which we do by stopping the
;cpu clock. but note that we are supposed to keep up the operating system
;time . so we enable the at herat beat as a stop break event. essentially
;we wake up 18 times a second and update the clock. once the clock is
;updated the os again issues a cpu_idle call if applications are still idling.
;----------------------------------------------------------------

```
cpu_idle_process    proc    near
```

;test stub follows..a message is flashed onto the screen to indicate
;that proper detection of cpu_idle was made.it is enabled by a proper
;assembler directive at the top of this file.

;----------------------------------------------------------------

;please note that b-step 82360sl implements stop break and system events
;circuitry in a different fashion using edge-detector circuits. as a
;result of it if an interrupt rises after you enter into smm it will never
;produce a stop break event. in order to get these things straight we need
;to implement the idle call in the following manner.

;step 1 : neutralize all systems events so that there will be no spurious
;system events in this period which may load the gstdby timer. there is
;a lot of circuitry that are common to stop_break and system_events.

```
        cmp    [ddcmode_feature],disbl
        je     noclockdorking1
        mov    [ddcmode_control],enbl
        mov    bx,3
        shl    bx,4
        and    [cpupwrmode_save],0ffcfh
```

```
        or      [cpupwrmode_save],bx
noclockdorking1:

read_82360sl  sys_evnt_cfg0
        mov     byte ptr [sys_evnt0_byte],al read_82360sl  sys_evnt_cfg1
        mov     byte ptr [sys_evnt1_byte],al read_82360sl  sys_evnt_cfg2
        mov     byte ptr [sys_evnt2_byte],al write_82360sl sys_evnt_cfg0,02h
        write_82360sl sys_evnt_cfg1,00h
        write_82360sl sys_evnt_cfg2,01h    ;keep it enabled.
```
;------------------------------------------------------------

;------------------------------------------------------------
;now if you enable irq0 as timer event things don't work so easily
;please see news letter for details..we enable the intr output from
;the 8259 pic as stop break event. this will allow us to wakeup and service
;timer ticks and any other pending hardware interrupt like mouse.

```
        alter_82360sl stp_brk_cfg2,0ffh,08h
```

;point the 360sl io register to stop_clk register..this is done because
;we must not execute lot of instruction after we test for an interrupt
;otherwise we potentially run into a problem of an interrupt getting
;generated during this period.

;------------------------------------------------------------
; WARNING: timing sensitive code
```
        mov     al,54h          ; reprogram the refresh for STP_CLK#
        jmp     $+2             ; coinciding with REFREQ problem
        jmp     $+2
        jmp     $+2
        out     43h,al
        mov     al,90h
        jmp     $+2
        jmp     $+2
        jmp     $+2
        out     41h,al mov     al,0fdh
        out     24h,al
```

;step 2 : find out all the pending interrupts by reading irr ( interrupt
; request register of pic ) .

;find out interrupts that are enabled..

```
        in      al,master_pic_mask
        mov     bl,al
        not     bl
```

;first issue a ocw3 command to pic to point to irr.

```
        mov     al,read_irr_command
        out     master_pic_ocw3,al
```

;next read pulse gets the irr value..

```
        jmp     $+2
        jmp     $+2 in      al,master_pic_ocw3
```

;step 3 : declare the cpu_idle call null nad void if there is a valid
;interrupt and just return to application by executing rsm so that
;the upper level can process the interrupt...

```
        and     al,bl           ;mask off junk interrupts..
        or      al,al
        jnz     fake_cpu_idle   ;there is a cry from hw..valid intr pending..
``` valid_idle :

;now if you enable irq0 as timer event things don't work so easily
;please see news letter for details..we enable the intr output from
;the 8259 pic as stop break event. this will allow us to wakeup and service
;timer ticks and any other pending hardware interrupt like mouse.

;now we stop the clock..but at every timer tick or any other hardware
;interrupt we wake up and resume the system..

```
        in      al,25h
```

; WARNING: timing sensitive code
;------------------------------------------------ fake_cpu_idle :

;------------------------------------------------

;we now restore the system events back...

```
        mov     bl,byte ptr [sys_evnt0_byte]
```

```
            write_82360sl sys_evnt_cfg0,<bl> mov    bl,byte ptr [sys_evnt1_byte]
            write_82360sl sys_evnt_cfg1,<bl> mov    bl,byte ptr [sys_evnt2_byte]
            or     bl,01h
            write_82360sl sys_evnt_cfg2,<bl>

;now withdraw intr output as a stop break event..

alter_82360sl  stp_brk_cfg2,0f7h,00h
;-----------------------------------------------------------
end_cpu_idle :
            xor    ax,ax
            mov    si,ax_cpu_dump
            mov    word ptr [si],ax
            ret
cpu_idle_process    endp ;-----------------------------------------------------------
;apm_cpu_busy procedure
;
;brings CPU to full or user's selected and disables the dynamic clock mode
;if dynamic mode in effect
;-----------------------------------------------------------
apm_cpu_busy proc    near
            cmp    [ddcmode_feature],disbl
            je     noclockdorking mov    bl,[userspeed]
            mov    bh,0
            shl    bx,4
            and    [cpupwrmode_save],0ffcfh
            or     [cpupwrmode_save],bx
            mov    [ddcmode_control],disbl
            clc
            ret
noclockdorking:
            stc
            ret
apm_cpu_busy endp ;-----------------------------------------------------------
;equates
sys_evnt_mask1      equ    5ah    ;5ah select kb, com1, com2, fdd
sys_evnt_mask2      equ    50h    ;50h select hdd and mouse
```

```
stop_break_mask1 equ      1ah        ;select kb,com1 mouse,com2 mouse
stop_break_mask2 equ      01h        ;select rtc alarm.
;------------------------------------------------------------ public  init_smi
init_smi proc near
        push    ds
        push    es
;------------------------------------------------------------
;disable SMI's
        lock_cpupwrmode
        open_82360sl
        alter_82360sl   sm_req_cntrl,80h,0  ; disable all SMI sources
        lock_82360sl ;------------------------------------------------------------
;we first designate pm ram area....
;to designate pm ram @ 0b0000h we need to write 0003h to mcsmram
;at 310h in omcs. first unlock cpu power mode register.

unlock_cpupwrmode
        set_space   OBMC                    ; on-board memory controller
        change_regb mcsmram,00h, 03h        ; select 0b0000h set_space   IBU
        change_reg  omsacr,0ffh,0ff00h      ; 0b0000-0bffffh r/w
        lock_cpupwrmode ;------------------------------------------------------------
;now copy the power management module into sm ram.

mov     ax,0b000h        ; clear RAM
        mov     es,ax
        sub     eax,eax
        mov     cx,4000h
        mov     di,ax
        and     ecx,0ffffh
        cld
        rep     stosd mov     di,8000h         ; get SMI stuff
        mov     al,'S'
        call    get_compressed mov     ax,es            ; save for compare
        mov     ds,ax
        sub     ax,ax
        mov     es,ax
```

```
            sub     eax,eax              ; clear and load into low mem
            mov     cx,2000h
            mov     di,8000h
            cld
            rep     stosd
            mov     di,8000h
            mov     al,'S'
            call    get_compressed
```

;----------------------------------------------------------------
;we now make sure of the integrity of the power management module loaded.

```
            mov     di,8000h
            mov     si,di
            mov     cx,2000h
            cld
            repz    cmpsd
            jnz     out_of_here          ; data_not_ok
```

;----------------------------------------------------------------
;map out pm RAM @ 0b0000h, pm RAM on-board
```
            unlock_cpupwrmode
            set_space    IBU
            change_reg   omsacr,0,0               ; 0a0000-0bffffh off-board
            change_reg   omdcr,07ffffh,0000h      ; PM RAM on-board
            lock_cpupwrmode
```

;----------------------------------------------------------------
;initialisation of 360 sl follows...

```
            open_82360sl write_82360sl  sm_req_sts,00
```

;----------------------------------------------------------------
;we program warning timers here...

```
            write_82360sl  sus_wrn_tmr_srbtn,01h
            write_82360sl  sus_wrn_tmr_bat,01h
            write_82360sl  sus_wrn_tmr_apwr,08h
            write_82360sl  sus_wrn_tmr_esmi,0     ;1 msec/bit.
            write_82360sl  sus_wrn_tmr_ssmi,0ffh  ;1 msec/bit.
            write_82360sl  crst_tmr,0ffh          ;1 msec/bit.
            write_82360sl  crst_pulse,0ffh        ;1 msec/bit.

write_82360sl  sys_evnt_cfg0,sys_evnt_mask1
            write_82360sl  sys_evnt_cfg1,sys_evnt_mask2
```

;----------------------

;software interface is via the ASMI and a dummy address of 26h..

write_82360sl asmi_addrl,<LOW asmi>
        write_82360sl asmi_addrh,<HIGH asmi>   ; my dummy write_82360sl sys_evnt_cfg2,05h   ; enable ASMI too ;------------------------------------------------
;dev pwr 0 is tied to floppy , but since floppy needs no power management
;we do not use lstdby_tmr_dev0 any more.

;------------------------------------------------
;device 1 and device 2 point to only one physical device , which is backlight
;and lcd display ...they are split logically to have 2 traps (mouse and
;key board) wake up the display.initially let us set it for 60 seconds.

write_82360sl lstdby_tmr_dev1,0ah
;------------------------------------------------
;devpwr 2 is lcd...we program it , initially to 64 seconds.it points
;physically to the same device which is the display.

write_82360sl lstdby_tmr_dev2,11h
;------------------------------------------------
;devpwr 3 is hdd.we program the timer for 80 secs.

write_82360sl lstdby_tmr_dev3,14h

;------------------------------------------------
;timer 4 and 5 are not used at present...

;------------------------------------------------
;we program the io traps for our devices.....
;floppy power management is taken off since the epson 1040 power manages
;itself.we use trap 0 for the DMA page registers
;this means that a trap is generated whenever an attemt is made by any
;high level software to alter the DMA page registers so the power management
;software then gains control and uses this info to actively enable
;and disable the smi events ...thus mostly correcting the 360sl's B-step
;bug in floppy DMA's to 030000h
;---------------------

;Future steppings should actually watch 3f4h and 3f5h for FD activity.
        write_82360sl trp_adrl_dev0,81h
        write_82360sl trp_adrh_dev0,00h
        write_82360sl trp_adr_msk_dev0,0a0h   ;enable trap.

write_82360sl trp_adrl_dev1,0f8h
        write_82360sl trp_adrh_dev1,03h

```
        write_82360sl trp_adr_msk_dev1,27h write_82360sl trp_adrl_dev4,0f8h
        write_82360sl trp_adrh_dev4,02h
        write_82360sl trp_adr_msk_dev4,27h write_82360sl trp_adrl_dev5,78h
        write_82360sl trp_adrh_dev5,03h
        write_82360sl trp_adr_msk_dev5,27h ;----------------------
;lcd traps... are key board traps 060h to 064h write_82360sl trp_adrl_dev2,60h
        write_82360sl trp_adrh_dev2,00h
        write_82360sl trp_adr_msk_dev2,24h
;----------------------
;hdd traps... 1f0h to 1f7h..

write_82360sl trp_adrl_dev3,0f0h
        write_82360sl trp_adrh_dev3,01h
        write_82360sl trp_adr_msk_dev3,27h ;----------------------
;programming global stand by timer.4 sec /bit and 16 bit timer..
;we program it to 4 seconds (actually 12 secs.)
        write_82360sl gstdby_tmrl,01h
        write_82360sl gstdby_tmrh,00h
;
;we program auto-power off timer here.this is the time delay before you
;goto suspend from global standby.
        write_82360sl apwr_tmrl,16   ; 64 second default
        write_82360sl apwr_tmrh,80h
        write_82360sl sus_wrn_tmr_apwr,08h    ; 1 second grace write_82360sl  stp_brk_cfg0,0
        write_82360sl  stp_brk_cfg1,0
        write_82360sl  stp_brk_cfg2,0

;------------------------------------------------------------
;we initialize the xcmos ram for intel-microsoft apm support 1.0
;for details of the xcmos map please see apm bios reference document.

write_xmos   xcmosinfostart+31,026h   ;setup port address low
        write_xmos   xcmosinfostart+30,00h    ;set port address high
        write_xmos   xcmosinfostart+29,11h    ;set for b0 and apm
        write_xmos   xcmosinfostart+28,00h    ;pm_event flag.
```

```
            write_xmos    xcmosinfostart+27,'l'    ;sl signature.
            write_xmos    xcmosinfostart+26,'s'    ;sl signature.
            write_xmos    xcmosinfostart+25,10h        ;apm version 1.0
            write_xmos    xcmosinfostart+24,07h        ;support flags..
;we write apm_status byte here..
            write_xmos    xcmosinfostart+23,1fh;status setup.

;------------------------------------------------------------

;now we enable the full power management state machine...

;**not yet **  write_82360sl  sm_req_cntrl,sm_enbl
               write_82360sl  sm_req_cntrl,80h ;------------------------------------------------------------
;we are done with initialization..lock up the 360sl index space...
            lock_82360sl
            test    al,0
out_of_here:
            pop     es
            pop     ds
            ret
init_smi endp
```

What is claimed is:

1. A computer system, comprising:
   (a) a central processing unit (CPU);
   (b) a clock electrically connected to said CPU, said clock having first and second non zero operating frequencies, where said first frequency is greater than said second frequency;
   (c) a system timer electrically connected to said CPU;
   (d) a system counter electrically corrected to said CPU; and
   (e) a clock control in electronic communication with said CPU; wherein said clock control performs the steps of:
   (i) recognizing at least four states for the computer system, said states including: a ready state, a global standby time out state, a low speed state, and a stop clock state;
   (ii) adjusting the frequency of said clock to said first frequency while the computer system is in said ready state, to said second frequency while the computer system is in said global standby time out and low speed states, and to zero while the computer system is in said stop dock state;
   (iii) switching the computer system from said ready state or said low speed state to said global standby time out state, if said system timer times out without a system event occurring;
   (iv) switching the computer system from said low speed state to said ready state and resetting said timer if an IO event occurs; and
   (v) switching the computer system from said global standby time out state to said stop clock state if no system event or IO event occurs, but switching to said low speed state otherwise.

2. The system of claim 1, wherein:
   (a) said system timer is in hardware including a register whose contents determine a timeout interval of said system timer; and
   (b) said system counter is in software and whose contents are programmable.

3. The system of claim 1, further comprising:
   (a) a suspended state recognized by said clock control with said clock stopped, said clock control switching said system from said stop clock state to said suspended state if a suspend time out occurs prior to a break event but switching to said ready state if a break event occurs prior to suspend time out; and
   (b) said clock control switching from said suspended state to said ready state upon the occurrence of a resume event.

4. The system of claim 3, wherein:
   (a) said break events are interrupts from a keyboard, a communication port, a real time clock, or a mouse.

5. The system of claim 1, further comprising:
   (a) a transient stop clock state recognized by said clock control with said clock stopped, said clock control switching said system from said ready or low speed states to said transient stop clock state when a CPU Idle call occurs, and switching from said transient stop clock state to said low speed state when an interrupt occurs.

6. The system of claim 1, wherein:

(a) said first frequency is a integral multiple of said second frequency.

7. The system of claim 6, wherein:
(a) said integral multiple equal 8.

8. The system of claim 1, wherein:
(a) said system events are interrupts from a keyboard, a communication port, a disk drive, or a mouse; and
(b) said IO events are activity in a keyboard, a communication port, a disk drive, or a mouse.

9. A computer system comprising:
a central processor unit (CPU);
a clock electrically connected to said CPU, said clock having normal, slow and stopped speeds;
system timer electrically connected to said CPU;
a system counter, in electronic communication with said CPU;
a power management controller, (power management) coupled to said timer, counter, and clock, said power management putting said clock into said slow speed and decrementing said counter when said timer times out, said power management stopping said clock when said timer times out and when said counter has counted down;
suspend timers; and
wherein said power management keeps said clock stopped when said suspend timers time out prior to a break event, and said power management puts said clock in said normal speed when a resume event occurs after said suspend timers time out.

10. A computer system comprising:
a central processor unit (CPU);
a clock electrically connected to said CPU, said clock having normal, slow and stopped speeds;
a system timer electrically connected to said CPU;
a system counter, in electronic communication with said CPU;
a power management controller, (power management) coupled to said timer, counter, and clock, said power management putting said clock into said slow speed and decrementing said counter when said timer times out, said power management stopping said clock when said timer times out and when said counter has counted down;
a CPU Idle call connection to BIOS; and
wherein said power management stops said clock when a CPU Idle call issues when said clock is in normal or slow speed, and said power management puts said clock into said slow speed when an interrupt occurs following said CPU Idle call.

* * * * *